(12) United States Patent
Yamada et al.

(10) Patent No.: US 12,403,749 B2
(45) Date of Patent: Sep. 2, 2025

(54) AIR CONDITIONER

(71) Applicant: DENSO CORPORATION, Kariya (JP)

(72) Inventors: Atsushi Yamada, Kariya (JP); Kazuhiro Tada, Kariya (JP); Masaki Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/366,866

(22) Filed: Aug. 8, 2023

(65) Prior Publication Data

US 2023/0382195 A1     Nov. 30, 2023

Related U.S. Application Data

(63) Continuation of application No. PCT/JP2022/001290, filed on Jan. 17, 2022.

(30) Foreign Application Priority Data

Feb. 23, 2021   (JP) ................ 2021-026880

(51) Int. Cl.
*B60H 1/32*    (2006.01)
*B60H 1/00*    (2006.01)

(52) U.S. Cl.
CPC ....... *B60H 1/3205* (2013.01); *B60H 1/00571* (2013.01)

(58) Field of Classification Search
CPC .............. B60H 1/3205; B60H 1/00571; B60H 1/00314; B60H 1/143; B60H 1/3213; B60H 1/23384; B60H 1/00914; B60H 1/00921; B60H 2001/00307; B60H 2001/00949

See application file for complete search history.

(56) References Cited

U.S. PATENT DOCUMENTS

| | | | |
|---|---|---|---|
| 11,498,391 B2* | 11/2022 | Shiratori | ........... B60H 1/03 |
| 2013/0152611 A1 | 6/2013 | Furll et al. | |
| 2014/0158322 A1 | 6/2014 | Homann et al. | |
| 2020/0207182 A1 | 7/2020 | Ishizeki et al. | |

(Continued)

FOREIGN PATENT DOCUMENTS

| | | |
|---|---|---|
| DE | 102011109055 A1 | 3/2012 |
| DE | 112018004722 T5 | 6/2020 |

(Continued)

*Primary Examiner* — Marc E Norman
(74) *Attorney, Agent, or Firm* — Harness, Dickey & Pierce, P.L.C.

(57) ABSTRACT

An air conditioner includes: a heat pump cycle including a compressor, a heating part and a low-temperature side water-refrigerant heat exchanger; a heat medium circuit; and a blower. In the air conditioner, when a heating capability of the heating part is increased by using the heat generated by the heat generating part, a heating preparation control is executed, in which a refrigerant discharge capability of the compressor is set to be equal to or less than a predetermined reference discharge capability and a blowing capability of the blower is set to be equal to or less than a predetermined reference blowing capability, until an inlet-side heat medium temperature of the heat medium flowing into the heat medium passage of the low-temperature side water-refrigerant heat exchanger becomes equal to or higher than a target heat medium temperature.

8 Claims, 13 Drawing Sheets

HEATING PREPARATION CONTROL

(56) References Cited

U.S. PATENT DOCUMENTS

2022/0314742 A1   10/2022   Miyakoshi et al.
2024/0190210 A1*  6/2024   Michikawauchi ............................
                                                              B60H 1/00278

FOREIGN PATENT DOCUMENTS

| JP | 2019130980 A | 8/2019 |
| WO | WO-2012028307 A1 | 3/2012 |
| WO | WO-2013013790 A1 | 1/2013 |
| WO | 2020203348 A1 | 10/2020 |
| WO | 2020235263 A1 | 11/2020 |

\* cited by examiner

HEATING PREPARATION CONTROL

HEATING PREPARATION CONTROL

HEATING PREPARATION CONTROL

HEATING PREPARATION CONTROL

HEATING PREPARATION CONTROL

HEATING PREPARATION CONTROL

AIR CONDITIONER

CROSS REFERENCE TO RELATED APPLICATION

The present application is a continuation application of International Patent Application No. PCT/JP2022/001290 filed on Jan. 17, 2022, which designated the U.S. and claims the benefit of priority from Japanese Patent Application No. 2021-026880 filed on Feb. 23, 2021. The entire disclosures of all of the above applications are incorporated herein by reference.

TECHNICAL FIELD

The present disclosure relates to an air conditioner having a heat generating part that generates heat.

BACKGROUND ART

A vehicle air conditioner includes a heat pump cycle and a low-temperature side heat medium circuit. The heat pump cycle may include a heating part and a low-temperature side water-refrigerant heat exchanger. The heating part heats ventilation air to be blown into a vehicle interior using, as a heat source, a high-pressure refrigerant discharged from a compressor. The low-temperature side water-refrigerant heat exchanger exchanges heat between a low-pressure refrigerant and a low-temperature side heat medium circulating in a low-temperature side heat medium circuit, and causes the low-pressure refrigerant to absorb heat of the low-temperature side heat medium.

SUMMARY

According to an aspect of the present disclosure, it is possible to set a heating preparation control. In the heating preparation control, a refrigerant discharge capability of a compressor of a heat pump cycle is made to be equal to or lower than a reference discharge capability until a temperature of a heat medium flowing into a heat medium passage of a low-temperature side water-refrigerant heat exchanger of the heat pump cycle becomes equal to or higher than a target heat medium temperature. Therefore, it is possible to suppress an unnecessary increase in the amount of heat to be absorbed from a heat medium to a low-pressure refrigerant in a low-temperature side water-refrigerant heat exchanger.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
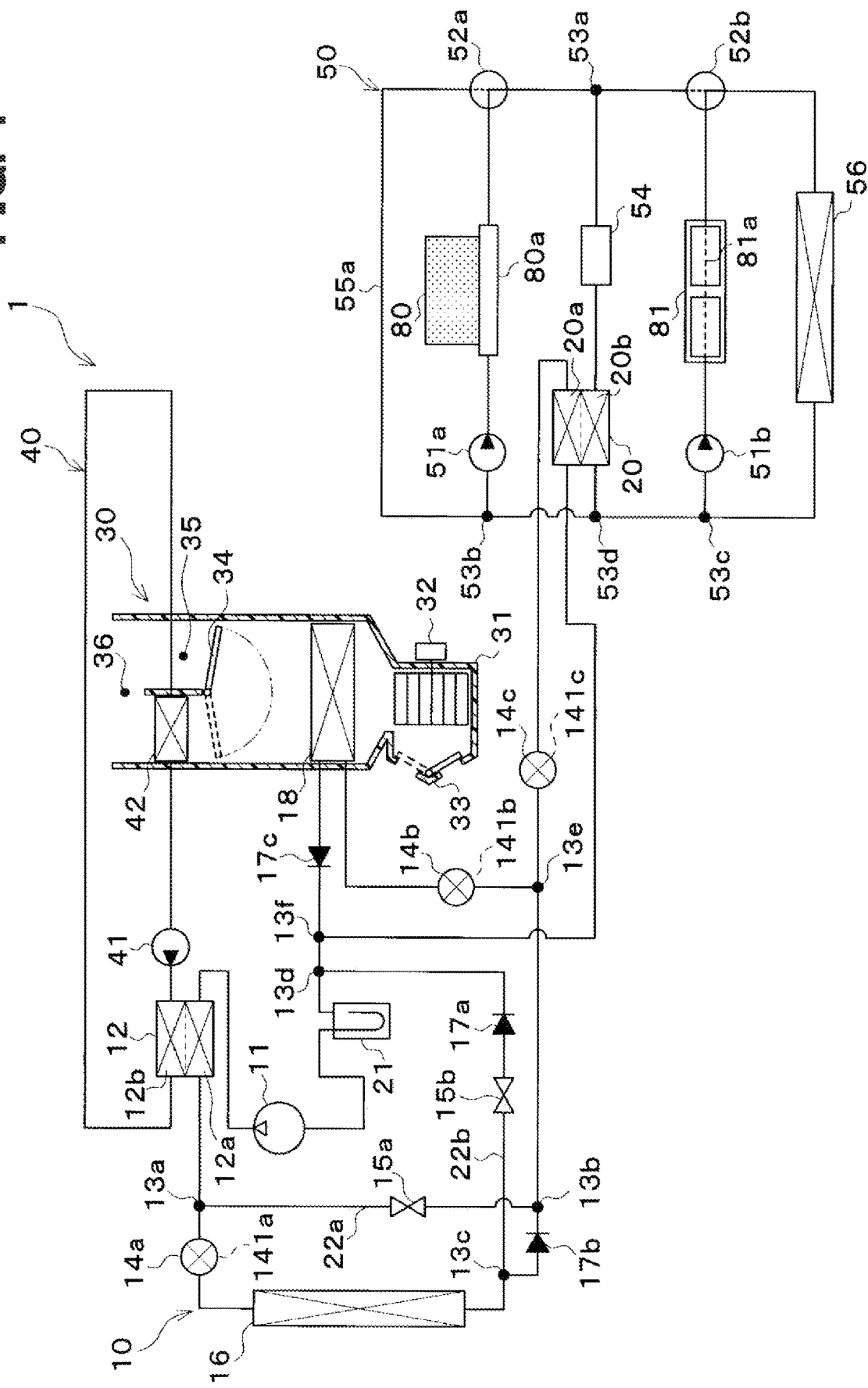
FIG. 1 is a schematic overall configuration view of an air conditioner of a first embodiment.

In a low-temperature side heat medium circuit of an air conditioner, a heat medium passage of a low-temperature side water-refrigerant heat exchanger and an electric heater may be disposed. The electric heater is a heat generating part that generates heat for heating a low-temperature side heat medium.

In the air conditioner, the heat generated by the electric heater is moved from a low-pressure side to a high-pressure side by a heat pump cycle, which can be used to improve the heating capability of a heating part.

In the air conditioner, however, the temperature of the low-temperature side heat medium having a relatively large heat capacity may need to be raised higher than that of the low-pressure refrigerant in order to improve the heating capability of the heating part using the heat generated by the electric heater.

For example, when the temperature of the low-temperature side heat medium is as low as in the case of low outside air temperature, the time for raising the temperature of the low-temperature side heat medium becomes long, and thus it is impossible to promptly improve the heating capability of the heating part. As a result, warm-up time, necessary for raising the temperature of the ventilation air to a temperature at which the vehicle interior can be sufficiently heated, becomes long, and thus it is impossible to realize air conditioning with immediate effectiveness and high responsiveness.

In view of the above points, an object of the present disclosure is to provide an air conditioner capable of promptly increasing heating capability of a heating part by using heat generated by a heat generating part.

An air conditioner according to an exemplar of the present disclosure includes a heat pump cycle, a heat medium circuit and a blower. The heat pump cycle includes a compressor, a heating part and a low-temperature side water-refrigerant heat exchanger. The compressor is configured to compress and discharge a refrigerant. The heating part is configured to heat air to be blown into a space to be air-conditioned using a high-pressure refrigerant discharged from the compressor as a heat source. The low-temperature side water-refrigerant heat exchanger is configured to cause a low-pressure refrigerant to absorb heat of a heat medium.

The heat medium circuit is configured to circulate therein the heat medium, and the blower is configured to blow the air toward the space to be air-conditioned.

The heat medium circuit is provided with a heat medium passage of the low-temperature side water-refrigerant heat exchanger, and a heat generating part configured to heat the heat medium to flow into the heat medium passage of the low-temperature side water-refrigerant heat exchanger.

Further, when a heating capability of the heating part is increased by using the heat generated by the heat generating part, a heating preparation control is executed, in which a refrigerant discharge capability of the compressor is set to be equal to or less than a predetermined reference discharge capability and a blowing capability of the blower is set to be equal to or less than a predetermined reference blowing capability, until an inlet-side heat medium temperature of the heat medium flowing into the heat medium passage of the low-temperature side water-refrigerant heat exchanger becomes equal to or higher than a target heat medium temperature.

According to this, in the heating preparation control, the refrigerant discharge capability of the compressor is made to be equal to or lower than the reference discharge capability until the temperature of the heat medium flowing into the heat medium passage of the low-temperature side water-refrigerant heat exchanger becomes equal to or higher than the target heat medium temperature. Therefore, it is possible in the low-temperature side water-refrigerant heat exchanger to suppress an unnecessary increase in the amount of heat to be absorbed from the heat medium to the low-pressure refrigerant.

In the heating preparation control, the blowing capability of the blower is made to be equal to or lower than the reference blowing capability until the temperature of the heat medium flowing into the heat medium passage of the low-temperature side water-refrigerant heat exchanger becomes equal to or higher than the target heat medium temperature. Therefore, it is possible in the heating part to suppress an unnecessary increase in the amount of heat to be dissipated to the ventilation air.

As a result, when the heating preparation control is executed, the temperature of the heat medium can be promptly raised using the heat generated by the heat generating part. Furthermore, when the heat of the heat medium whose temperature has been promptly raised is absorbed by the low-pressure refrigerant in the heat pump cycle and is moved to the high-pressure refrigerant, the heating capability of the heating part can be promptly increased.

According to the air conditioner of the present disclosure, it is possible to provide an air conditioner capable of promptly increasing the heating capability of the heating part using the heat generated by a heat generating part.

Hereinafter, a plurality of embodiments for carrying out the present disclosure will be described with reference to the drawings. In each embodiment, parts corresponding to matters described in the preceding embodiment are denoted by the same reference numerals, and redundant description may be omitted. In a case where only a part of the configuration is described in each embodiment, other embodiments previously described can be applied to other parts of the configuration. In addition to the combination of parts that are specifically and explicitly described as being capable of being combined in each embodiment, it is also possible to partially combine the embodiments even if they are not explicitly described, as long as there is no problem in the combination.

First Embodiment

A first embodiment of an air conditioner 1 according to the present disclosure will be described with reference to FIGS. 1 to 9. The air conditioner 1 of the present embodiment is applied to an electric car. The electric car is a vehicle that obtains driving force for traveling from an electric motor. In the electric car, the air conditioner 1 air conditions a vehicle interior that is a space to be air conditioned, and adjusts the temperatures of in-vehicle devices whose temperatures are to be adjusted. Therefore, the air conditioner 1 of the present embodiment is a vehicle air conditioner with an in-vehicle device temperature adjustment function.

In the air conditioner 1 of the present embodiment, the in-vehicle devices whose temperatures are to be adjusted are a battery 80 and a strong current device 81.

The battery 80 is a secondary battery that stores electric power to be supplied to electric in-vehicle devices. In the present embodiment, a lithium ion battery is adopted as the battery 80. The battery 80 is an assembled battery formed by electrically connecting a plurality of stacked battery cells in series or in parallel.

The battery 80 generates heat during operation (i.e., during charging and discharging). The battery 80 has characteristics that the output is likely to decrease at a low temperature and the deterioration is likely to progress at a high temperature. Therefore, the temperature of the battery 80 needs to be maintained within an appropriate temperature range (in the present embodiment, 15° C. or higher and 55° C. or lower).

The strong current device 81 is an in-vehicle device that operates by being supplied with electric power and generates heat during operation. The strong current device 81 of the present embodiment is specifically an inverter and a motor generator.

The inverter is a power conversion device that converts the frequency of electric power to be supplied from the battery 80 to the motor generator, converts AC power generated by the motor generator into DC power, and outputs the DC power to the battery 80 side. The motor generator serves as an electric motor that outputs driving force for traveling by being supplied with electric power, and serves as a power generator that generates regenerative power when the vehicle is decelerating or traveling downhill.

When the temperature of the strong current device 81 is high, degradation of electric circuits may progress. Therefore, it is necessary to maintain the temperature of each electric circuit at a temperature lower than a reference heat resistant temperature (in the present embodiment, 130° C.) at which the electric circuit can be protected.

Therefore, in the present embodiment, an appropriate temperature zone, in which the battery 80 can be appropriately operated, and an appropriate temperature zone, in which the strong current device 81 can be appropriately operated, do not completely match. In other words, the appropriate temperature zone of the battery 80 is different from the appropriate temperature zone of the strong current device 81. As illustrated in the overall configuration view of FIG. 1, the air conditioner 1 includes a heat pump cycle 10, an indoor air conditioning unit 30, a high-temperature side heat medium circuit 40, a low-temperature side heat medium circuit 50, and the like.

First, the heat pump cycle 10 will be described. The heat pump cycle 10 is a vapor compression type refrigeration cycle device that, in order to perform air conditioning of the vehicle interior and adjust the temperatures of the in-vehicle devices, adjusts the temperatures of: ventilation air to be blown into the vehicle interior, a high-temperature side heat medium circulating in the high-temperature side heat medium circuit 40, and a low-temperature side heat medium circulating in the low-temperature side heat medium circuit 50.

In order to perform air conditioning of the vehicle interior and adjust the temperatures of the in-vehicle devices, the heat pump cycle 10 is formed so as to be able to switch a refrigerant circuit according to various operation modes to be described later.

In the heat pump cycle 10, an HFO refrigerant (specifically, R1234yf) is adopted as the refrigerant. The heat pump cycle 10 constitutes a subcritical refrigeration cycle in which the pressure of the high-pressure refrigerant discharged from a compressor 11 does not exceed the critical pressure of the refrigerant. Refrigerator oil for lubricating the compressor 11 is mixed in the refrigerant. The refrigerator oil is PAG oil having compatibility with a liquid-phase refrigerant. A part of the refrigerator oil circulates in the cycle together with the refrigerant.

The compressor 11 sucks, compresses, and discharges the refrigerant in the heat pump cycle 10. The compressor 11 is disposed in a driving device room on the front side of a vehicle cabin. The driving device room forms a space where at least a part of a device (e.g., a motor generator) or the like to be used for generating a driving force for traveling the vehicle is disposed.

The compressor 11 is an electric compressor that drives a fixed capacity type compression mechanism having a fixed discharge capacity by an electric motor. The number of rotation (i.e., refrigerant discharge capability) of the compressor 11 is controlled by a control signal output from a control device 60 for system control to be described later.

The inlet side of a refrigerant passage 12a of a water-refrigerant heat exchanger 12 is connected to the discharge port of the compressor 11. The water-refrigerant heat exchanger 12 includes the refrigerant passage 12a that causes the high-pressure refrigerant discharged from the compressor 11 to flow through, and a heat medium passage 12b that causes the high-temperature side heat medium circulating in the high-temperature side heat medium circuit 40 to flow through.

The water-refrigerant heat exchanger 12 is a high-temperature side water-refrigerant heat exchange part that exchanges heat between the high-pressure refrigerant flowing through the refrigerant passage 12a and the high-temperature side heat medium flowing through the heat medium passage 12b. In the water-refrigerant heat exchanger 12, the heat of the high-pressure refrigerant is dissipated to the heat medium to heat the high-temperature side heat medium.

The inflow port side of a first refrigerant joint part 13a is connected to the outlet of the refrigerant passage 12a of the water-refrigerant heat exchanger 12. The first refrigerant joint part 13a is a three-way joint having three inflow outlets communicating with each other. As the first refrigerant joint part 13a, a joint member formed by joining a plurality of pipes, or a joint member formed by providing a plurality of refrigerant passages in a metal block or a resin block, can be adopted.

As described later, the heat pump cycle 10 further includes a second refrigerant joint part 13b to a sixth refrigerant joint part 13f. The basic configurations of the second refrigerant joint part 13b to the sixth refrigerant joint part 13f are similar to that of the first refrigerant joint part 13a.

When one of the three inflow outlets is used as an inflow port and the remaining two are used as outflow ports, these joint parts serve as branch parts that branch the flow of the refrigerant. When two of the three inflow outlets are used as inflow ports and the remaining one is used as an outflow port, these joint parts serve as merging parts that merge the flows of the refrigerant.

The inlet side of a heating expansion valve 14a is connected to one outflow port of the first refrigerant joint part 13a. One inflow port side of the second refrigerant joint part 13b is connected to the other outflow port of the first refrigerant joint part 13a via a dehumidifying passage 22a.

The dehumidifying passage 22a forms a refrigerant flow path that causes the refrigerant to flow through during a parallel dehumidifying-heating mode or the like to be described later. A dehumidifying on-off valve 15a is disposed in the dehumidifying passage 22a. The dehumidifying on-off valve 15a is an electromagnetic valve that opens and closes the dehumidifying passage 22a. The operation of the dehumidifying on-off valve 15a is controlled by a control voltage output from the control device 60.

As described later, the heat pump cycle 10 further includes a heating on-off valve 15b. The basic configuration of the heating on-off valve 15b is similar to that of the dehumidifying on-off valve 15a. The dehumidifying on-off valve 15a and the heating on-off valve 15b can switch the refrigerant circuit of the heat pump cycle 10 by opening and closing the refrigerant passage. Therefore, the dehumidifying on-off valve 15a and the heating on-off valve 15b are refrigerant circuit switching parts that switch the refrigerant circuit.

The heating expansion valve 14a is a heating pressure-reducing part that, during a heating mode or the like to be described later, reduces the pressure of the high-pressure refrigerant flowing out of the refrigerant passage 12a of the water-refrigerant heat exchanger 12 and adjusts the flow rate (mass flow rate) of the refrigerant that is caused to flow out to the downstream side.

The heating expansion valve 14a is an electric variable throttle mechanism including a valve body part 141a that changes an opening degree (i.e., a valve opening degree) of a throttle passage and an electric actuator (specifically, a stepping motor) that displaces the valve body part 141a. The operation of the heating expansion valve 14a is controlled by a control signal (specifically, a control pulse) output from the control device 60.

The heating expansion valve 14a has a fully opening function of functioning as a simple refrigerant passage with rarely exerting a flow rate adjusting action and a refrigerant pressure reducing action when the valve body part 141a fully opens the valve opening degree. The heating expansion valve 14a also has a fully closing function of closing the refrigerant passage when the valve body part 141a fully closes the throttle passage.

As described later, the heat pump cycle 10 further includes an air-cooling expansion valve 14b and a cooling expansion valve 14c. The basic configurations of the air-cooling expansion valve 14b and the cooling expansion valve 14c are similar to that of the heating expansion valve 14a. Therefore, the air-cooling expansion valve 14b includes a valve body part 141b and has the fully opening function and the fully closing function. The cooling expansion valve 14c includes a valve body part 141c and has the fully opening function and the fully closing function.

The heating expansion valve 14a, the air-cooling expansion valve 14b, and the cooling expansion valve 14c can switch the refrigerant circuit of the heat pump cycle 10 by the above-described fully closing function. More specifically, the valve body part 141a of the heating expansion valve 14a, the valve body part 141b of the air-cooling expansion valve 14b, and the valve body part 141c of the cooling expansion valve 14c also have a function as the refrigerant circuit switching part.

Of course, the heating expansion valve 14a, the air-cooling expansion valve 14b, and the cooling expansion valve 14c may be formed by combining a variable throttle mechanism not having the fully closing function with an on-off valve. In this case, the on-off valve serves as the refrigerant circuit switching part.

The refrigerant inlet side of an outdoor heat exchanger 16 is connected to the outlet of the heating expansion valve 14a. Therefore, the valve body part 14a of the heating expansion valve 141a serves as an outdoor unit inlet side opening/closing part that opens and closes the refrigerant inlet side of the outdoor heat exchanger 16. The outdoor heat exchanger 16 is an outdoor heat exchange part that exchanges heat between the refrigerant flowing out of the heating expansion valve 14a and the outside air blown by a non-illustrated cooling fan. The outdoor heat exchanger 16 is disposed on the front side of the drive device room. Therefore, traveling air can be applied to the outdoor heat exchanger 16 during traveling the vehicle.

The inflow port side of the third refrigerant joint part 13c is connected to the refrigerant outlet of the outdoor heat exchanger 16. One inflow port side of the fourth refrigerant joint part 13d is connected to one outflow port of the third refrigerant joint part 13c via a heating passage 22b. The heating passage 22b forms a refrigerant flow path that causes the refrigerant to flow through during a heating mode or the like to be described later.

The heating on-off valve 15b and a first check valve 17a are disposed in the heating passage 22b. The heating on-off valve 15b is an electromagnetic valve that opens and closes the heating passage 22b. The first check valve 17a allows the refrigerant to flow from the third refrigerant joint part 13c side to the fourth refrigerant joint part 13d side, and prohibits the refrigerant from flowing from the fourth refrigerant joint part 13d side to the third refrigerant joint part 13c side. Therefore, the heating on-off valve 15b and the first check valve 17a serve as an outdoor unit outlet side opening/closing part that opens and closes the refrigerant outlet side of the outdoor heat exchanger 16.

The other inflow port side of the second refrigerant joint part 13b is connected to the other outflow port of the third refrigerant joint part 13c. A second check valve 17b is disposed in a refrigerant passage connecting the other outflow port of the third refrigerant joint part 13c and the other inflow port of the second refrigerant joint part 13b. The second check valve 17b allows the refrigerant to flow from the third refrigerant joint part 13c side to the second refrigerant joint part 13b side, and prohibits the refrigerant from flowing from the second refrigerant joint part 13b side to the third refrigerant joint part 13c side. Therefore, the second check valve 17b serves as an outdoor unit outlet side opening/closing part.

The inflow port side of the fifth refrigerant joint part 13e is connected to the outflow port of the second refrigerant joint part 13b. The inlet side of the air-cooling expansion valve 14b is connected to one outflow port of the fifth refrigerant joint part 13e. The inlet side of the cooling expansion valve 14c is connected to the other outflow port of the fifth refrigerant joint part 13e.

The air-cooling expansion valve 14b is an air-cooling pressure-reducing part that, during an air-cooling mode or the like to be described later, reduces the pressure of the refrigerant and adjusts the flow rate of the refrigerant that is caused to flow out to the downstream side. The refrigerant inlet side of an indoor evaporator 18 is connected to the outlet of the air-cooling expansion valve 14b. Therefore, the valve body part 141b of the air-cooling expansion valve 14b serves as an indoor unit inlet side opening/closing part that opens and closes the refrigerant inlet side of the indoor evaporator 18.

The indoor evaporator 18 is disposed in an air conditioning case 31 of the indoor air conditioning unit 30 to be described later. The indoor evaporator 18 is a cooling heat exchanger that exchanges heat between the low-pressure refrigerant whose pressure has been reduced by the air-cooling expansion valve 14b and the ventilation air to be blown into the vehicle interior. The indoor evaporator 18 cools the ventilation air by evaporating the low-pressure refrigerant to exert an endothermic action.

One inflow port side of the sixth refrigerant joint part 13f is connected to the refrigerant outlet of the indoor evaporator 18. A third check valve 17c is disposed in a refrigerant flow path connecting the refrigerant outlet of the indoor evaporator 18 and the one inflow port of the sixth refrigerant joint part 13f. The third check valve 17c allows the refrigerant to flow from the indoor evaporator 18 side to the sixth refrigerant joint part 13f side, and prohibits the refrigerant from flowing from the sixth refrigerant joint part 13f side to the indoor evaporator 18 side. Therefore, the third check valve 17c serves as an indoor unit outlet side opening/closing part that opens and closes the refrigerant outlet side of the indoor evaporator 18.

The cooling expansion valve 14c is a cooling pressure-reducing part that, during a battery cooling mode or the like to be described later, reduces the pressure of the refrigerant and adjusts the flow rate of the refrigerant that is caused to flow out to the downstream side. The inlet side of a refrigerant passage 20a of a chiller 20 is connected to the outlet of the cooling expansion valve 14c.

The chiller 20 includes a refrigerant passage 20a that causes the low-pressure refrigerant whose pressure has been reduced by the cooling expansion valve 14c to flow through, and a heat medium passage 20b that causes the low-temperature side heat medium circulating in the low-temperature side heat medium circuit 50 to flow through. The chiller 20 is a low-temperature side water-refrigerant heat exchanger that exchanges heat between the low-pressure refrigerant flowing through the refrigerant passage 20a and the low-temperature side heat medium flowing through the heat medium passage 20b. The chiller 20 cools the low-temperature side heat medium by evaporating the low-pressure refrigerant to exert an endothermic action.

The other inflow port side of the sixth refrigerant joint part 13f is connected to the outlet of the refrigerant passage 20a of the chiller 20. Therefore, the indoor evaporator 18 and the chiller 20 are connected in parallel for the flow of the refrigerant moving from the fifth refrigerant joint part 13e to the sixth refrigerant joint part 13f. The other inflow port side of the fourth refrigerant joint part 13d is connected to the outflow port of the sixth refrigerant joint part 13f.

The inlet side of an accumulator 21 is connected to the outflow port of the fourth refrigerant joint part 13d. The accumulator 21 is a low-pressure side gas-liquid separator that separates the gas and liquid of the refrigerant having flowed into its inside and stores a surplus liquid-phase refrigerant in the cycle. The suction port side of the compressor 11 is connected to the gas-phase refrigerant outlet of the accumulator 21.

Next, the high-temperature side heat medium circuit 40 will be described. The high-temperature side heat medium circuit 40 is a circuit that circulates the high-temperature side heat medium. In the high-temperature side heat medium circuit 40, an ethylene glycol aqueous solution is adopted as the high-temperature side heat medium. In the high-temperature side heat medium circuit 40, the heat medium passage 12b of the water-refrigerant heat exchanger 12, a high-temperature side pump 41, a heater core 42, and the like are disposed.

The high-temperature side pump 41 is a high-temperature side heat medium pressure-feeding part that sucks and pressure-feeds the high-temperature side heat medium. The high-temperature side pump 41 pressure-feeds the high-temperature side heat medium to the inlet side of the heat medium passage 12b of the water-refrigerant heat exchanger 12. The high-temperature side pump 41 is an electric water pump whose number of rotation (i.e., pressure-feeding capability) is controlled by a control voltage output from control device 60.

The heat medium inlet side of the heater core 42 is connected to the outlet of the heat medium passage 12b of the water-refrigerant heat exchanger 12. The heater core 42 is disposed in the air conditioning case 31 of the indoor air conditioning unit 30. The heater core 42 is a heating heat exchange part that exchanges heat between the high-temperature side heat medium heated by the water-refrigerant heat exchanger 12 and the ventilation air. In the heater core 42, the heat of the high-temperature side heat medium is dissipated to the ventilation air to heat the ventilation air. The suction port side of the high-temperature side pump 41 is connected to the heat medium outlet of the heater core 42.

Therefore, in the present embodiment, the respective components of the water-refrigerant heat exchanger 12 and the high-temperature side heat medium circuit form a heating part that heats the ventilation air using the high-pressure refrigerant discharged from the compressor 11 as a heat source.

Next, the low-temperature side heat medium circuit 50 will be described. The low-temperature side heat medium circuit 50 is a circuit that circulates the low-temperature side heat medium. The low-temperature side heat medium is a heat medium to be heated by a heat generating part to be described later. In the low-temperature side heat medium circuit 50, the same kind of fluid as the high-temperature side heat medium is adopted as the low-temperature side heat medium. The low-temperature side heat medium circuit 50 is formed so as to be able to switch the heat medium circuit according to various operation modes to be described later.

In the low-temperature side heat medium circuit 50, a first low-temperature side pump 51a, a second low-temperature side pump 51b, a first low-temperature side three-way valve 52a, a second low-temperature side three-way valve 52b, the heat medium passage 20b of the chiller 20, a cooling water passage 80a of the battery 80, a cooling water passage 81a of the strong current device 81, an electric heater 54, a battery bypass passage 55a, a low-temperature side radiator 56, and the like are disposed.

The first low-temperature side pump 51a and the second low-temperature side pump 51b are low-temperature side heat medium pressure-feeding parts that suck and pressure-feed the low-temperature side heat medium. The basic configurations of the first low-temperature side pump 51a and the second low-temperature side pump 51b are similar to that of the high-temperature side pump 41. The first low-temperature side pump 51a pressure-feeds the low-temperature side heat medium to the inlet side of the cooling water passage 80a of the battery 80.

The cooling water passage 80a of the battery 80 is a battery side heat exchange part that exchanges heat between the plurality of battery cells and the low-temperature side heat medium. The cooling water passage 80a of the battery 80 houses the plurality of battery cells and is formed in a battery case forming the outer shell of the battery 80.

The inflow port side of the first low-temperature side three-way valve 52a is connected to the outlet of the cooling water passage 80a of the battery 80. The first low-temperature side three-way valve 52a is a three-way type flow regulating valve. The first low-temperature side three-way valve 52a causes the low-temperature side heat medium flowing out of the cooling water passage 80a of the battery 80 to flow into its inside, and causes the low-temperature side heat medium to flow out to at least one of one inflow port side of the first heat medium joint part 53a and the battery bypass passage 55a side.

The first low-temperature side three-way valve 52a can continuously adjust the flow ratio between the flow rate of the low-temperature side heat medium that is caused to flow out to the first heat medium joint part 53a side and the flow rate of the low-temperature side heat medium that is caused to flow out to the battery bypass passage 55a side. Furthermore, by adjusting the flow ratio, the first low-temperature side three-way valve 52a can cause the total flow rate of the low-temperature side heat medium that has been caused to flow into its inside to flow out to one of the first heat medium joint part 53a side and the battery bypass passage 55a side.

That is, the first low-temperature side three-way valve 52a serves as a heat medium circuit switching part that switches the circuit configuration of the heat medium circuit. The operation of the first low-temperature side three-way valve 52a is controlled by a control signal output from the control device 60.

The second low-temperature side three-way valve 52b is further disposed in the low-temperature side heat medium circuit 50. The basic configurations of the second low-temperature side three-way valve 52b and a heat medium circuit three-way valve adopted in an embodiment to be described later are similar to that of the first low-temperature side three-way valve 52a. Therefore, the second low-temperature side three-way valve 52b and the like also serve as the heat medium circuit switching part.

The first heat medium joint part 53a is a heat medium three-way joint. The low-temperature side heat medium circuit 50 of the present embodiment further includes a second heat medium joint part 53b to a fourth heat medium joint part 53d, as described later. The basic configurations of the first heat medium joint part 53a to the fourth heat medium joint part 53d and a heat medium joint part adopted in an embodiment to be described later are similar to those of the first refrigerant joint part 13a and the like of the heat pump cycle 10.

The inlet side of the electric heater 54 is connected to the outflow port of the first heat medium joint part 53a. Therefore, the first low-temperature side three-way valve 52a substantially causes the low-temperature side heat medium having flowed into its inside to flow out to at least one of the electric heater 54 side and the battery bypass passage 55a side.

The battery bypass passage 55a forms a heat medium flow path that guides the low-temperature side heat medium flowing out of the cooling water passage 80a of the battery 80 to the suction port side of the first low-temperature side pump 51a while causing the heat medium to bypass the electric heater 54, the heat medium passage of the chiller 20, and the like. One inflow port of the second heat medium joint part 53b is connected to the outlet portion of the battery bypass passage 55a. The suction port side of the first low-temperature side pump 51a is connected to the outflow port of the second heat medium joint part 53b.

The second low-temperature side pump 51b pressure-feeds the low-temperature side heat medium to the inlet side of the cooling water passage 81a of the strong current device 81. The cooling water passage 81a of the strong current device 81 is a strong current device side heat exchange part that exchanges heat between the strong current device 81 and the low-temperature side heat medium. The cooling water passage 81a of the strong current device 81 is formed in a housing part or a case part, which forms the outer shell of the strong current device 81.

The inflow port side of the second low-temperature side three-way valve 52b is connected to the outlet of the cooling water passage 81a of the strong current device 81. The second low-temperature side three-way valve 52b causes the low-temperature side heat medium flowing out of the cooling water passage 81a of the strong current device 81 to flow into its inside, and causes the low-temperature side heat medium to flow out to at least one of the other inflow port side of the first heat medium joint part 53a and the low-temperature side radiator 56 side.

Therefore, the second low-temperature side three-way valve 52b substantially causes the low-temperature side heat medium having flowed into its inside to flow out to at least one of the electric heater 54 side and the low-temperature side radiator 56 side.

The second low-temperature side three-way valve 52b can continuously adjust the flow ratio between the flow rate of the low-temperature side heat medium that is caused to flow out to the electric heater 54 side and the flow rate of the low-temperature side heat medium that is caused to flow out to the low-temperature side radiator 56 side. Furthermore, by adjusting the flow ratio, the second low-temperature side three-way valve 52b can cause the total flow rate of the low-temperature side heat medium that has been caused to flow into its inside to flow out to one of the electric heater 54 side and the battery bypass passage 55a side.

The low-temperature side radiator 56 is a low-temperature side outside air heat exchange part that exchanges heat between the outside air and the low-temperature side heat medium flowing out of the second low-temperature side three-way valve 52b. The low-temperature side radiator 56 is disposed on the front side of the drive device room, together with the outdoor heat exchanger 16 of the heat pump cycle 10.

One inflow port side of the third heat medium joint part 53c is connected to the heat medium outlet of the low-temperature side radiator 56. The suction port side of the second low-temperature side pump 51b is connected to the outflow port of the third heat medium joint part 53c.

The electric heater 54 is a heat generating part that generates heat for heating the low-temperature side heat medium. In the present embodiment, a PTC heater having a PTC element (i.e., a positive characteristic thermistor) that generates heat by being supplied with electric power and heats the low-temperature side heat medium flowing through a heating flow path is adopted as the electric heater 54. The inlet side of the heat medium passage 20b of the chiller 20 is connected to the outlet of the heating heat medium flow path of the electric heater 54.

The inflow port side of the fourth heat medium joint part 53d is connected to the outlet of the heat medium passage 20b of the chiller 20. The other inflow port side of the second heat medium joint part 53b is connected to one outflow port of the fourth heat medium joint part 53d. The other inflow port side of the third heat medium joint part 53c is connected to the other outflow port of the fourth heat medium joint part 53d.

As is apparent from the above description, the high-temperature side heat medium circuit 40 and low-temperature side heat medium circuit 50 of the present embodiment are formed as completely independent heat medium circuits. Therefore, the high-temperature side heat medium and the low-temperature side heat medium are not mixed. In addition, the electric heater 54, the heat generating part, is disposed only in the low-temperature side heat medium circuit 50. In the high-temperature side heat medium circuit 40, only the water-refrigerant heat exchanger 12 is disposed as a configuration for heating the high-temperature side heat medium.

Next, the indoor air conditioning unit 30 will be described. The indoor air conditioning unit 30 is a unit in which a plurality of components are integrated in order to blow out the ventilation air, the temperature of which has been adjusted to an appropriate temperature for air conditioning the vehicle interior, to an appropriate place in the vehicle interior. The indoor air conditioning unit 30 is disposed inside an instrument panel at the forefront of the vehicle interior.

As illustrated in FIG. 1, the indoor air conditioning unit 30 houses an indoor blower 32, the indoor evaporator 18, the heater core 42, and the like in the air conditioning case 31 forming an air passage for the ventilation air. The air conditioning case 31 is made of resin (e.g., polypropylene) having a certain degree of elasticity and excellent strength.

An inside/outside air switching device 33 is disposed on the most upstream side, in the ventilation air flow, of the air conditioning case 31. The inside/outside air switching device 33 introduces, in a switching manner, the inside air (i.e., vehicle interior air) and the outside air (i.e., vehicle exterior air) into the air conditioning case 31. The operation of the inside/outside air switching device 33 is controlled by a control signal output from the control device 60.

The indoor blower 32 is disposed on the downstream side, in the ventilation air flow, of the inside/outside air switching device 33. The indoor blower 32 blows the air sucked via the inside/outside air switching device 33 toward the vehicle interior. The indoor blower 32 is an electric blower that drives a centrifugal multi-blade fan with an electric motor. The number of rotation (i.e., blowing capability) of the indoor blower 32 is controlled by a control voltage output from the control device 60.

The indoor evaporator 18 and the heater core 42 are disposed on the downstream side, in the ventilation air flow, of the indoor blower 32. The indoor evaporator 18 is disposed on the upstream side, in the ventilation air flow, of the heater core 42. In the air conditioning case 31, a cold air bypass passage 35, that causes the ventilation air having passed through the indoor evaporator 18 to flow while bypassing the heater core 42, is formed.

In the air conditioning case 31, an air mix door 34 is disposed on the downstream side, in the ventilation air flow, of the indoor evaporator 18 and on the upstream side, in the ventilation air flow, of the heater core 42 and the cold air bypass passage 35.

The air mix door 34 is an air volume ratio adjuster that adjusts the air volume ratio between, of the ventilation air having passed through the indoor evaporator 18, the air volume of the ventilation air that is caused to pass through the heater core 42 side and the air volume of the ventilation air that is caused to pass through the cold air bypass passage 35. The air mix door 34 is driven by an air mix door electric actuator. The operation of the air mix door electric actuator is controlled by a control signal output from the control device 60.

A mixing space 36 is disposed on the downstream side, in the ventilation air flow, of the heater core 42 and the cold air bypass passage 35. The mixing space 36 is a space for mixing the ventilation air heated by the heater core 42 and the ventilation air having passed through the cold air bypass passage 35 and not heated. Therefore, in the indoor air conditioning unit 30, the temperature of the ventilation air (i.e., conditioned air) mixed in the mixing space 36 can be adjusted by adjusting the opening degree of the air mix door 34.

A plurality of opening holes (not illustrated) for blowing out the ventilation air mixed in the mixing space 36 into the vehicle interior are formed in the most downstream portion, in the ventilation air flow, of the air conditioning case 31. The plurality of opening holes communicate with a plurality of blowing-out ports formed in the vehicle interior. As the plurality of blowing-out ports, a face blowing-out port, a foot blowing-out port, and a defroster blowing-out port are provided.

The face blowing-out port is a blowing-out port for blowing out the ventilation air toward the upper body of an occupant. The foot blowing-out port is a blowing-out port for blowing out the ventilation air toward the feet of an occupant. The defroster blowing-out port is a blowing-out port for blowing out the ventilation air toward the vehicle front window glass.

A blowing-out mode door (not illustrated) is disposed in each of the plurality of opening holes. The blowing-out mode door opens and closes each of the opening holes. The blowing-out mode door is driven by a blowing-out mode door electric actuator. The operation of the blowing-out mode door electric actuator is controlled by a control signal output from the control device 60.

Therefore, in the indoor air conditioning unit 30, it is possible to change the place in the vehicle interior to which the conditioned air is to be blown out by switching the opening hole to be opened by the blowing-our mode door.

Next, the outline of an electric control unit of the present embodiment will be described. The control device 60 includes a known microcomputer including a CPU, a ROM, a RAM, and the like, and peripheral circuits thereof. The control device 60 performs various calculations and processing on the basis of control programs stored in the ROM, and controls the operations of the various control target devices 11, 14a to 14c, 15a, 15b, 32 to 34, 41, 51a, 51b, 52a, 52b, 54, and the like connected to the output side thereof.

Figure 2:
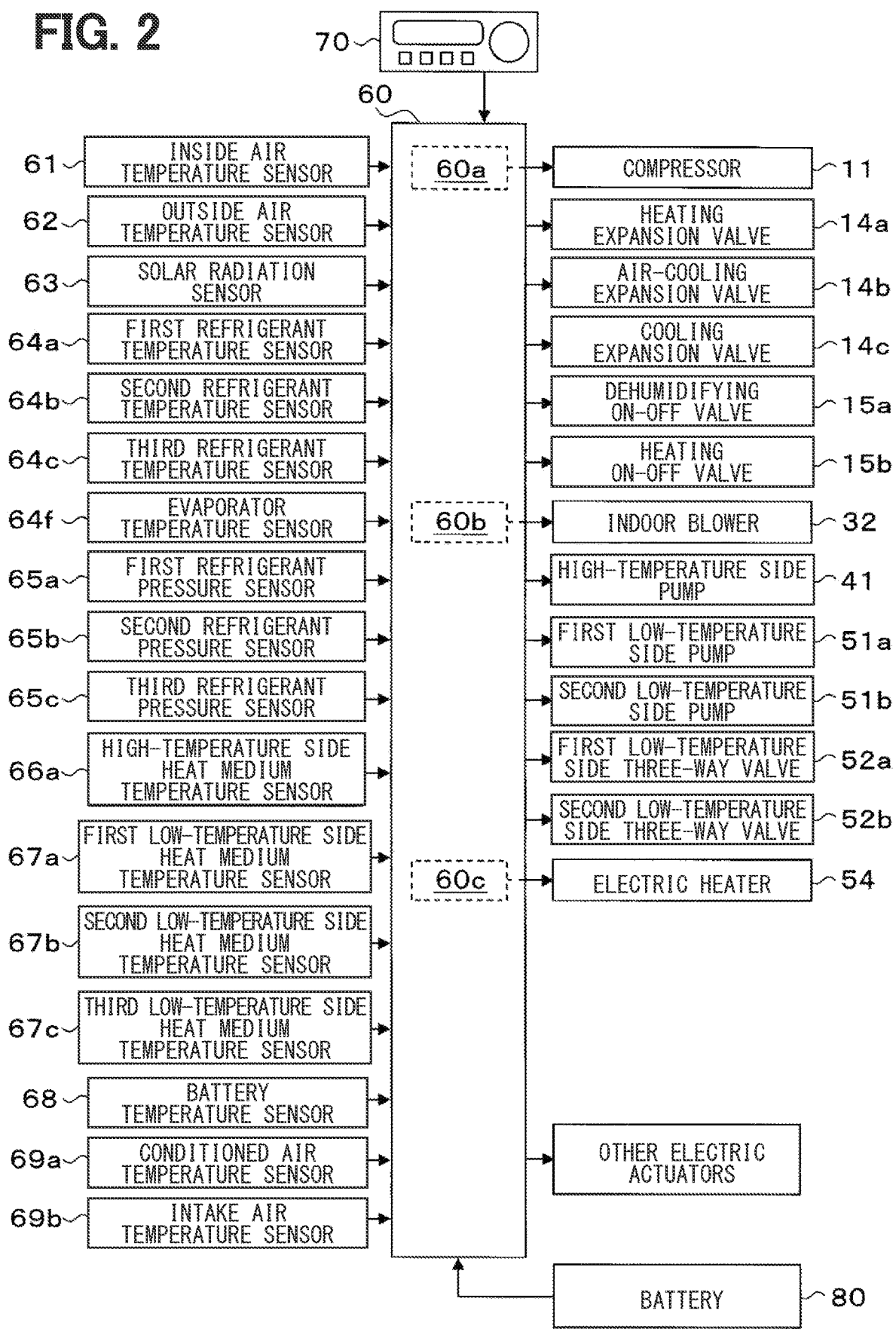
FIG. 2 is a block diagram illustrating an electric control unit of the air conditioner of the first embodiment.

As illustrated in the block diagram of FIG. 2, an inside air temperature sensor 61, an outside air temperature sensor 62, a solar radiation sensor 63, a first refrigerant temperature sensor 64a to a third refrigerant temperature sensor 64c, an evaporator temperature sensor 64f, a first refrigerant pressure sensor 65a to a third refrigerant pressure sensor 65c, a high-temperature side heat medium temperature sensor 66a, a first low-temperature side heat medium temperature sensor 67a to a third low-temperature side heat medium temperature sensor 67c, a battery temperature sensor 68, a conditioned air temperature sensor 69a, an intake air temperature sensor 69b, and the like are connected to the input side of the control device 60. Then, detection signals of these sensor groups are input to the control device 60.

The inside air temperature sensor 61 is an inside air temperature detector that detects a vehicle interior temperature (inside air temperature) Tr. The outside air temperature sensor 62 is an outside air temperature detector that detects a vehicle exterior temperature (outside air temperature) Tam. The solar radiation sensor 63 is a solar radiation amount detector that detects a solar radiation amount As with which the vehicle interior is irradiated.

The first refrigerant temperature sensor 64a is a first refrigerant temperature detector that detects a first refrigerant temperature TR1 that is the temperature of the refrigerant discharged from the compressor 11. The second refrigerant temperature sensor 64b is a second refrigerant temperature detector that detects a second refrigerant temperature TR2 that is the temperature of the refrigerant flowing out of the refrigerant passage 12a of the water-refrigerant heat exchanger 12. The third refrigerant temperature sensor 64c is a third refrigerant temperature detector that detects a third refrigerant temperature TR3 that is the temperature of the refrigerant flowing out of the outdoor heat exchanger 16.

The evaporator temperature sensor 64f is an evaporator temperature detector that detects a refrigerant evaporating temperature (evaporator temperature) Tefin in the indoor evaporator 18. Specifically, the evaporator temperature sensor 64f of the present embodiment detects a heat exchange fin temperature of the indoor evaporator 18.

The first refrigerant pressure sensor 65a is a first refrigerant pressure detector that detects a first refrigerant pressure PR1 that is the pressure of the refrigerant discharged from the compressor 11. The second refrigerant pressure sensor 65b is a second refrigerant pressure detector that detects a second refrigerant pressure PR2 that is the pressure of the refrigerant flowing out of the refrigerant passage 12a of the water-refrigerant heat exchanger 12. The third refrigerant pressure sensor 65c is a third refrigerant pressure detector that detects a third refrigerant pressure PR3 that is the pressure of the refrigerant flowing out of the outdoor heat exchanger 16.

The high-temperature side heat medium temperature sensor 66a is a high-temperature side heat medium temperature detector that detects a high-temperature side heat medium temperature TWH that is the temperature of the high-temperature side heat medium to flow into the heater core 42.

The first low-temperature side heat medium temperature sensor 67a is a first low-temperature side heat medium temperature detector that detects a first low-temperature side heat medium temperature TWL1 that is the temperature of the low-temperature side heat medium that has been pressure-fed from the first low-temperature side pump 51a and flows into the cooling water passage 80a of the battery 80.

The second low-temperature side heat medium temperature sensor 67b is a second low-temperature side heat medium temperature detector that detects a second low-temperature side heat medium temperature TWL2 that is the temperature of the low-temperature side heat medium that has been pressure-fed from the second low-temperature side pump 51b and flows into the cooling water passage 81a of the strong current device 81.

The third low-temperature side heat medium temperature sensor 67c is a chiller inlet side heat medium temperature detector that detects an inlet side heat medium temperature TWin that is the temperature of the low-temperature side heat medium to flow into the heat medium passage 20b of the chiller 20.

The battery temperature sensor 68 is a battery temperature detector that detects a battery temperature TB (i.e., the temperature of the battery 80). The battery temperature sensor 68 of the present embodiment includes a plurality of temperature sensors, and detects temperatures at a plurality of places in the battery 80. Therefore, the control device 60 can detect a temperature difference between the respective battery cells forming the battery 80. As the battery temperature TB, an average of the detected values of the plurality of temperature sensors is adopted.

The conditioned air temperature sensor 69a is a conditioned air temperature detector that detects a ventilation air temperature TAV that is the temperature of the ventilation air to be blown into the vehicle interior from the mixing space 36. The intake air temperature sensor 69b is an intake air temperature detector that detects an intake air temperature TAin that is the temperature of the ventilation air to flow into the heater core 42.

As illustrated in FIG. 2, an air conditioning operation panel 70 is connected to the input side of the control device 60. The air conditioning operation panel 70 is disposed near the instrument panel in the front part of the vehicle interior. Operation signals from various operation switches provided on the air conditioning operation panel 70 are input to the control device 60.

Specific examples of the various operation switches provided on the air conditioning operation panel 70 include an auto switch, an air conditioner switch, an air volume setting switch, and a temperature setting switch.

The auto switch is an operation part for a user to set or cancel the automatic control operation of vehicle interior air conditioning. The air conditioner switch is an operation part for a user to request the indoor evaporator 18 to cool the ventilation air. The air volume setting switch is an operation part for a user to manually set the air volume of the indoor blower 32. The temperature setting switch is an operation part for a user to set a set temperature Tset of the vehicle interior.

In the control device 60 of the present embodiment, control units for controlling the various control target devices connected to the output sides of the control units are integrally formed. In the control device 60, a configuration (hardware and software) for controlling the operation of each of the control target devices constitutes the control unit that controls the operation of each of the control target devices.

For example, in the control device 60, a configuration for controlling the refrigerant discharge capability of the compressor 11 (specifically, the number of rotation of the compressor 11) constitutes a discharge capability control unit 60a. A configuration for controlling the blowing capability of the indoor blower 32 (specifically, the number of rotation of the indoor blower 32) constitutes a blowing capability control unit 60b. A configuration for controlling the heating capability of the electric heater 54 constitutes a heat generation capability control unit 60c.

Next, the operation of the air conditioner 1 having the above configuration will be described. As described above, the air conditioner 1 can perform air conditioning of the vehicle interior and adjust the temperatures of the in-vehicle devices. Therefore, in the air conditioner 1, various operation modes are executed by switching the circuit configuration of the heat pump cycle 10 and the circuit configuration of the low-temperature side heat medium circuit 50.

The operation modes of the air conditioner 1 include an operation mode for air conditioning the vehicle interior and an operation mode for adjusting the temperatures of the in-vehicle devices. In the air conditioner 1, the air conditioning operation mode and the temperature adjusting operation mode can be appropriately combined and executed.

Therefore, in the air conditioner 1, the vehicle interior can only be air conditioned without the temperatures of the in-vehicle devices adjusted. In addition, the temperatures of the in-vehicle devices can be adjusted without the vehicle interior air conditioned. In addition, the vehicle interior can be air conditioned, and simultaneously the temperatures of the in-vehicle devices can be adjusted.

First, the air conditioning operation mode will be described. The air conditioning operation mode in the present embodiment includes (A1) an air-cooling mode, (A2) a series dehumidifying-heating mode, (A3) a parallel dehumidifying-heating mode, and (A4) a heating mode.

(A1) The air-cooling mode is an operation mode for cooling the vehicle interior by cooling the ventilation air and blowing out it into the vehicle interior.

(A2) The series dehumidifying-heating mode is an operation mode for dehumidifying and heating the vehicle interior by reheating the cooled and dehumidified ventilation air and blowing out it into the vehicle interior.

(A3) The parallel dehumidifying-heating mode is an operation mode for dehumidifying and heating the vehicle interior by reheating the cooled and dehumidified ventilation air with higher heating capability than that in the series dehumidifying-heating mode and blowing out it into the vehicle interior.

(A4) The heating mode is an operation mode for heating the vehicle interior by heating the ventilation air and blowing out it into the vehicle interior.

Switching between the air conditioning operation modes is performed with an air conditioning control program stored in the control device 60 executed. The air conditioning control program is executed when the auto switch on the operation panel 70 is turned on and the automatic control operation of the in-vehicle air conditioning is set.

In the main routine of the air conditioning control program, the detection signals of the sensor groups and the operation signals of the operation switches on the operation panel 70, which have been described above, are read at predetermined periods. Then, based on the values of the read detection signals and operation signals, a target blowing-out temperature TAO, which is a target temperature of the air to be blown out into the vehicle interior, is calculated.

More specifically, the target blowing-out temperature TAO is calculated using the following mathematical expression F1.

$$TAO = Kset \times Tset - Kr \times Tr - Kam \times Tam - Ks \times As + C \quad (F1)$$

Where, Tset is a vehicle interior set temperature set by the temperature setting switch on the operation panel 70. Tr is the inside air temperature detected by the inside air temperature sensor 61. Tam is the outside air temperature detected by the outside air temperature sensor 62. As is the solar radiation amount detected by the solar radiation sensor 63. Kset, Kr, Kam, and Ks are control gains, and C is a constant for correction.

When the target blowing-out temperature TAO is lower than a predetermined air-cooling target heat medium temperature KTAO1 in a state in which the air conditioner switch on the operation panel 70 is turned on, the air conditioning operation mode is switched to the air-cooling mode.

When the target blowing-out temperature TAO is equal to or higher than the air-cooling target heat medium temperature KTAO1 and the outside air temperature Tam is higher than a predetermined dehumidifying-heating target heat medium temperature KTAO2 in a state in which the air conditioner switch is turned on, the air conditioning operation mode is switched to the series dehumidifying-heating mode.

When the target blowing-out temperature TAO is equal to or higher than the air-cooling target heat medium temperature KTAO1 and the outside air temperature Tam is equal to or lower than the dehumidifying-heating target heat medium temperature KTAO2 in a state in which the air conditioner switch is turned on, the air conditioning operation mode is switched to the parallel dehumidifying-heating mode.

When the air-cooling switch of the air conditioner switch is not turned on, the air conditioning operation mode is switched to the heating mode.

Therefore, the air-cooling mode is executed mainly in a case where the outside air temperature is relatively high like in summer. The series dehumidifying-heating mode is executed mainly in spring or autumn. The parallel dehumidifying-heating mode is executed mainly in a case where the ventilation air needs to be heated with higher heating capability than in the series dehumidifying-heating mode, like in early spring or late autumn. The heating mode is executed mainly when the outside air temperature is low in winter. Hereinafter, detailed operation of each air conditioning operation mode will be described.

(A1) Air-Cooling Mode

In the air-cooling mode, the control device 60 brings the heating expansion valve 14a into a fully opened state and brings the air-cooling expansion valve 14b into a throttled state in which a refrigerant pressure-reducing action is exerted. The cooling expansion valve 14c is controlled according to the temperature adjusting operation mode. The same applies to the other air conditioning operation modes. In addition, the control device 60 closes the dehumidifying on-off valve 15a and closes the heating on-off valve 15b.

Therefore, in the heat pump cycle 10 in the air-cooling mode, a refrigerant circuit is switched to, in which the refrigerant discharged from the compressor 11 circulates in the order of the water-refrigerant heat exchanger 12, the heating expansion valve 14a in a fully opened state, the outdoor heat exchanger 16, the air-cooling expansion valve 14b, the indoor evaporator 18, the accumulator 21, and the suction port of the compressor 11.

Furthermore, the control device 60 appropriately controls the operations of the other control target devices. For example, the control device 60 controls the number of rotation of the compressor 11 such that the evaporator temperature Tefin detected by the evaporator temperature sensor 64f approaches a target evaporator temperature TEO. The target evaporator temperature TEO is determined based on the target blowing-out temperature TAO and with reference to a control map stored in advance in the control device 60.

The control device 60 controls the throttle opening degree of the air-cooling expansion valve 14b such that the super-cooling degree SC3 of the refrigerant to flow into the air-cooling expansion valve 14b approaches a target super-cooling degree SCO3.

The super-cooling degree SC3 of the refrigerant to flow into the air-cooling expansion valve 14b is calculated using the third refrigerant temperature TR3 detected by the third refrigerant temperature sensor 64c and the third refrigerant pressure PR3 detected by the third refrigerant pressure sensor 65c. The target super-cooling degree SCO3 is determined based on the outside air temperature Tam and with reference to the control map stored in advance in the control device 60 such that a coefficient of performance (COP) of the cycle approaches the maximum value.

In addition, the control device 60 controls the high-temperature side pump 41 so as to exert predetermined pressure-feeding capability.

Therefore, in the high-temperature side heat medium circuit 40 in the air-cooling mode, the high-temperature side heat medium pressure-fed from the high-temperature side pump 41 circulates in the order of the heat medium passage 12b of the water-refrigerant heat exchanger 12, the heater core 42, and the suction port of the high-temperature side pump 41.

The control device 60 determines the number of rotation of the indoor blower 32 so as to approach a target blowing capability determined by the blowing capability control unit 60b. Therefore, the blowing capability control unit 60b is a target blowing capability determination unit. More specifically, the blowing capability control unit 60b determines the number of rotation thereof on the basis of the target blowing-out temperature TAO and with reference to the control map stored in advance in the control device 60.

In the control map for the indoor blower 32, it is determined such that, when the target blowing-out temperature TAO is in an extremely low temperature range (i.e., at the time of the maximum air-cooling) or an extremely high temperature range (i.e., at the time of the maximum heating), the blowing capability is maximum. Furthermore, it is determined such that, as the target blowing-out temperature TAO moves from the extremely low temperature range or the extremely high temperature range to an intermediate temperature range, the blowing capability is reduced. Then, it is determined such that, when the target blowing-out temperature TAO is in the intermediate temperature range, the blowing capability is minimum.

The control device 60 controls the opening degree of the air mix door 34 such that the ventilation air temperature TAV detected by the conditioned air temperature sensor 69a approaches the target blown-out temperature TAO. In addition, the control device 60 determines the opening/closing operation of the blowing-out mode door on the basis of the target blowing-out temperature TAO and with reference to the control map stored in advance in the control device 60.

Therefore, in the heat pump cycle 10 in the air-cooling mode, a vapor compression type refrigeration cycle is formed in which the water-refrigerant heat exchanger 12 and the outdoor heat exchanger 16 are caused to function as condensers (in other words, radiators) that dissipate the heat of the refrigerant and condense the refrigerant, and the indoor evaporator 18 is caused to function as an evaporator that evaporates the refrigerant.

As a result, in the heat pump cycle 10 in the air-cooling mode, the high-temperature side heat medium is heated by the water-refrigerant heat exchanger 12. Furthermore, the ventilation air is cooled by the indoor evaporator 18.

In the high-temperature side heat medium circuit 40 of the air-cooling mode, the heat medium heated by the water-refrigerant heat exchanger 12 is supplied to the heater core 42.

In the indoor air conditioning unit 30 in the air-cooling mode, the ventilation air blown from the indoor blower 32 is cooled by the indoor evaporator 18. The temperature of the ventilation air cooled by the indoor evaporator 18 is adjusted so as to approach the target blowing-out temperature TAO by adjusting the opening degree of the air mix door 34. Then, when the ventilation air whose temperature has been adjusted is blown into the vehicle interior, the air-cooling of the vehicle interior is realized.

(A2) Series Dehumidifying-Heating Mode

In the series dehumidifying-heating mode, the control device 60 brings the heating expansion valve 14a into a throttled state, and brings the air-cooling expansion valve 14b into a throttled state. In addition, the control device 60 closes the dehumidifying on-off valve 15a and closes the heating on-off valve 15b.

Therefore, in the heat pump cycle 10 in the series dehumidifying-heating mode, a refrigerant circuit is switched to, in which the refrigerant discharged from the compressor 11 circulates in the order of the water-refrigerant heat exchanger 12, the heating expansion valve 14a, the outdoor heat exchanger 16, the air-cooling expansion valve 14b, the indoor evaporator 18, the accumulator 21, and the suction port of the compressor 11.

Furthermore, the control device 60 appropriately controls the operations of the other control target devices. For example, the control device 60 controls the compressor 11 similarly to the air-cooling mode.

Based on the target blowing-out temperature TAO and with reference to the control map stored in advance in the control device 60, the control device 60 determines the throttle opening degree of the heating expansion valve 14a and the throttle opening degree of the air-cooling expansion valve 14b such that the COP approaches the maximum value. In the control map for the series dehumidifying-heating mode, it is determined such that, as the target blowing-out temperature TAO rises, the throttle opening degree of the heating expansion valve 14a is reduced and the throttle opening degree of the air-cooling expansion valve 14b is increased.

Similarly to the air-cooling mode, the control device 60 controls the operations of the high-temperature side pump 41 and the like of the high-temperature side heat medium circuit 40. Similarly to the air-cooling mode, the control device 60 controls the operations of the indoor blower 32 and the like of the indoor air conditioning unit 30.

Therefore, in the heat pump cycle 10 in the series dehumidifying-heating mode, a vapor compression type refrigeration cycle is formed in which the water-refrigerant heat exchanger 12 is caused to function as a condenser and the indoor evaporator 18 is caused to function as an evaporator. Furthermore, when the saturation temperature of the refrigerant in the outdoor heat exchanger 16 is higher than the outside air temperature Tam, the outdoor heat exchanger 16 is caused to function as a condenser. When the saturation temperature of the refrigerant in the outdoor heat exchanger 16 is lower than the outside air temperature Tam, the outdoor heat exchanger 16 is caused to function as an evaporator.

As a result, in heat pump cycle 10 in the series dehumidifying-heating mode, the high-temperature side heat medium is heated by the water-refrigerant heat exchanger 12. Furthermore, the ventilation air is cooled by the indoor evaporator 18.

In the high-temperature side heat medium circuit 40 in the series dehumidifying-heating mode, the heat medium heated by the water-refrigerant heat exchanger 12 is supplied to the heater core 42.

In the indoor air conditioning unit 30 in the series dehumidifying-heating mode, the ventilation air blown from the indoor blower 32 is cooled and dehumidified by the indoor evaporator 18. The temperature of the ventilation air cooled and dehumidified by the indoor evaporator 18 is adjusted so as to approach the target blowing-out temperature TAO by adjusting the opening degree of the air mix door 34. Then, when the ventilation air whose temperature has been adjusted is blown out into the vehicle interior, the dehumidification and heating of the vehicle interior is realized.

Furthermore, in the heat pump cycle 10 in the series dehumidifying-heating mode, as the target blowing-out temperature TAO rises, the throttle opening degree of the heating expansion valve 14a is reduced and the throttle opening degree of the air-cooling expansion valve 14b is increased. According to this, the heating capability for the ventilation air in the heater core 42 can be improved as the target blowing-out temperature TAO rises.

More specifically, when the saturation temperature of the refrigerant in the outdoor heat exchanger 16 is higher than the outside air temperature Tam, the temperature difference between the saturation temperature of the refrigerant in the outdoor heat exchanger 16 and the outside air temperature Tam can be reduced as the target blowing-out temperature TAO rises. Therefore, as the target blowing-out temperature TAO rises, the amount of heat to be dissipated from the refrigerant to the outside air in the outdoor heat exchanger 16 can be reduced, and the amount of heat to be dissipated from the refrigerant to the heat medium in the water-refrigerant heat exchanger 12 can be increased.

When the saturation temperature of the refrigerant in the outdoor heat exchanger 16 is lower than the outside air temperature Tam, the temperature difference between the outside air temperature Tam and the refrigerant in the outdoor heat exchanger 16 can be increased as the target blowing-out temperature TAO rises. Therefore, as the target blowing-out temperature TAO rises, the amount of heat to be absorbed by the refrigerant from the outside air in the outdoor heat exchanger 16 can be increased, and the amount of heat to be dissipated from the refrigerant to the heat medium in the water-refrigerant heat exchanger 12 can be increased.

As a result, in the series dehumidifying-heating mode, the heating capability for the ventilation air in the heater core 42 can be improved as the target blowing-out temperature TAO rises.

(A3) Parallel Dehumidifying-Heating Mode

In the parallel dehumidifying-heating mode, the control device 60 brings the heating expansion valve 14a into a throttled state, and brings the air-cooling expansion valve 14b into a throttled state. In addition, the control device 60 opens the dehumidifying on-off valve 15a and opens the heating on-off valve 15b.

Therefore, in the heat pump cycle 10 in the parallel dehumidifying-heating mode, a refrigerant circuit is switched to, in which the refrigerant discharged from the compressor 11 circulates in the order of the water-refrigerant heat exchanger 12, the first refrigerant joint part 13a, the heating expansion valve 14a, the outdoor heat exchanger 16, the heating passage 22b, the accumulator 21, and the suction port of the compressor 11. At the same time, a refrigerant circuit is switched to, in which the refrigerant discharged from the compressor 11 circulates in the order of the water-refrigerant heat exchanger 12, the first refrigerant joint part 13a, the dehumidifying passage 22a, the air-cooling expansion valve 14b, the indoor evaporator 18, the accumulator 21, and the suction port of the compressor 11. That is, refrigerant circuits are switched to, in which the outdoor heat exchanger 16 and the indoor evaporator 18 are connected in parallel for the flow of the refrigerant.

Furthermore, the control device 60 appropriately controls the operations of the other control target devices. For example, the control device 60 controls the number of rotation of the compressor 11 such that the first refrigerant pressure PR1 detected by the first refrigerant pressure sensor 65a approaches a target condensation pressure PDO.

The target condensation pressure PDO is determined such that the high-temperature side heat medium temperature TWH detected by the high-temperature side heat medium temperature sensor 66a approaches a predetermined target high-temperature side heat medium temperature TWHO (in the present embodiment, about 50° C.). The target high-temperature side heat medium temperature TWHO is set such that, by the heater core 42 constituting the heating part, the temperature of the ventilation air can be raised to a temperature at which sufficient heating of the vehicle interior can be realized.

Based on the target blowing-out temperature TAO and with reference to the control map stored in advance in the control device 60, the control device 60 determines the throttle opening degree of the heating expansion valve 14a and the throttle opening degree of the air-cooling expansion valve 14b such that the COP approaches the maximum value. In the control map in the parallel dehumidifying-heating mode, it is determined such that, as the target blowing-out temperature TAO rises, the throttle opening degree of the heating expansion valve 14a is reduced and the throttle opening degree of the air-cooling expansion valve 14b is increased.

Similarly to the air-cooling mode, the control device 60 controls the operations of the high-temperature side pump 41 and the like of the high-temperature side heat medium circuit 40. Similarly to the air-cooling mode, the control device 60 controls the operations of the indoor blower 32 and the like of the indoor air conditioning unit 30.

Therefore, in the heat pump cycle 10 in the parallel dehumidifying-heating mode, a vapor compression type refrigeration cycle is formed in which the water-refrigerant heat exchanger 12 is caused to function as a condenser and the outdoor heat exchanger 16 and the indoor evaporator 18 are caused to function as evaporators. As a result, in heat pump cycle 10 in the parallel dehumidifying-heating mode, the high-temperature side heat medium is heated by the water-refrigerant heat exchanger 12. Furthermore, the ventilation air is cooled by the indoor evaporator 18.

In the high-temperature side heat medium circuit 40 in the parallel dehumidifying-heating mode, the heat medium heated by the water-refrigerant heat exchanger 12 is supplied to the heater core 42.

In the indoor air conditioning unit 30 in the parallel dehumidifying-heating mode, the ventilation air blown from the indoor blower 32 is cooled and dehumidified by the indoor evaporator 18. The temperature of the ventilation air cooled and dehumidified by the indoor evaporator 18 is adjusted so as to approach the target blowing-out temperature TAO by adjusting the opening degree of the air mix door 34. Then, when the ventilation air whose temperature has been adjusted is blown out into the vehicle interior, the dehumidification and heating of the vehicle interior is realized.

Furthermore, in the heat pump cycle 10 in the parallel dehumidifying-heating mode, the throttle opening degree of the heating expansion valve 14a can be made smaller than the throttle opening degree of the air-cooling expansion valve 14b. According to this, the refrigerant evaporating temperature in the outdoor heat exchanger 16 can be lowered to a temperature lower than the refrigerant evaporating temperature in the indoor evaporator 18.

Therefore, in the parallel dehumidifying-heating mode, the amount of heat to be absorbed by the refrigerant from the outside air in the outdoor heat exchanger 16 can be increased more than in the series dehumidifying-heating mode, and the amount of heat to be dissipated from the refrigerant to the heat medium in the water-refrigerant heat exchanger 12 can be increased. As a result, in the parallel dehumidifying-heating mode, the heating capability for the ventilation air in the heater core 42 can be improved more than in the series dehumidifying-heating mode.

(A4) Heating Mode

In the heating mode, the control device 60 brings the heating expansion valve 14a into a throttled state, and brings the air-cooling expansion valve 14b into a fully closed state. In addition, the control device 60 closes the dehumidifying on-off valve 15a and opens the heating on-off valve 15b.

Therefore, in the heat pump cycle 10 in the heating mode, a refrigerant circuit is switched to, in which the refrigerant discharged from the compressor 11 circulates in the order of the water-refrigerant heat exchanger 12, the heating expansion valve 14a, the outdoor heat exchanger 16, the heating passage 22b, the accumulator 21, and the suction port of the compressor 11.

Furthermore, the control device 60 appropriately controls the operations of the other control target devices. For example, the control device 60 controls the compressor 11 similarly to the parallel dehumidifying-heating mode.

The control device 60 controls the throttle opening degree of the heating expansion valve 14a such that the super-cooling degree SC2 of the refrigerant to flow into the heating expansion valve 14a approaches a target super-cooling degree SCO2.

The super-cooling degree SC2 of the refrigerant to flow into the heating expansion valve 14a is calculated using the second refrigerant temperature TR2 detected by the second refrigerant temperature sensor 64b and the second refrigerant pressure PR2 detected by the second refrigerant pressure sensor 65b. Based on the second refrigerant temperature TR2 and with reference to the control map stored in advance in the control device 60, the target super-cooling degree SCO2 is determined such that the COP approaches the maximum value.

Similarly to the air-cooling mode, the control device 60 controls the operations of the high-temperature side pump 41 and the like of the high-temperature side heat medium circuit 40. Similarly to the air-cooling mode, the control device 60 controls the operations of the indoor blower 32 and the like of the indoor air conditioning unit 30.

Therefore, in the heat pump cycle 10 in the heating mode, a vapor compression type refrigeration cycle is formed in which the water-refrigerant heat exchanger 12 is caused to function as a condenser and the outdoor heat exchanger 16 is caused to function as an evaporator. As a result, in the heat pump cycle 10 in the heating mode, the high-temperature side heat medium is heated by the water-refrigerant heat exchanger 12.

In the high-temperature side heat medium circuit 40 in the heating mode, the heat medium heated by the water-refrigerant heat exchanger 12 is supplied to the heater core 42.

In the indoor air conditioning unit 30 in the heating mode, the ventilation air blown from the indoor blower 32 passes through the indoor evaporator 18. The temperature of the ventilation air having passed through the indoor evaporator 18 is adjusted so as to approach the target blowing-out temperature TAO by adjusting the opening degree of the air mix door 34. Then, when the ventilation air whose temperature has been adjusted is blown into the vehicle interior, the heating of the vehicle interior is realized.

Next, the temperature adjusting operation mode will be described. In the temperature adjusting operation mode, the temperatures of the battery 80 and the strong current device 81, the temperatures of which are to be adjusted, are adjusted.

In the present embodiment, the appropriate temperature zone of the battery is different from the appropriate temperature zone of the strong current device 81, as described above. Therefore, in the temperature adjusting operation mode, a battery operation mode for adjusting the temperature of the battery 80 and a strong current device operation mode for adjusting the temperature of the strong current device 81 are executed in combination.

The battery operation mode includes (B1) a battery warm-up mode, (B2) a battery temperature equalization mode, and (B3) a battery cooling mode.
- (B1) The battery warm-up mode is an operation mode in which the battery is warmed up by the low-temperature side heat medium heated by the electric heater 54.
- (B2) The battery temperature equalization mode is an operation mode in which the temperatures of the respective battery cells forming the battery 80 are equalized.
- (B3) The battery cooling mode is an operation mode in which the battery 80 is cooled by the heat medium cooled by the chiller 20.

The strong current device operation mode includes (C1) a strong current device warm-up mode, (C2) a strong current device waste heat recovery mode, and (C3) a strong current device cooling mode.
- (C1) The strong current device warm-up mode is an operation mode in which the strong current device 81 is warmed up by the low-temperature side heat medium heated by the electric heater 54.
- (C2) The strong current device waste heat recovery mode is an operation mode in which, in the chiller 20, the heat generated by the strong current device 81 is absorbed by the low-pressure refrigerant.
- (C3) The strong current device cooling mode is an operation mode in which the strong current device 81 is cooled by the heat medium cooled by the low-temperature side radiator 56.

Switching between the temperature adjusting operation modes is performed by executing a temperature adjusting control program stored in the control device 60. The temperature adjusting control program is also executed when the vehicle system is activated, when the battery 80 is charged from an external power supply, or the like, regardless of whether a user requests air conditioning of the vehicle interior.

In the temperature adjusting control program, the detection signals of the above-described sensor groups are read at predetermined periods. Then, the temperature adjusting operation mode is switched based on the read detection signal.

More specifically, in the temperature adjusting control program, the battery operation mode is switched based on the battery temperature TB detected by the battery temperature sensor 68 and with reference to the control map stored in advance in the control device 60. In the control map, as the battery temperature TB rises, switching is performed in the order of (B1) the battery warm-up mode, (B2) the battery temperature equalization mode, and (B3) the battery cooling mode.

In addition, in the temperature adjusting control program, the strong current device operation mode is switched based on the second low-temperature side heat medium temperature TWL2 detected by the second low-temperature side heat medium temperature sensor 67b and with reference to the control map stored in advance in the control device 60. In the control map, as the second low-temperature side heat medium temperature TWL2 rises, switching is performed in the order of (C1) the strong current device warm-up mode, (C2) the strong current device waste heat recovery mode, and (C3) the strong current device cooling mode.

However, when the battery operation mode and the strong current device operation mode cannot be simultaneously executed due to convenience of the circuit configuration of the low-temperature side heat medium circuit 50 or the like, priority is given to the battery operation mode. For example, when (B3) the battery cooling mode and (C1) the strong current device warm-up mode are simultaneously selected, (C1) the strong current device warm-up mode is not executed, but (B3) the battery cooling mode is executed. Hereinafter, detailed operation of each temperature adjusting operation mode will be described.

(B1) Battery Warm-Up Mode

In the battery warm-up mode, the control device 60 brings the cooling expansion valve 14c into a fully closed state. Therefore, in the battery warm-up mode, the refrigerant never flows into the chiller 20.

In addition, the control device 60 controls the operation of the first low-temperature side three-way valve 52a such that the low-temperature side heat medium flowing out of the cooling water passage 80a of the battery 80 is caused to flow out to the electric heater 54 side. In addition, the control device 60 controls the operation of the electric heater 54 so as to exert predetermined heating capability. In addition, the control device 60 controls the operation of the first low-temperature side pump 51a so as to exert predetermined pressure-feeding capability.

Therefore, in the low-temperature side heat medium circuit 50 in the battery warm-up mode, a circuit is switched to, in which the low-temperature side heat medium pressure-fed from the first low-temperature side pump 51a circulates in the order of the cooling water passage 80a of the battery 80, the electric heater 54, the heat medium passage 20b of the chiller 20, and the suction port of the first low-temperature side pump 51a.

Therefore, in the low-temperature side heat medium circuit 50 in the battery warm-up mode, the low-temperature side heat medium heated by the electric heater 54 is sucked into the first low-temperature side pump 51a. The low-temperature side heat medium pressure-fed from the first low-temperature side pump 51a flows into the cooling water passage 80a of the battery 80 and dissipates heat to each battery cell of the battery 80. As a result, the battery 80 is warmed up.

(B2) Battery Temperature Equalization Mode

In the battery temperature equalization mode, the control device 60 controls the operation of the first low-temperature side three-way valve 52a such that the low-temperature side heat medium flowing out of the cooling water passage 80a of the battery 80 is caused to flow out to the battery bypass passage 55a side. In addition, the control device 60 controls the operation of the first low-temperature side pump 51a so as to exert predetermined pressure-feeding capability.

Therefore, in the low-temperature side heat medium circuit 50 in the battery temperature equalization mode, a circuit is switched to, in which the low-temperature side heat medium pressure-fed from the first low-temperature side pump 51a circulates in the order of the cooling water passage 80a of the battery 80, the battery bypass passage 55a, and the suction port of the high-temperature side pump 41.

Therefore, in the low-temperature side heat medium circuit 50 in the battery temperature equalization mode, the temperatures of the respective battery cells forming the battery 80 are equalized when the low-temperature side heat medium pressure-fed from the first low-temperature side pump 51a flows through the cooling water passage 80a of the battery 80.

Here, the battery temperature equalization mode is an operation mode aimed to equalize the temperatures of the respective battery cells of the battery 80. Therefore, even if the battery temperature equalization mode is selected based on the battery temperature TB, the battery temperature equalization mode may be stopped when the temperature equalization of the battery 80 is not required. The case where the temperature equalization of the battery 80 is not required corresponds to a case where a temperature difference ΔTB between the temperatures of the respective battery cells is smaller than a predetermined target cell temperature difference ΔKTB, or the like.

(B3) Battery Cooling Mode

The battery cooling mode is an operation mode in which the battery 80 is cooled by the heat medium cooled by the chiller 20. Therefore, when the compressor 11 of the heat pump cycle 10 is operating as during air conditioning, the control device 60 brings the cooling expansion valve 14c of the heat pump cycle 10 into a throttled state. Furthermore, when the air conditioning operation mode is (A4) the heating mode, the control device 60 opens the dehumidifying on-off valve 15a and opens the heating on-off valve 15b.

Therefore, in the heat pump cycle 10 in the battery cooling mode, the low-pressure refrigerant whose pressure has been reduced by the cooling expansion valve 14c flows into the refrigerant passage 20a of the chiller 20. The refrigerant flowing out of the refrigerant passage 20a of the chiller 20 flows into the accumulator 21 via the sixth refrigerant joint part 13f and the fourth refrigerant joint part 13d.

Furthermore, when the battery cooling mode is executed during the execution of (A4) the heating mode, a refrigerant circuit is switched to, in which the refrigerant discharged from the compressor 11 circulates in the order of the water-refrigerant heat exchanger 12, the first refrigerant joint part 13a, the heating expansion valve 14a, the outdoor heat exchanger 16, the heating passage 22b, the accumulator 21, and the suction port of the compressor 11. At the same time, a refrigerant circuit is switched to, in which the refrigerant discharged from the compressor 11 circulates in the order of the water-refrigerant heat exchanger 12, the first refrigerant joint part 13a, the dehumidifying passage 22a, the cooling expansion valve 14c, the chiller 20, the accumulator 21, and the suction port of the compressor 11. That is, refrigerant circuits are switched to, in which the outdoor heat exchanger 16 and the chiller 20 are connected in parallel for the flow of the refrigerant.

Furthermore, the control device 60 appropriately controls the operations of the other control target devices. For example, the control device 60 controls the throttle opening degree of the cooling expansion valve 14c such that the first low-temperature side heat medium temperature TWL1 detected by the first low-temperature side heat medium temperature sensor 67a approaches a battery target temperature TWLO1. The battery target temperature TWLO1 is set such that the battery 80 can be appropriately operated.

In addition, the control device 60 controls the operation of the first low-temperature side three-way valve 52a such that the low-temperature side heat medium flowing out of the cooling water passage 80a of the battery 80 is caused to flow out to the electric heater 54 side. In addition, the control device 60 stops the supply of electric power to the electric heater 54. In addition, the control device 60 controls the operation of the first low-temperature side pump 51a so as to exert predetermined pressure-feeding capability.

Therefore, in the low-temperature side heat medium circuit 50 in the battery cooling mode, a circuit is switched to, in which the low-temperature side heat medium pressure-fed from the first low-temperature side pump 51a circulates in the order of the cooling water passage 80a of the battery 80, the electric heater 54, the heat medium passage 20b of the chiller 20, and the suction port of the first low-temperature side pump 51a.

Therefore, in the heat pump cycle 10 in the battery cooling mode during air conditioning, a vapor compression type refrigeration cycle is formed in which the water-refrigerant heat exchanger 12 or the outdoor heat exchanger 16 is caused to function as a condenser and at least the chiller 20 is caused to function as an evaporator. As a result, in the heat pump cycle 10 in the battery cooling mode during air conditioning, the low-temperature side heat medium is cooled by the chiller 20.

In the low-temperature side heat medium circuit 50, the low-temperature side heat medium cooled by the chiller 20 is sucked into the first low-temperature side pump 51a. The low-temperature side heat medium pressure-fed from the first low-temperature side pump 51a flows into the cooling water passage 80a of the battery 80, and absorbs heat from the respective battery cells of the battery 80. As a result, the battery 80 is cooled.

Next, the battery cooling mode during non-air conditioning will be described. In the battery cooling mode during non-air conditioning, the control device 60 brings the heating expansion valve 14a into a fully opened state, brings the air-cooling expansion valve 14b into a fully closed state, and brings the cooling expansion valve 14c into a throttled state. In addition, the control device 60 closes the dehumidifying on-off valve 15a and closes the heating on-off valve 15b.

Therefore, in the heat pump cycle 10 in the battery cooling mode during non-air conditioning, a refrigerant circuit is switched to, in which the refrigerant discharged from the compressor 11 circulates in the order of the water-refrigerant heat exchanger 12, the heating expansion valve 14a in a fully opened state, the outdoor heat exchanger 16, the cooling expansion valve 14c, the chiller 20, the accumulator 21, and the suction port of the compressor 11.

Furthermore, the control device 60 appropriately controls the operations of the other control target devices. For example, the control device 60 controls the number of rotation of the compressor 11 so as to exert predetermined battery cooling mode discharge capability. In addition, the control device 60 controls the throttle opening degree of the cooling expansion valve 14c such that the first low-temperature side heat medium temperature TWL1 approaches the battery target temperature TWLO1.

Similarly to the battery cooling mode during air conditioning, the control device 60 controls the operations of the first low-temperature side three-way valve 52a and the like. Therefore, in the low-temperature side heat medium circuit 50 in the battery cooling mode during non-air conditioning, a circuit is switched to, in which the low-temperature side heat medium circulates in the same order as in the battery cooling mode during air conditioning.

Therefore, in the heat pump cycle 10 in the battery cooling mode during non-air conditioning, a vapor compression type refrigeration cycle is formed in which the outdoor heat exchanger 16 is caused to function as a condenser and the chiller 20 is caused to function as an evaporator. As a result, in the heat pump cycle 10 in the battery cooling mode during non-air conditioning, the low-temperature side heat medium is cooled by the chiller 20.

In the low-temperature side heat medium circuit 50, the battery 80 is cooled similarly to the battery cooling mode during air conditioning.

(C1) Strong Current Device Warm-Up Mode

In the strong current device warm-up mode, the control device 60 brings the cooling expansion valve 14c into a fully closed state. Therefore, in the strong current device warm-up mode, the refrigerant never flows into the chiller 20.

In addition, the control device 60 controls the operation of the second low-temperature side three-way valve 52b such that the low-temperature side heat medium flowing out of the cooling water passage 81a of the strong current device 81 is caused to flow out to the electric heater 54 side. In addition, the control device 60 controls the operation of the electric heater 54 so as to exert predetermined heating capability. In addition, the control device 60 controls the operation of the second low-temperature side pump 51b so as to exert predetermined pressure-feeding capability.

Therefore, in the low-temperature side heat medium circuit 50 in the strong current device warm-up mode, a circuit is switched to, in which the low-temperature side heat medium pressure-fed from the second low-temperature side pump 51b circulates in the order of the cooling water passage 81a of the strong current device 81, the electric heater 54, the heat medium passage 20b of the chiller 20, and the suction port of the second low-temperature side pump 51b.

Therefore, in the low-temperature side heat medium circuit 50 in the strong current device warm-up mode, the low-temperature side heat medium heated by the electric heater 54 is sucked into the second low-temperature side pump 51b. The low-temperature side heat medium pressure-fed from the second low-temperature side pump 51b flows into the cooling water passage 81a of the strong current device 81 and dissipates heat to the strong current device 81. As a result, the strong current device 81 is warmed up.

(C1) Strong Current Device Waste Heat Recovery Mode

The strong current device waste heat recovery mode is an operation mode in which waste heat from the strong current device 81 is used as a heating source for the ventilation air. Therefore, the strong current device waste heat recovery mode is executed during air conditioning.

In the strong current device waste heat recovery mode, the cooling expansion valve 14c of the heat pump cycle 10 is brought into a throttled state. Furthermore, when the air conditioning operation mode is (A4) the heating mode, the control device 60 opens the dehumidifying on-off valve 15a and opens the heating on-off valve 15b.

Therefore, in the heat pump cycle 10 in the strong current device waste heat recovery mode, the low-pressure refrigerant whose pressure has been reduced by the cooling expansion valve 14c flows into the refrigerant passage 20a of the chiller 20. The refrigerant flowing out of the refrigerant passage 20a of the chiller 20 flows into the accumulator 21 via the sixth refrigerant joint part 13f and the fourth refrigerant joint part 13d.

Furthermore, when the strong current device waste heat recovery mode is executed during the execution of (A4) the heating mode, a refrigerant circuit is switched to, in which the refrigerant discharged from the compressor 11 circulates in the order of the water-refrigerant heat exchanger 12, the first refrigerant joint part 13a, the heating expansion valve 14a, the outdoor heat exchanger 16, the heating passage 22b, the accumulator 21, and the suction port of the compressor 11. At the same time, a refrigerant circuit is switched to, in which the refrigerant discharged from the compressor 11 circulates in the order of the water-refrigerant heat exchanger 12, the first refrigerant joint part 13a, the dehumidifying passage 22a, the cooling expansion valve 14c, the chiller 20, the accumulator 21, and the suction port of the compressor 11. That is, refrigerant circuits are switched to, in which the outdoor heat exchanger 16 and the chiller 20 are connected in parallel for the flow of the refrigerant.

Furthermore, the control device 60 appropriately controls the operations of the other control target devices. For example, the control device 60 controls the throttle opening degree of the cooling expansion valve 14c such that the second low-temperature side heat medium temperature TWL2 approaches a strong current device target temperature TWLO2. The strong current device target temperature TWLO2 is set such that the strong current device 81 can be appropriately operated.

In addition, the control device 60 controls the operation of the second low-temperature side three-way valve 52b such that the low-temperature side heat medium flowing out of the cooling water passage 81a of the strong current device 81 is caused to flow out to the electric heater 54 side. In addition, the control device 60 stops the supply of electric power to the electric heater 54. In addition, the control device 60 controls the operation of the second low-temperature side pump 51b so as to exert predetermined pressure-feeding capability.

Therefore, in the low-temperature side heat medium circuit 50 in the strong current device waste heat recovery mode, a circuit is switched to, in which the low-temperature side heat medium pressure-fed from the second low-temperature side pump 51b circulates in the order of the cooling water passage 81a of the strong current device 81, the electric heater 54, the heat medium passage 20b of the chiller 20, and the suction port of the second low-temperature side pump 51b.

Therefore, in the heat pump cycle 10 in the strong current device waste heat recovery mode during air conditioning, a vapor compression type refrigeration cycle is formed in which the water-refrigerant heat exchanger 12 or the outdoor heat exchanger 16 is caused to function as a condenser and at least the chiller 20 is caused to function as an evaporator. As a result, in the heat pump cycle 10 in the strong current device waste heat recovery mode during air conditioning, the high-temperature side heat medium is heated by the water-refrigerant heat exchanger 12. Furthermore, in the chiller 20, the heat of the low-temperature side heat medium (i.e., waste heat from the strong current device 81) is absorbed by the low-pressure refrigerant.

In the low-temperature side heat medium circuit 50, the low-temperature side heat medium cooled by the chiller 20 is sucked into the second low-temperature side pump 51b. The low-temperature side heat medium pressure-fed from the second low-temperature side pump 51b flows into the cooling water passage 81a of the strong current device 81 and absorbs waste heat from the strong current device 81.

Here, the strong current device waste heat recovery mode is an operation mode aimed to effectively use the waste heat from the strong current device 81 as a heat source for heating or the like. Therefore, even if the strong current device waste heat recovery mode is selected based on the second low-temperature side heat medium temperature TWL2, the strong current device waste heat recovery mode may be stopped when waste heat recovery is not required.

The case where waste heat recovery is not required corresponds to a case where a high-temperature side temperature difference ΔTWH obtained by subtracting the high-temperature side heat medium temperature TWH from the target high-temperature side heat medium temperature TWHO is equal to or lower than a reference high-temperature side temperature difference KΔTWH2 for recovery.

(C3) Strong Current Device Cooling Mode

In the strong current device cooling mode, the control device 60 controls the operation of the second low-temperature side three-way valve 52b such that the low-temperature side heat medium flowing out of the cooling water passage 81a of the strong current device 81 is caused to flow out to the low-temperature side radiator 56 side. In addition, the control device 60 controls the operation of the second low-temperature side pump 51b so as to exert predetermined pressure-feeding capability.

Therefore, in the low-temperature side heat medium circuit 50 in the strong current device cooling mode, a circuit is switched to, in which the low-temperature side heat medium pressure-fed from the second low-temperature side pump 51b circulates in the order of the cooling water passage 81a of the strong current device 81, the low-temperature side radiator 56, and the suction port of the second low-temperature side pump 51b.

Therefore, in the low-temperature side heat medium circuit 50 in the strong current device cooling mode, the low-temperature side heat medium cooled by heat exchange with the outside air in the low-temperature side radiator 56 is sucked into the second low-temperature side pump 51b. The low-temperature side heat medium pressure-fed from the second low-temperature side pump 51b flows into the cooling water passage 81a of the strong current device 81. As a result, the strong current device 81 is cooled.

In the air conditioner 1 of the present embodiment, comfortable air conditioning of the vehicle interior and appropriate temperature adjustment of a plurality of in-vehicle devices can be performed by appropriately combining and executing the air conditioning operation mode and the temperature adjusting operation mode, as described above.

In the air conditioner 1 of the present embodiment, the temperature of the ventilation air is adjusted by heating the ventilation air in the heating part when the vehicle interior is air conditioned. Therefore, in order to realize air conditioning with immediate effectiveness and high responsiveness in the air conditioner 1, it is desirable that, when air conditioning of the vehicle interior is started, the heating part is in a state of being able to exert sufficient heating capability.

The heating part of the present embodiment is formed by the respective components of the water-refrigerant heat exchanger 12 and the high-temperature side heat medium circuit 40 of the heat pump cycle 10. Therefore, the heating capability of the heating part can be defined by the high-temperature side heat medium temperature TWH that is the temperature of the high-temperature side heat medium to flow into the heater core 42.

Therefore, in the heating part of the present embodiment, it is desirable that, when air conditioning of the vehicle interior is started, the high-temperature side heat medium temperature TWH, corresponding to the actual heating capability of the heating part, is equal to or higher than the target high-temperature side heat medium temperature TWHO corresponding to the reference heating capability of the heating part.

Figure 3:
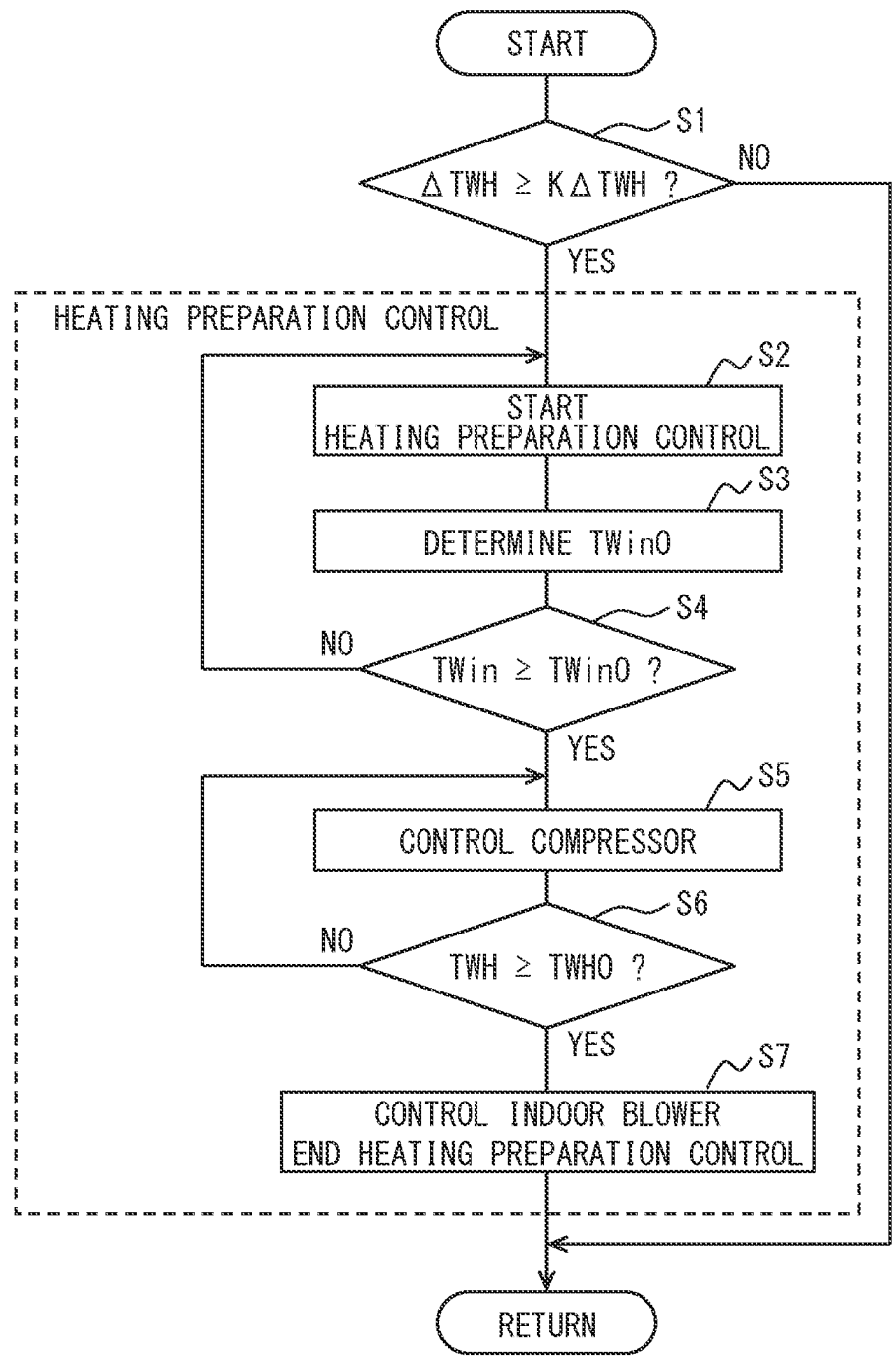
FIG. 3 is a flowchart showing a control flow during heating preparation control in the air conditioner of the first embodiment.

Therefore, in the present embodiment, heating preparation control for improving the heating capability of the heating part is executed when air conditioning of the vehicle interior is started, by executing a control flow illustrated in FIG. 3 to use the heat generated by the electric heater 54 that is the heat generating part. The control flow illustrated in FIG. 3 is executed at predetermined periods as a subroutine of the main routine of the air conditioning control program. Each control step illustrated in the flowchart of FIG. 3 is a function implementation part included in the control device 60.

First, in a step S1, it is determined whether the high-temperature side temperature difference ΔTWH obtained by subtracting the high-temperature side heat medium temperature TWH from the target high-temperature side heat medium temperature TWHO is equal to or larger than the predetermined reference high-temperature side temperature difference KΔTWH (in the present embodiment, 15° C.).

As described above, the heating capability of the heating part of the present embodiment can be defined by the high-temperature side heat medium temperature TWH. Therefore, when it is determined in the step S1 that the high-temperature side temperature difference ΔTWH is equal to or larger than the reference high-temperature side temperature difference KΔTWH, it is determined that the heating part is not in a state of being able to exert sufficient heating capability for air conditioning the vehicle interior, and the process proceeds to a step S2. In the step S2 to a step S7, the heating preparation control is executed.

On the other hand, when it is determined in the step S1 that the high-temperature side temperature difference ΔTWH is smaller than the reference high-temperature side temperature difference KΔTWH, it is determined that the heating part is in a state of being able to exert sufficient heating capability, and the process returns to the main routine.

In the step S2, in order to execute the heating preparation control, switching of the circuit configuration of the heat pump cycle 10, switching of the circuit configuration of the low-temperature side heat medium circuit, and control of the operations of the various components, are performed.

Specifically, under the heating preparation control, the control device 60 brings the heating expansion valve 14a into a fully closed state, brings the air-cooling expansion valve 14b into a fully closed state, and brings the cooling expansion valve 14c into a throttled state. In addition, the control device 60 opens the dehumidifying on-off valve 15a and closes the heating on-off valve 15b.

Figure 4:
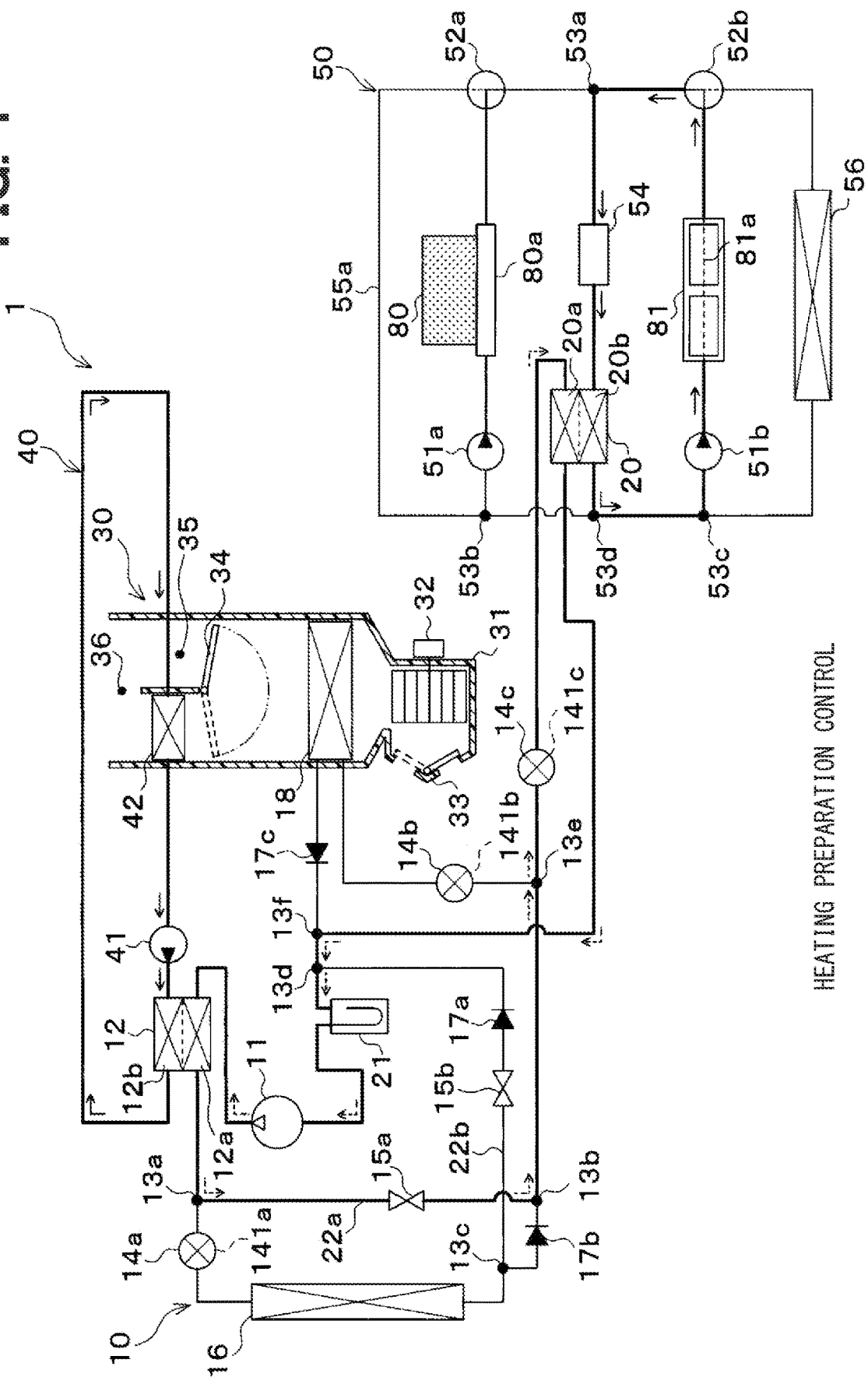
FIG. 4 is a schematic overall configuration view illustrating a flow of a refrigerant or the like under the heating preparation control in the air conditioner of the first embodiment.

Therefore, in the heat pump cycle 10 under the heating preparation control, a refrigerant circuit is switched to, in which the refrigerant discharged from the compressor 11 circulates in the order of the water-refrigerant heat exchanger 12, the dehumidifying passage 22a, the cooling expansion valve 14c, the chiller 20, the accumulator 21, and the suction port of the compressor 11, as indicated by dashed arrows in FIG. 4.

Furthermore, the control device 60 appropriately controls the operations of the other control target devices. For example, the control device 60 controls the number of rotation of the compressor 11 such that the discharge capability of the compressor 11 is equal to or lower than predetermined reference discharge capability for the heating preparation control. The reference discharge capability for the heating preparation control is set to a value lower than the discharge capability to be exerted in the normal air conditioning operation mode. In the present embodiment, the number of rotation of the compressor 11 is specifically set to 0 rpm. That is, in the step S2 of the present embodiment, the compressor 11 is stopped.

In addition, the control device 60 controls the throttle opening degree of the cooling expansion valve 14c so as to be a predetermined reference opening degree for the heating preparation control.

In addition, the control device 60 controls the operation of the high-temperature side pump 41 so as to exert predetermined pressure-feeding capability.

Therefore, in the high-temperature side heat medium circuit 40 during the heating preparation control, the high-temperature side heat medium pressure-fed from the high-temperature side pump 41 circulates in the order of the heat medium passage 12b of the water-refrigerant heat exchanger 12, the heater core 42, and the suction port of the high-temperature side pump 41, as indicated by solid arrows in FIG. 4.

In addition, the control device 60 controls the operation of the second low-temperature side three-way valve 52b such that the low-temperature side heat medium flowing out of the cooling water passage 81a of the strong current device 81 is caused to flow out to the electric heater 54 side. In addition, the control device 60 controls the operation of the electric heater 54 so as to exert predetermined heating capability. In addition, the control device 60 controls the operation of the second low-temperature side pump 51b so as to exert predetermined pressure-feeding capability.

Therefore, in the low-temperature side heat medium circuit 50 under the heating preparation control, the low-temperature side heat medium pressure-fed from the second low-temperature side pump 51b circulates in the order of the cooling water passage 81a of the strong current device 81, the electric heater 54, the heat medium passage 20b of the chiller 20, and the suction port of the second low-temperature side pump 51b, as indicated by the solid arrows in FIG. 4. That is, in the low-temperature side heat medium circuit 50 under the heating preparation control, a circuit is switched to, in which the low-temperature side heat medium heated by the electric heater 54 flows while bypassing the cooling water passage 80a of the battery 80.

Therefore, in the low-temperature side heat medium circuit 50 under the heating preparation control, the low-temperature side heat medium pressure-fed from the second low-temperature side pump 51b is heated when passing through the electric heater 54.

In addition, the control device 60 controls the number of rotation of the indoor blower 32 such that the blowing capability of the indoor blower 32 is equal to or lower than predetermined reference blowing capability for the heating preparation control. The reference blowing capability for the heating preparation control is set to a value lower than the blowing capability to be exerted in the normal air conditioning operation mode. In the present embodiment, the number of rotation of the indoor blower 32 is specifically set to 0 rpm. That is, in the step S2, the indoor blower 32 is stopped.

Next, in a step S3, a target heat medium temperature TWinO is determined. Therefore, the step S3 is a target heat medium temperature determination unit. The target heat medium temperature TWinO is determined to be a value at which, even when the low-pressure refrigerant absorbs heat from the low-temperature side heat medium in the chiller 20, the inlet side heat medium temperature TWin is not lowered below a lower limit heat medium temperature TWmin (in the present embodiment, 15° C.). The lower limit heat medium temperature TWmin is set to the lowest temperature of the low-pressure side heat medium that can be used as an air conditioning heat source.

More specifically, in the step S3, the target heat medium temperature TWinO is determined based on the intake air temperature TAin detected by the intake air temperature sensor 69b and the target blowing capability determined by the blowing capability control unit 60b and with reference to the control map stored in advance in the control device 60. In the control map for the heating preparation control, it is determined to raise the target heat medium temperature TWinO as the intake air temperature TAin lowers. It is also determined to raise the target heat medium temperature TWinO as the target blowing capability increases.

Next, in a step S4, it is determined whether the inlet side heat medium temperature TWin detected by the third low-temperature side heat medium temperature sensor 67c is equal to or higher than the target heat medium temperature TWinO.

When it is determined in the step S4 that the inlet side heat medium temperature TWin is equal to or higher than the target heat medium temperature TWinO, it is determined that, even if the number of rotation of the compressor 11 is increased, the inlet side heat medium temperature TWin is not below the lower limit heat medium temperature TWmin, and the process proceeds to a step S5.

On the other hand, when it is determined in the step S4 that the inlet side heat medium temperature TWin is not equal to or higher than the target heat medium temperature TWinO, it is determined that there is a possibility that, if the number of rotation of the compressor 11 is increased, the inlet side heat medium temperature TWin may be below the lower limit heat medium temperature TWmin, and the process returns to the step S2.

In the step S5, the number of rotation of the compressor 11 is increased. More specifically, the compressor 11, in the present embodiment, is operated and controlled in the same manner as in (A4) the heating mode or the like. Therefore, under the heating preparation control in the present embodiment, the refrigerant discharge capability of the compressor 11 is increased when the inlet side heat medium temperature TWin is equal to or higher than the target heat medium temperature TWinO.

As a result, in the heat pump cycle 10, the refrigerant circulates as indicated by the dashed arrows in FIG. 4. Then, in the heat pump cycle 10, a vapor compression type refrigeration cycle is formed in which the water-refrigerant heat exchanger 12 is caused to function as a condenser and the chiller 20 is caused to function as an evaporator.

Therefore, in the heat pump cycle 10 during the heating preparation control, the heat of the low-temperature side heat medium is absorbed by the low-pressure refrigerant in the chiller 20. The high-temperature side heat medium is heated by the water-refrigerant heat exchanger 12.

Next, in a step S6, it is determined whether the high-temperature side heat medium temperature TWH is equal to or higher than the target high-temperature side heat medium temperature TWHO.

When it is determined in the step S6 that the high-temperature side heat medium temperature TWH is equal to or higher than the target high-temperature side heat medium temperature TWHO, it is determined that the heating capability of the heating part is equal to or higher than the reference heating capability, and the process proceeds to a step S7. On the other hand, when it is determined in the step S6 that the high-temperature side heat medium temperature TWH is below the target high-temperature side heat medium temperature TWHO, it is determined that the heating capability of the heating part is not equal to or higher than the reference heating capability, and the process returns to the step S5.

In the step S7, the number of rotation of the indoor blower 32 is increased. More specifically, the indoor blower 32, in the present embodiment, is operated and controlled in the same manner as in the air-cooling mode or the like. Therefore, under the heating preparation control in the present embodiment, when the inlet side heat medium temperature TWin becomes equal to or higher than the target heat medium temperature TWinO and the heating capability of the heating part becomes equal to or higher than the reference heating capability, the indoor blower 32 is operated and the blowing capability of the indoor blower 32 is increased.

As a result, in the indoor air conditioning unit 30, a part or all of the ventilation air blown from the indoor blower 32 is heated when passing through the heater core 42. As a result, the ventilation air whose temperature has been adjusted is blown into the vehicle interior, and the vehicle interior can be air conditioned.

As described above, the heating preparation control is executed in the air conditioner 1 of the present embodiment, so that the heating capability of the heating part (in the present embodiment, the high-temperature side heat medium temperature TWH) can be promptly increased using the heat generated by the electric heater 54. As a result, the air conditioner 1 can realize air conditioning with immediate effectiveness and high responsiveness.

More specifically, under the heating preparation control in the present embodiment, the compressor 11 is stopped until the inlet side heat medium temperature TWin becomes equal to or higher than the target heat medium temperature TWinO, as described in the step S5. When the inlet side heat medium temperature TWin becomes equal to or higher than the target heat medium temperature TWinO, the compressor 11 is operated and the refrigerant discharge capability of the compressor 11 is increased.

According to this, it is possible, until the inlet side heat medium temperature TWin becomes equal to or higher than the target heat medium temperature TWinO, to suppress an unnecessary increase in the amount of heat absorbed by the low-pressure refrigerant from the low-temperature side heat medium in the chiller 20. Therefore, the inlet side heat medium temperature TWin, the temperature of the low-temperature side heat medium, can be promptly raised by the heat generated by the electric heater 54.

Figure 5:
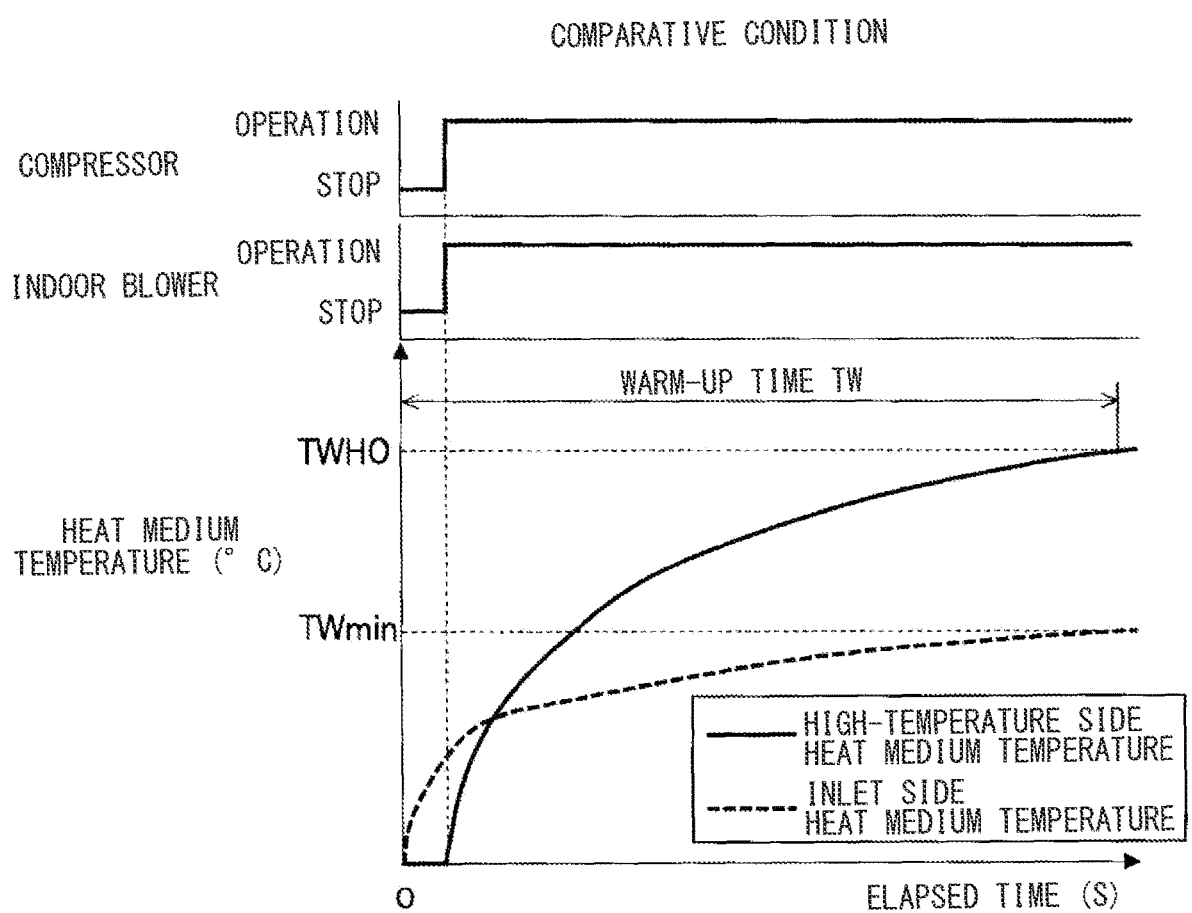
FIG. 5 is a graph showing changes in an inlet side heat medium temperature and a target heat medium temperature under a comparative condition in the air conditioner of the first embodiment.
Figure 6:
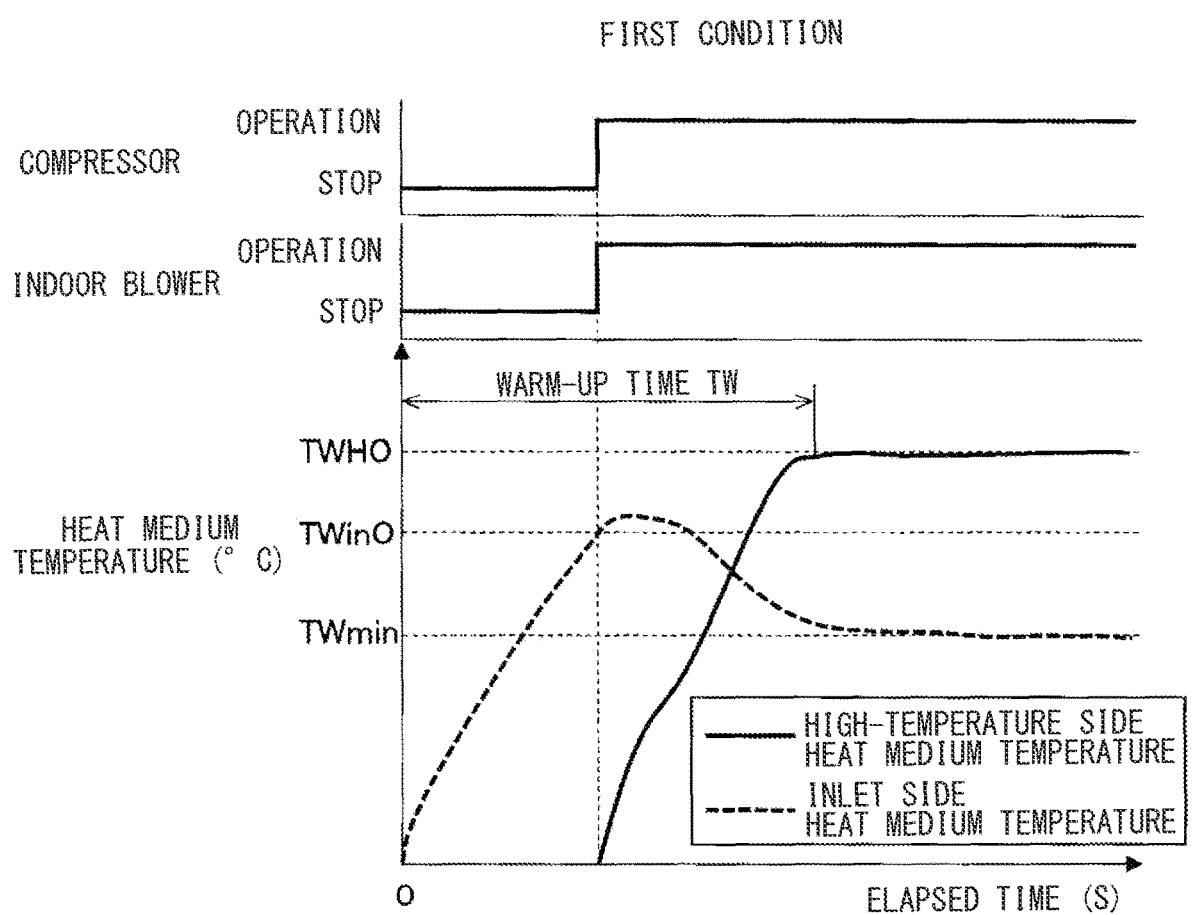
FIG. 6 is a graph showing changes in the inlet side heat medium temperature and the target heat medium temperature under a first condition in the air conditioner of the first embodiment.

As a result, a warm-up time TW, required for raising the high-temperature side heat medium temperature TWH to the target high-temperature side heat medium temperature TWHO, can be shortened as illustrated in FIGS. 5 and 6.

Figure 7:
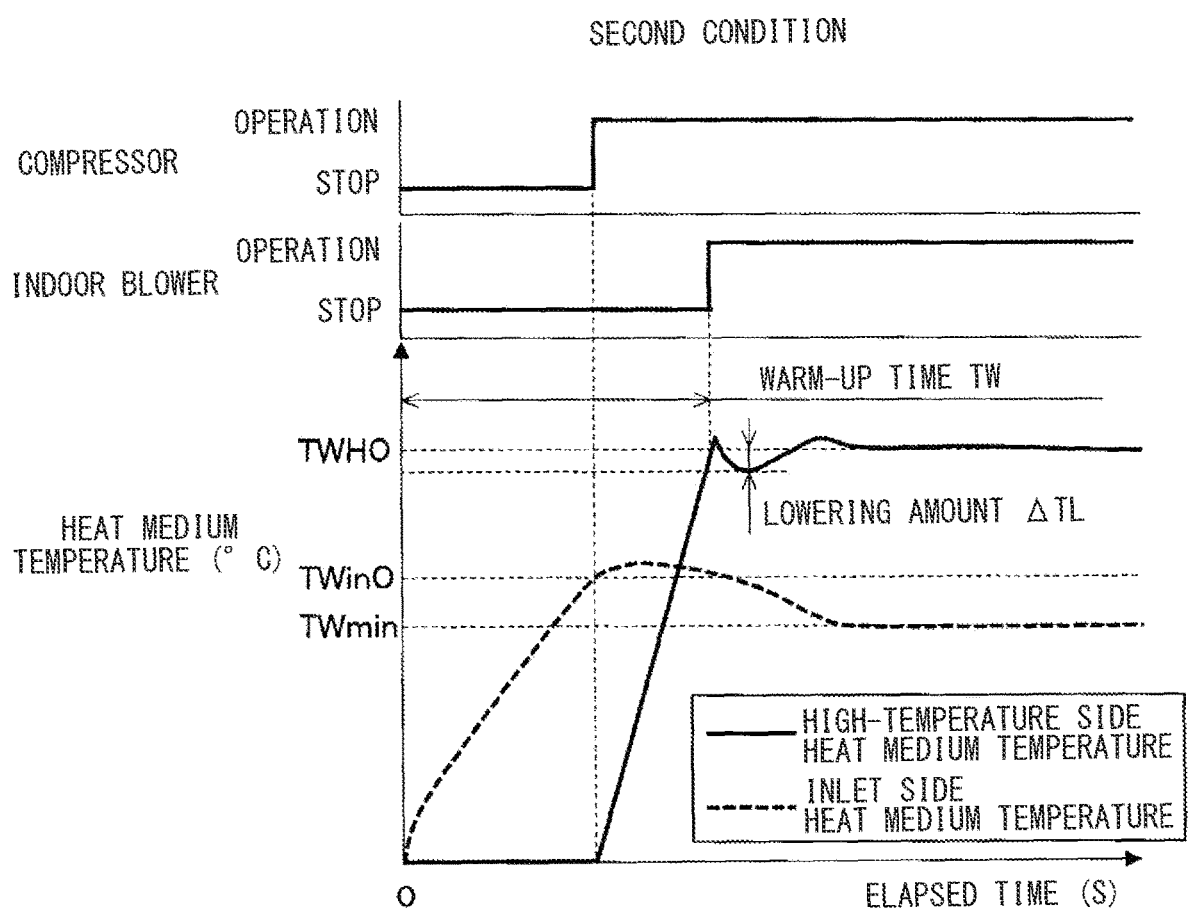
FIG. 7 is a graph showing changes in the inlet side heat medium temperature and the target heat medium temperature under a second condition in the air conditioner of the first embodiment.

Here, FIG. 5 is a graph showing changes in the high-temperature side heat medium temperature TWH and the inlet side heat medium temperature TWin under a comparative condition in which, immediately after the electric heater 54 is powered, both the compressor 11 and the indoor blower 32 are operated. In FIGS. 5 to 7, the electric heater 54 is powered at an elapsed time of 0 second.

FIG. 6 is a graph showing changes in the high-temperature side heat medium temperature TWH and the inlet side heat medium temperature TWin under a first condition in which, when the inlet side heat medium temperature TWin becomes equal to or higher than the target heat medium temperature TWinO after the electric heater 54 is powered, the compressor 11 and the indoor blower 32 are operated. In FIG. 6, the target heat medium temperature TWinO is determined to be about the lower limit heat medium temperature TWmin+20° C.

Furthermore, under the heating preparation control in the present embodiment, the indoor blower 32 is stopped until the inlet side heat medium temperature TWin becomes equal to or higher than the target heat medium temperature TWinO and the high-temperature side heat medium temperature TWH becomes equal to or higher than the target high-temperature side heat medium temperature TWHO, as described in the step S7. When the inlet side heat medium temperature TWin becomes equal to or higher than the target heat medium temperature TWinO and the high-temperature side heat medium temperature TWH becomes equal to or higher than the target high-temperature side heat medium temperature TWHO, the indoor blower 32 is operated.

According to this, it is possible, until the inlet side heat medium temperature TWin becomes equal to or higher than the target heat medium temperature TWinO and the high-temperature side heat medium temperature TWH becomes equal to or higher than the target high-temperature side heat medium temperature TWHO, to suppress an unnecessary increase in the amount of heat dissipated from the high-temperature side heat medium to the ventilation air in the heater core 42 constituting the heating part. Therefore, the inlet side heat medium temperature TWin can be promptly raised by the heat generated by the electric heater 54.

As a result, the warm-up time TW can be further shortened as illustrated in FIG. 7.

Here, FIG. 7 is a graph showing changes in the high-temperature side heat medium temperature TWH and the inlet side heat medium temperature TWin under the second condition in which the compressor 11 is operated when the inlet side heat medium temperature TWin becomes equal to or higher than the target heat medium temperature TWinO after the electric heater 54 is powered, and then the indoor blower 32 is operated when the high-temperature side heat medium temperature TWH becomes equal to or higher than the target high-temperature side heat medium temperature TWHO. In FIG. 7, the target heat medium temperature TWinO is determined to be about the lower limit heat medium temperature TWmin+10° C.

The heating preparation control in the present embodiment is executed when the high-temperature side temperature difference $\Delta$TWH is equal to or larger than the reference high-temperature side temperature difference K$\Delta$TWH, as described in the step S1. Therefore, the heating preparation control in the present embodiment is executed when the heating capability of the heating part is insufficient. According to this, it is possible to suppress frequent stoppage of the indoor blower 32 due to execution of unnecessary heating preparation control, that is, stoppage of air conditioning of the vehicle interior.

Under the heating preparation control in the present embodiment, the second low-temperature side three-way valve 52b, the heat medium circuit switching part, switches the circuit configuration of the low-temperature side heat medium circuit as described in the step S2. Specifically, the low-temperature side heat medium circuit 50 is switched to a circuit in which the low-temperature side heat medium heated by the electric heater 54 flows while bypassing the cooling water passage 80a of the battery 80.

According to this, the heat of the low-temperature side heat medium heated by the electric heater 54 is suppressed from being absorbed by the battery 80 having a relatively large heat capacity, and the inlet side heat medium temperature TWin can be promptly raised. Accordingly, the warm-up time TW can be further shortened.

Under the heating preparation control in the present embodiment, the air-cooling expansion valve 14b is brought into a fully closed state, as described in the step S2. Furthermore, the third check valve 17c, configured such that the refrigerant outlet side can be closed, is disposed on the refrigerant outlet side of the indoor evaporator 18.

According to this, even if the low-temperature side heat medium heated by the electric heater 54 flows into the heat medium passage 20b of the chiller 20 and the refrigerant pressure in the refrigerant passage 20a increases, it is possible to suppress the refrigerant from flowing back into the indoor evaporator 18 from the chiller 20 side. As a result, it is possible to suppress occurrence of a so-called asleep phenomenon of the refrigerant in which the refrigerant stagnates in the indoor evaporator 18.

Similarly, under the heating preparation control in the present embodiment, the heating expansion valve 14a is brought into a fully closed state and the heating on-off valve 15b is closed, as described in the step S2. Furthermore, the first check valve 17a and the second check valve 17b, which are configured such that the refrigerant outlet sides can be closed, are disposed on the refrigerant outlet side of the outdoor heat exchanger 16.

According to this, even if the low-temperature side heat medium heated by the electric heater 54 flows into the heat medium passage 20b of the chiller 20 and the refrigerant pressure in the refrigerant passage 20a increases, it is possible to suppress the refrigerant from flowing back into the outdoor heat exchanger 16 from the chiller side. As a result, it is possible to suppress occurrence of an asleep phenomenon of the refrigerant in the outdoor heat exchanger 16.

In the step S3 that is a target heat medium temperature determination unit of the present embodiment, it is determined to raise the target heat medium temperature TWinO as the intake air temperature TAin lowers. It is also determined to raise the target heat medium temperature TWinO as the target blowing capability increases.

According to this, when the indoor blower 32 is operated, the target heat medium temperature TWinO can be raised as the amount of dissipated heat, assumed to be dissipated from the high-temperature side heat medium to the ventilation air in the heater core 42, increases. Therefore, it is possible to suppress an increase in a temperature lowering amount ΔTL of the high-temperature side heat medium temperature TWH immediately after the indoor blower 32 is operated, as illustrated in FIG. 7.

In the heating preparation control in the present embodiment, an example has been described in which the refrigerant circuit of the heat pump cycle 10 is switched to a refrigerant circuit that circulates the refrigerant as indicated by the dashed arrows in FIG. 4, as described in the step S2, but the present disclosure is not limited thereto.

For example, as a modification of the heating preparation control, the control device 60 brings, in the step S2, the heating expansion valve 14a into a throttled state, the air-cooling expansion valve 14b into a fully closed state, and the cooling expansion valve 14c into a throttled state. Furthermore, the control device 60 opens the dehumidifying on-off valve 15a and opens the heating on-off valve 15b.

Figure 8:
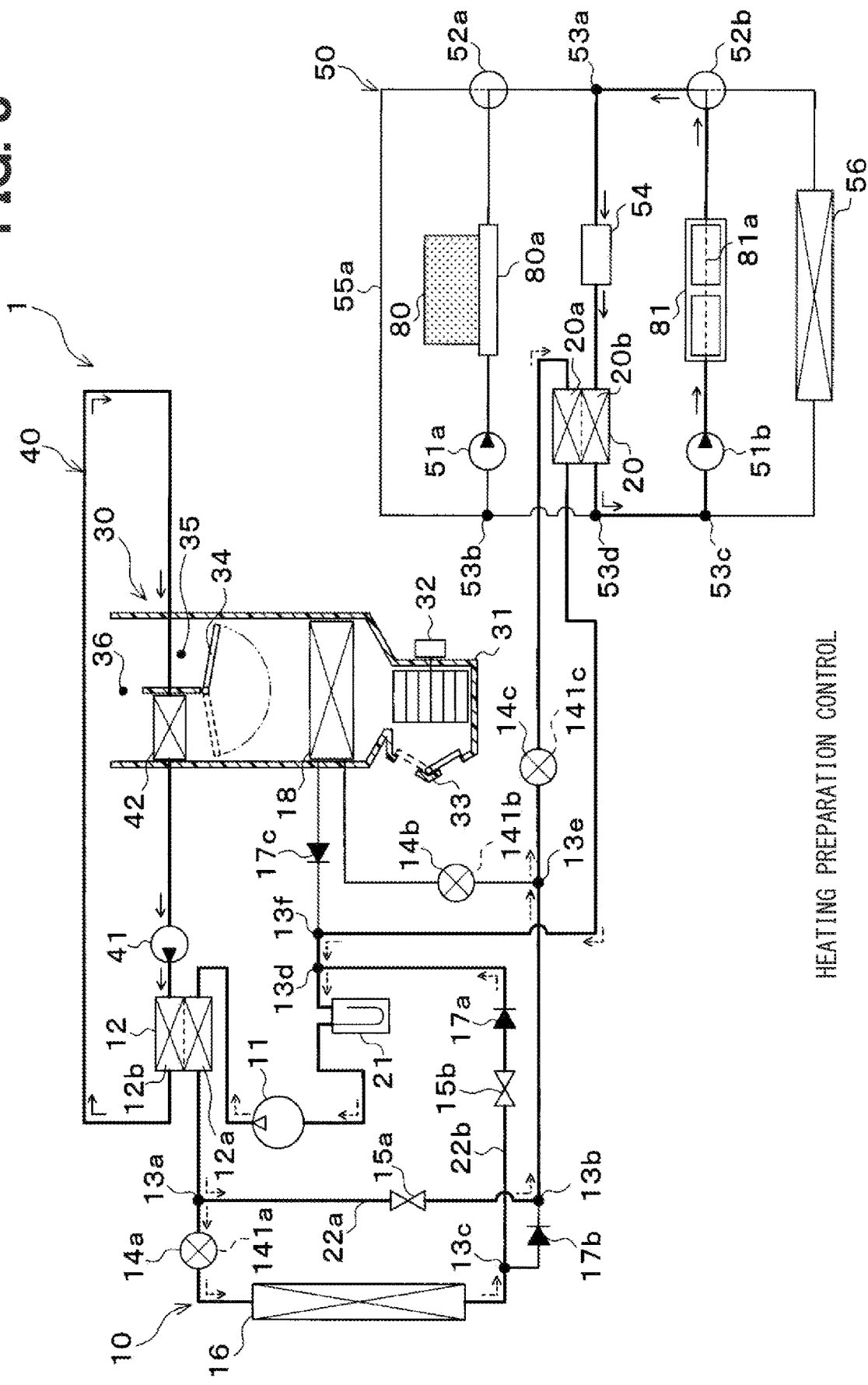
FIG. 8 is a schematic overall configuration view illustrating a flow of the refrigerant or the like in a modification of the heating preparation control in the air conditioner of the first embodiment.

Therefore, in the heat pump cycle 10 of the modification, a refrigerant circuit is switched to, in which the refrigerant discharged from the compressor 11 circulates in the order of the water-refrigerant heat exchanger 12, the first refrigerant joint part 13a, the heating expansion valve 14a, the outdoor heat exchanger 16, the heating passage 22b, the accumulator 21, and the suction port of the compressor 11, as indicated by dashed arrows in FIG. 8. At the same time, a refrigerant circuit is switched to, in which the refrigerant discharged from the compressor 11 circulates in the order of the water-refrigerant heat exchanger 12, the first refrigerant joint part 13a, the dehumidifying passage 22a, the cooling expansion valve 14c, the chiller 20, the accumulator 21, and the suction port of the compressor 11. That is, refrigerant circuits are switched to, in which the outdoor heat exchanger 16 and the chiller 20 are connected in parallel for the flow of the refrigerant.

Furthermore, the control device 60 appropriately controls the operations of the other control target devices of the heat pump cycles 10. For example, the control device 60 controls the throttle opening degree of the heating expansion valve 14a such that the refrigerant evaporating temperature in the outdoor heat exchanger 16 becomes lower than the outside air temperature Tam. The other operations are the same as those under the heating preparation control in the above-described first embodiment.

Therefore, in the modification of the heating preparation control, the high-temperature side heat medium can be heated not only by absorbing the heat generated by the electric heater 54 in the chiller 20 but also by using the heat absorbed from the outside air in the outdoor heat exchanger 16. As a result, the heating capability of the heating part can be increased more promptly. The modification of the heating preparation control can be effectively executed when the outside air temperature Tam is higher than the refrigerant evaporating temperature in the chiller 20, or the like.

Figure 9:
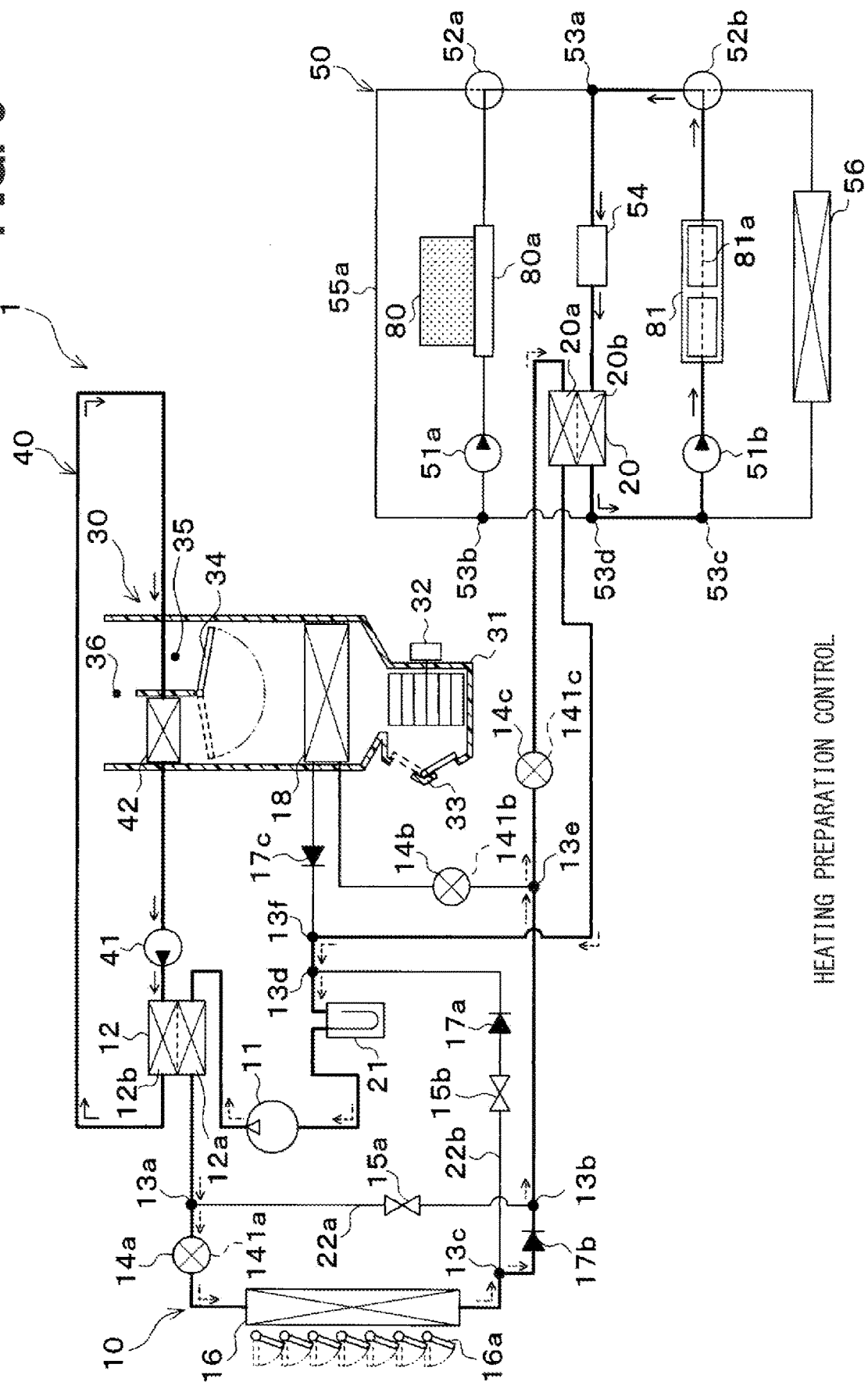
FIG. 9 is a schematic overall configuration view illustrating a flow of the refrigerant or the like in another modification of the heating preparation control in the air conditioner of the first embodiment.

When the outdoor heat exchanger 16 includes a shutter device 16a, as illustrated in the overall configuration view of FIG. 9, the control device 60 brings, as another modification of the heating preparation control and in the step S2, the heating expansion valve 14a into a fully opened state, the air-cooling expansion valve 14b into a fully closed state, and the cooling expansion valve 14c into a throttled state. Furthermore, the control device 60 closes the dehumidifying on-off valve 15a and closes the heating on-off valve 15b. In addition, the control device 60 brings the shutter device 16a into a fully closed state.

The shutter device 16a adjusts the flow rate of the outside air to flow into the outside air passage of the outdoor heat exchanger 16 to continuously adjust the heat exchange amount between the refrigerant and the outside air in the outdoor heat exchanger 16. The shutter device 16a can also stop the heat exchange between the refrigerant and the outside air in the outdoor heat exchanger 16 by creating a fully closed state in which the outside air passage of the outdoor heat exchanger 16 is closed. The operation of the shutter device 16a is controlled by a control signal output from the control device 60.

Therefore, in the heat pump cycle 10 of the another modification, a refrigerant circuit is switched to, in which the refrigerant discharged from the compressor 11 circulates in the order of the water-refrigerant heat exchanger 12, the heating expansion valve 14a in a fully opened state, the outdoor heat exchanger 16, the cooling expansion valve 14c, the chiller 20, the accumulator 21, and the suction port of the compressor 11, as indicated by dashed arrows in FIG. 9. The other operations are the same as those in the above-described embodiment.

In the another modification, the shutter device 16a is brought into a fully closed state, and thus the heat exchange between the refrigerant and the outside air is not performed in the outdoor heat exchanger 16. Therefore, the heat pump cycle 10 under the heating preparation control in the another modification operates similarly to the first embodiment. Therefore, according to the heating preparation control in the another modification, the same effect as that under the heating preparation control in the first embodiment can be obtained.

Second Embodiment

Figure 10:
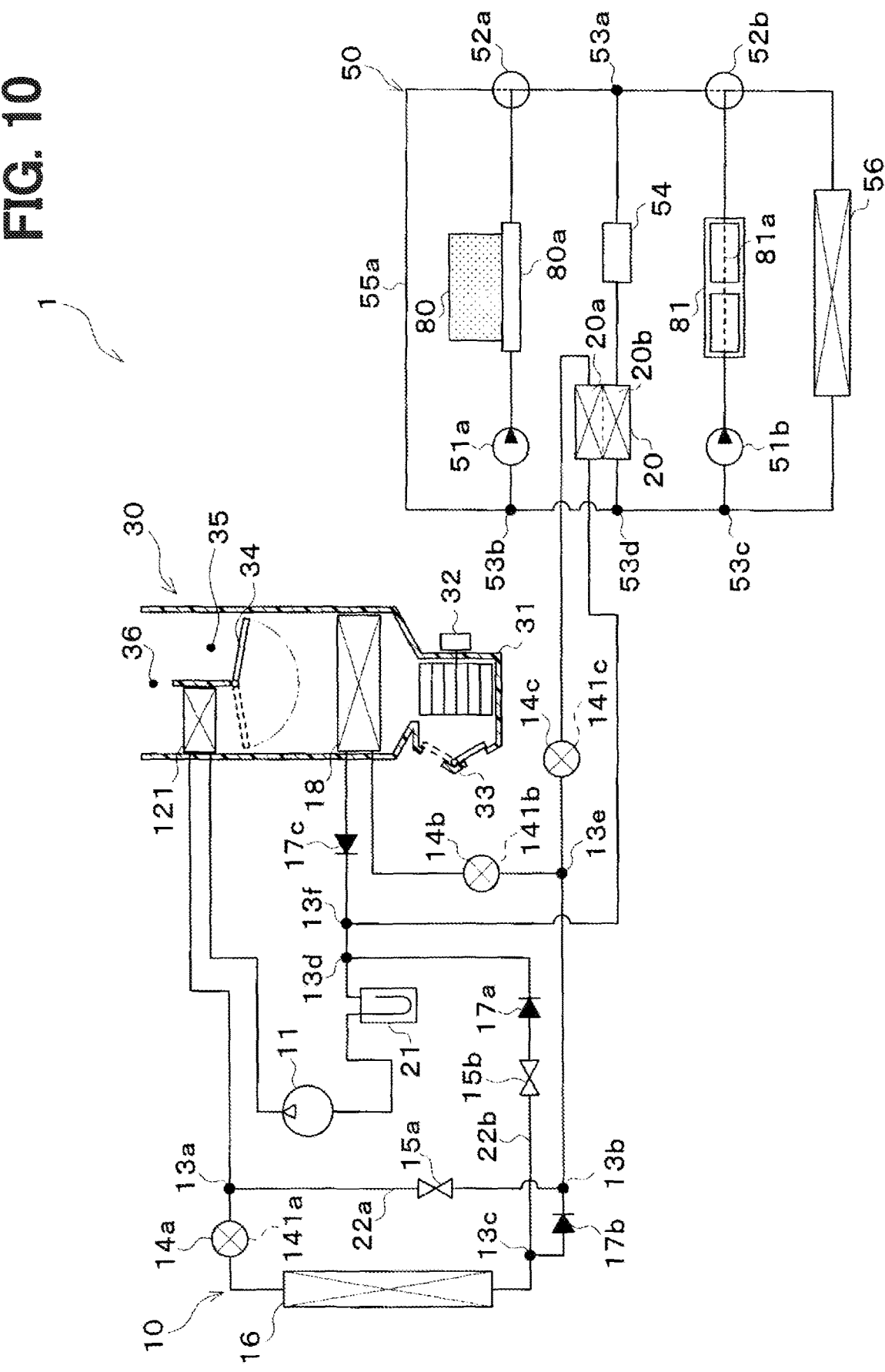
FIG. 10 is a schematic overall configuration view of an air conditioner of a second embodiment.

In the present embodiment, an example will be described in which the configuration of the heating part of the heat pump cycle 10 in the air conditioner 1 of the first embodiment is changed. Specifically, in the heat pump cycle 10 of the present embodiment, the water-refrigerant heat exchanger 12 and the high-temperature side heat medium circuit 40 are eliminated, and an indoor condenser 121 is adopted as the heating part, as illustrated in the overall configuration view of FIG. 10.

The indoor condenser 121 is a heating heat exchanger that exchanges heat between the high-pressure refrigerant discharged from the compressor 11 and the ventilation air to heat the ventilation air. Similarly to the heater core 42, the indoor condenser 121 is disposed in the air conditioning case 31 of the indoor air conditioning unit 30.

The second refrigerant temperature sensor 64b of the present embodiment detects the temperature of the refrigerant flowing out of the indoor condenser 121 as the second refrigerant temperature TR2. The second refrigerant pressure sensor 65b of the present embodiment detects the pressure of the refrigerant flowing out of the indoor condenser 121 as the second refrigerant pressure PR2. The other configurations of the air conditioner 1 are similar to those of the first embodiment.

In the present embodiment, as the target condensation pressure PDO to be used during the parallel heating mode or the like, a value determined such that the refrigerant condensation temperature in the indoor condenser 121 approaches a target condensation temperature TDO (in the present embodiment, about 50° C.) is used.

Here, the heating part of the present embodiment is formed by the indoor condenser 121. Therefore, the heating capability of the heating part can be defined by the second refrigerant pressure PR2 corresponding to the refrigerant condensation pressure in the indoor condenser 121 or the second refrigerant temperature TR2 corresponding to the refrigerant condensation temperature in the indoor condenser 121.

Therefore, in the heating part of the present embodiment, it is desirable that, when air conditioning of the vehicle interior is started, the second refrigerant temperature TR2 corresponding to the actual heating capability of the heating part is equal to or higher than the target condensation temperature TDO corresponding to the reference heating capability of the heating part. Alternatively, it is desirable that the second refrigerant pressure PR2 corresponding to the actual heating capability of the heating part is equal to or higher than the target condensation pressure PDO corresponding to the reference heating capability of the heating part.

Therefore, in the step S1 of the heating preparation control in the present embodiment, it is determined whether a pressure difference $\Delta PH$ obtained by subtracting the second refrigerant pressure PR2 from the target condensation pressure PDO is equal to or larger than a predetermined reference pressure difference $K\Delta PH$. Here, for the refrigerant in the present embodiment, the temperature at the pressure obtained by subtracting the reference pressure difference $K\Delta PH$ from the target condensation pressure PDO is set to a temperature lower than the target condensation temperature TDO by about 15° C.

When it is determined in the step S1 that the pressure difference $\Delta PH$ is equal to or larger than the reference pressure difference $K\Delta PH$, it is determined that the heating part is not in a state of being able to exert sufficient heating capability, and the process proceeds to the step S2. On the other hand, when it is determined in the step S1 that the pressure difference $\Delta PH$ is smaller than the reference pressure difference $K\Delta PH$, it is determined that the heating part is in a state of being able to exert sufficient heating capability, and the process returns to the main routine.

Similarly, in the step S6 of the heating preparation control in the present embodiment, it is determined whether the second refrigerant pressure PR2 is equal to or higher than the target condensation pressure PDO.

When it is determined in the step S6 that the second refrigerant pressure PR2 is equal to or higher than the target condensation pressure PDO, it is determined that the heating capability of the heating part is equal to or higher than the reference heating capability, and the process proceeds to the step S7. On the other hand, when it is determined in the step S6 that the second refrigerant pressure PR2 is lower than the target condensation pressure PDO, it is determined that the heating capability of the heating part is not equal to or higher than the reference heating capability, and the process returns to the step S5. The other operations of the air conditioner 1 are the same as those in the first embodiment.

Therefore, according to the air conditioner 1 of the present embodiment, the same effects as those of the first embodiment can be obtained. That is, also in the air conditioner 1 of the present embodiment, comfortable air conditioning of the vehicle interior and appropriate temperature adjustment of a plurality of in-vehicle devices can be performed. Furthermore, the heating capability (in the present embodiment, the target condensation pressure PDO) of the heating part can be promptly increased using the heat generated by the electric heater 54. As a result, it is possible to realize air conditioning with immediate effectiveness and high responsiveness.

Third Embodiment

In the present embodiment, an example will be described in which an inlet side connection passage 91, an outlet side connection passage 92, and the like are added to the air conditioner 1 of the first embodiment, as illustrated in the overall configuration view of FIG. 11. The inlet side connection passage 91 and the outlet side connection passage 92 form a heat medium flow path that connects the high-temperature side heat medium circuit 40 and the low-temperature side heat medium circuit 50.

Furthermore, a high-temperature side three-way valve 43 is disposed in a heat medium flow path extending, in the high-temperature side heat medium circuit 40 of the present embodiment, from the outlet of the heat medium passage 12b of the water-refrigerant heat exchanger 12 to the heater core 42. The high-temperature side three-way valve 43 causes the high-temperature side heat medium flowing out of the heat medium passage 12b of the water-refrigerant heat exchanger 12 to flow into its inside and flow out to at least one of the heater core 42 side and the inlet side connection passage 91 side.

The high-temperature side three-way valve 43 can continuously adjust the flow ratio between the flow rate of the high-temperature side heat medium that is caused to flow out to the heater core 42 side and the flow rate of the high-temperature side heat medium that is caused to flow out to the inlet side connection passage 91 side. Furthermore, by adjusting the flow ratio, the high-temperature side three-way valve 43 can cause the total flow rate of the high-temperature side heat medium that has been caused to flow into its inside to flow out to one of the heater core 42 side and the inlet side connection passage 91 side.

The inlet portion of the inlet side connection passage 91 is connected to one outflow port of the high-temperature side three-way valve 43. The outlet portion of the inlet side connection passage 91 is connected to one inflow port of a fifth heat medium joint part 53e disposed in the heat medium flow path extending from the discharge port of the first low-temperature side pump 51a of the low-temperature side heat medium circuit 50 to the inlet of the cooling water passage 80a of the battery 80.

The inlet portion of the outlet side connection passage 92 is connected to one outflow port of a sixth heat medium joint part 53f disposed in the heat medium flow path extending, in the low-temperature side heat medium circuit 50, from the outlet of the cooling water passage 80a of the battery 80 to the inflow port of the first low-temperature side three-way valve 52a. The outlet portion of the outlet side connection passage 92 is connected to one inflow port of a seventh heat medium joint part 53g disposed in the heat medium flow path extending, in the high-temperature side heat medium circuit 40, from the other outflow port of the high-temperature side three-way valve 43 to the heat medium inlet of the heater core 42. The other configurations of the air conditioner 1 are similar to those of the first embodiment.

Next, the operation of the vehicle air conditioner 1, having the above configuration, of the present embodiment will be described. In the air conditioner 1 of the present embodiment, the control device 60 controls the operation of the high-temperature side three-way valve 43 such that, during the normal operation, the high-temperature side heat medium flowing out of the heat medium passage 12b of the water-refrigerant heat exchanger 12 is caused to flow out to the heater core 42 side.

Therefore, when the air conditioning operation mode and the temperature adjusting operation mode are executed, the circuit configurations of the heat pump cycle 10, the high-temperature side heat medium circuit 40, and the low-temperature side heat medium circuit 50 are the same as those of the first embodiment. Therefore, also in the air conditioner 1 of the present embodiment, comfortable air conditioning of the vehicle interior and appropriate temperature adjustment of a plurality of in-vehicle devices can be performed by appropriately combining and executing the air conditioning operation mode and the temperature adjusting operation mode.

Furthermore, also in the air conditioner 1 of the present embodiment, the heating preparation control can be performed similarly to the first embodiment. Therefore, the heating capability of the heating part can be promptly increased using the heat generated by the electric heater 54. As a result, it is possible to realize air conditioning with immediate effectiveness and high responsiveness.

The heating preparation control is executed for the purpose of promptly improving the heating capability of the heating part when air conditioning of the vehicle interior is started. Therefore, the heating preparation control is often executed before the start of air conditioning at a relatively low outside air temperature. At such a low outside air temperature, warm-up of the battery 80 may be required.

On the other hand, in the low-temperature side heat medium circuit 50 during the heating preparation control, a circuit is switched to, in which the low-temperature side heat medium heated by the electric heater 54 flows while bypassing the cooling water passage 80a of the battery 80. Therefore, it is impossible to perform the warm-up of the battery 80 due to the low-temperature side heat medium that is heated by the electric heater 54 and flows into the cooling water passage 80a of the battery 80.

Therefore, in the present embodiment, the control device 60 controls the operation of the high-temperature side three-way valve 43 such that, when the heating preparation control is being executed and the battery temperature TB is equal to or lower than a predetermined reference warm-up temperature KTBL, the high-temperature side heat medium flowing out of the heat medium passage 12b of the water-refrigerant heat exchanger 12 is caused to flow out to the inlet side connection passage 91 side. The reference warm-up temperature KTBL is set to a temperature at which the warm-up of the battery 80 is determined to be necessary.

Figure 11:
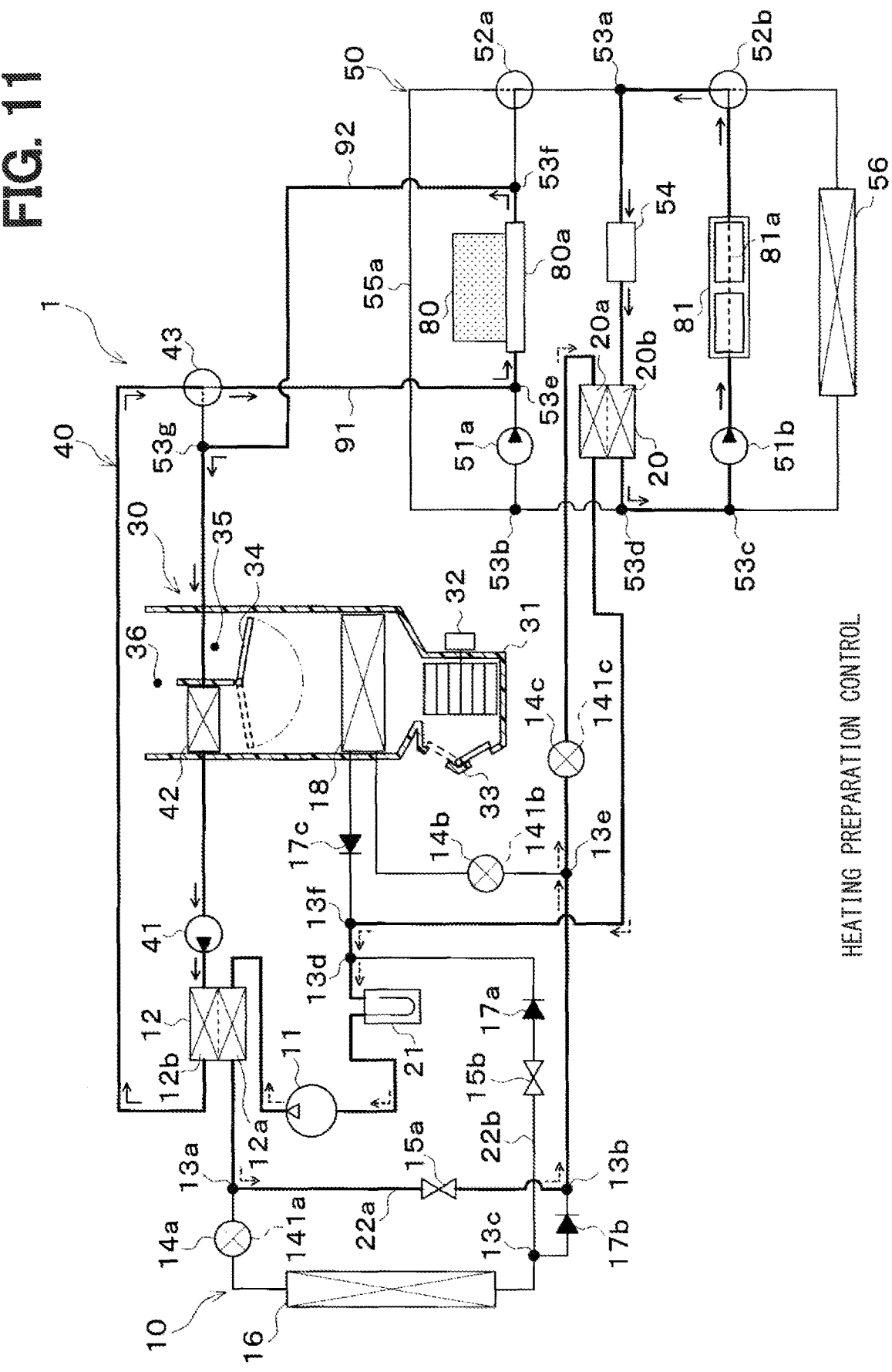
FIG. 11 is a schematic overall configuration view illustrating a flow of a refrigerant or the like during heating preparation control in an air conditioner of a third embodiment.

Therefore, when warm-up of the battery 80 is required during the execution of the heating preparation control in the air conditioner 1 of the present embodiment, the high-temperature side heat medium pressure-fed from the high-temperature side pump 41 circulates in the order of the heat medium passage 12b of the water-refrigerant heat exchanger 12, the high-temperature side three-way valve 43, the inlet side connection passage 91, the cooling water passage 80a of the battery 80, the outlet side connection passage 92, the heater core 42, and the suction port of the high-temperature side pump 41, as indicated by solid arrows in FIG. 11.

According to this, when the compressor 11 is operated in the step S5 of the heating preparation control described in the first embodiment, the high-temperature side heat medium can be heated by the water-refrigerant heat exchanger 12. The high-temperature side heat medium heated by the water-refrigerant heat exchanger 12 can be caused to flow into the cooling water passage 80a of the battery 80 via the high-temperature side three-way valve 43 and inlet side connection passage 91. As a result, the battery 80 can be warmed up.

The high-temperature side heat medium flowing out of the cooling water passage 80a of the battery 80 flows into the heater core 42 via the outlet side connection passage 92. Under the heating preparation control, the indoor blower 32 is stopped until the high-temperature side heat medium temperature TWH becomes equal to or higher than the target high-temperature side heat medium temperature TWHO. Therefore, the high-temperature side heat medium having flowed into the heater core 42 flows out of the heater core 42 without exchanging heat with the ventilation air, and is sucked into the high-temperature side pump 41.

The other operations are the same as those in the first embodiment. Therefore, according to the air conditioner 1 of the present embodiment, the battery 80 can be warmed up during the execution of the heating preparation control.

Fourth Embodiment

In the present embodiment, an air conditioner 1a illustrated in the overall configuration view of FIG. 12 will be described. The air conditioner 1a of the present embodiment is used as a vehicle air conditioner with an in-vehicle device temperature adjustment function, similarly to the first embodiment. The air conditioner 1a includes a heat pump cycle 10a, the indoor air conditioning unit 30, a high-temperature side heat medium circuit 40a, a low-temperature side heat medium circuit 50a, and the like.

Here, the configuration of the indoor air conditioning unit 30 of the air conditioner 1a is similar to that of the first embodiment. Therefore, the indoor air conditioning unit 30 is not illustrated in FIG. 12 for clarity of illustration. Therefore, the indoor evaporator 18 of the heat pump cycle 10a and the heater core 42 of the high-temperature side heat medium circuit 40a are disposed in the air conditioning case 1 of the indoor air conditioning unit 30, similarly to the first embodiment.

In the heat pump cycle 10a of the present embodiment, the first refrigerant joint part 13a, the heating expansion valve 14a, the outdoor heat exchanger 16, the accumulator 21, and the like are eliminated from the heat pump cycle 10 described in the first embodiment.

In the heat pump cycle 10a, the inlet side of a receiver 23 is connected to the outlet of the refrigerant passage 12a of the water-refrigerant heat exchanger 12. The receiver 23 is a high-pressure side gas-liquid separator that separates the gas and liquid of the high-pressure refrigerant flowing out of the refrigerant passage 12a of the water-refrigerant heat exchanger 12 and stores a surplus liquid-phase refrigerant in the cycle. The inflow port side of the fifth refrigerant joint part 13e is connected to the refrigerant outlet of the receiver 23.

The other configurations of the heat pump cycle 10a are similar to those of the heat pump cycle 10 described in the first embodiment.

In the high-temperature side heat medium circuit 40a of the present embodiment, the heat medium passage 12b of the water-refrigerant heat exchanger 12, the high-temperature side pump 41, the heater core 42, the high-temperature side three-way valve 43, a high-temperature side radiator 44, and the like are disposed. The high-temperature side three-way valve 43 of the present embodiment causes the high-temperature side heat medium flowing out of the heat medium passage 12b of the water-refrigerant heat exchanger 12 to flow into its inside and flow out to at least one of the heater core 42 side and the high-temperature side radiator 44 side.

The high-temperature side three-way valve 43 can continuously adjust the flow ratio between the flow rate of the high-temperature side heat medium that is caused to flow out to the heater core 42 side and the flow rate of the high-temperature side heat medium that is caused to flow out to the high-temperature side radiator 44 side. Furthermore, by adjusting the flow ratio, the high-temperature side three-way valve 43 can cause the total flow rate of the high-temperature side heat medium that has been caused to flow into its inside to flow out to one of the heater core 42 side and the high-temperature side radiator 44 side.

The high-temperature side radiator 44 is a high-temperature side outside air heat exchange part that exchanges heat between the outside air and the high-temperature side heat medium flowing out of the high-temperature side three-way valve 43.

One inflow port side of an eighth heat medium joint part 53h is connected to the heat medium outlet of the high-temperature side radiator 44. The other inflow port side of the eighth heat medium joint part 53h is connected to the heat medium outlet of the heater core 42 of the present embodiment. The suction port side of the high-temperature side pump 41 is connected to the outflow port of the eighth heat medium joint part 53h.

The other configurations of the high-temperature side heat medium circuit 40a are similar to those of the high-temperature side heat medium circuit 40 described in the first embodiment.

In the low-temperature side heat medium circuit 50a of the present embodiment, the first low-temperature side pump 51a, the second low-temperature side pump 51b, the first low-temperature side three-way valve 52a to a third low-temperature side three-way valve 52c, the heat medium passage 20b of the chiller 20, the cooling water passage 80a of the battery 80, the cooling water passage 81a of the strong current device 81, the electric heater 54, a strong current device bypass passage 55b, the low-temperature side radiator 56, and the like are disposed.

In the low-temperature side heat medium circuit 50a, the inlet side of the heat medium passage 20b of the chiller 20 is connected to the discharge port of the first low-temperature side pump 51a. The inflow port side of the first low-temperature side three-way valve 52a is connected to the outlet of the heat medium passage 20b of the chiller 20.

The first low-temperature side three-way valve 52a of the present embodiment causes the low-temperature side heat medium flowing out of the heat medium passage 20b of the chiller 20 to flow into its inside and flow out to at least one of the electric heater 54 side and the inflow port side of the third low-temperature side three-way valve 52c.

The first low-temperature side three-way valve 52a can continuously adjust the flow ratio between the flow rate of the low-temperature side heat medium that is caused to flow out to the electric heater 54 side and the flow rate of the low-temperature side heat medium that is caused to flow out to the third low-temperature side three-way valve 52c side. Furthermore, by adjusting the flow ratio, the first low-temperature side three-way valve 52a can cause the total flow rate of the low-temperature side heat medium that has been caused to flow into its inside to flow out to one of the electric heater 54 side and the third low-temperature side three-way valve 52c side.

One inflow port side of a ninth heat medium joint part 53i is connected to the outlet of the heating flow path of the electric heater 54. The suction port side of the first low-temperature side pump 51a is connected to the outflow port of the ninth heat medium joint part 53i.

The third low-temperature side three-way valve 52c causes the low-temperature side heat medium flowing out of the first low-temperature side three-way valve 52a to flow into its inside and flow out to at least one of the cooling water passage side of the battery 80 and one inflow port side of a tenth heat medium joint part 53j.

The third low-temperature side three-way valve 52c can continuously adjust the flow ratio between the flow rate of the low-temperature side heat medium that is caused to flow out to the cooling water passage 80a side of the battery 80 and the flow rate of the low-temperature side heat medium that is caused to flow out to the tenth heat medium joint part 53j side. Furthermore, by adjusting the flow ratio, the third low-temperature side three-way valve 52c can cause the total flow rate of the low-temperature side heat medium that has been caused to flow into its inside to flow out to one of the cooling water passage 80a side of the battery 80 and the tenth heat medium joint part 53j side.

One inflow port side of an eleventh heat medium joint part 53k is connected to the outlet of the cooling water passage 80a of the battery 80. The other inflow port side of the ninth heat medium joint part 53*i* is connected to the outflow port of the eleventh heat medium joint part 53*k*.

In the low-temperature side heat medium circuit 50*a*, the inlet side of the cooling water passage 81*a* of the strong current device 81 is connected to the discharge port of the second low-temperature side pump 51*b*. The inflow port side of the second low-temperature side three-way valve 52*b* is connected to the outlet of the cooling water passage 81*a* of the strong current device 81.

The second low-temperature side three-way valve 52*b* of the present embodiment causes the low-temperature side heat medium flowing out of the cooling water passage 81*a* of the strong current device 81 to flow into its inside and flow out to at least one of the other inflow port side of the tenth heat medium joint part 53*j* and the strong current device bypass passage 55*b* side.

The second low-temperature side three-way valve 52*b* can continuously adjust the flow ratio between the flow rate that is caused to flow out to the tenth heat medium joint part 53*j* side and the flow rate of the low-temperature side heat medium that is caused to flow out to the strong current device bypass passage 55*b* side. Furthermore, by adjusting the flow ratio, the second low-temperature side three-way valve 52*b* can cause the total flow rate of the low-temperature side heat medium that has been caused to flow into its inside to flow out to one of the tenth heat medium joint part 53*j* side and the strong current device bypass passage 55*b* side.

The strong current device bypass passage 55*b* is a heat medium passage that guides the low-temperature side heat medium flowing out of the cooling water passage 81*a* of the strong current device 81 to the suction port side of the second low-temperature side pump 51*b* while causing the heat medium to bypass the low-temperature side radiator 56 and the like. One inflow port of a twelfth heat medium joint part 53*m* is connected to the outlet portion of the strong current device bypass passage 55*b*. The suction port side of the second low-temperature side pump 51*b* is connected to the outflow port of the twelfth heat medium joint part 53*m*.

The heat medium inlet side of the low-temperature side radiator 56 is connected to the outflow port of the tenth heat medium joint part 53*j*. The inflow port side of a thirteenth heat medium joint part 53*n* is connected to the heat medium outlet of the low-temperature side radiator 56. The other inflow port side of the twelfth heat medium joint part 53*m* is connected to one outflow port of the thirteenth heat medium joint part 53*n*. The other inflow port side of the eleventh heat medium joint part 53*k* is connected to the other outflow port of the thirteenth heat medium joint part 53*n*.

The other configurations of the low-temperature side heat medium circuit are similar to those of the low-temperature side heat medium circuit 50 described in the first embodiment.

Next, the operation of the air conditioner 1*a*, having the above configuration, of the present embodiment will be described. The air conditioner 1*a* according to the present embodiment has air conditioning operation modes including (A1) an air-cooling mode, (A2) a dehumidifying-heating mode, and (A3) a heating mode. Similarly to the first embodiment, the air conditioning operation modes are switched by executing an air conditioning control program stored in the control device 60. Hereinafter, detailed operation of each air conditioning operation mode will be described.

(A1) Air-Cooling Mode

In the air-cooling mode, the control device 60 brings the air-cooling expansion valve 14*b* into a throttled state. Similarly to the first embodiment, the cooling expansion valve 14*c* is controlled according to the temperature adjusting operation mode.

Therefore, in the heat pump cycle 10*a* in the air-cooling mode, a refrigerant circuit is switched to, in which the refrigerant discharged from the compressor 11 circulates in the order of the water-refrigerant heat exchanger 12, the receiver 23, the air-cooling expansion valve 14*b*, the indoor evaporator 18, and the suction port of the compressor 11.

Furthermore, the control device 60 appropriately controls the operations of the other control target devices. For example, the control device 60 controls the compressor 11 similarly to the air-cooling mode in the first embodiment. The throttle opening degree of the cooling expansion valve 14*c* is controlled such that a super-heat degree SH of the outlet side refrigerant in the indoor evaporator 18 approaches a predetermined reference super-heat degree KSH.

In addition, the control device 60 controls the operation of the high-temperature side pump 41 so as to exert predetermined pressure-feeding capability. In addition, the control device 60 controls the operation of the high-temperature side three-way valve 43 such that the high-temperature side heat medium temperature TWH approaches the target high-temperature side heat medium temperature TWHO.

Therefore, in the high-temperature side heat medium circuit 40 in the air-cooling mode, a refrigerant circuit is switched to, in which the high-temperature side heat medium pressure-fed from the high-temperature side pump 41 circulates in the order of the water-refrigerant heat exchanger 12, the heater core 42, and the suction port of the high-temperature side pump 41. At the same time, a refrigerant circuit is switched to, in which the high-temperature side heat medium pressure-fed from the high-temperature side pump 41 circulates in the order of the water-refrigerant heat exchanger 12, the high-temperature side radiator 44, and the suction port of the high-temperature side pump 41. That is, circuits are switched to, in which the heater core 42 and the high-temperature side radiator 44 are connected in parallel for the flow of the high-temperature side heat medium.

Here, in the air-cooling mode, the amount of heat exchange between the high-temperature side heat medium and the ventilation air in the heater core 42 is small. Therefore, in the high-temperature side three-way valve 43 in the air-cooling mode, almost the total flow rate of the high-temperature side heat medium flowing out of the heat medium passage 12*b* of the water-refrigerant heat exchanger 12 is caused to flow out to the high-temperature side radiator 44 side. The other operations are the same as those in the air-cooling mode described in the first embodiment.

Therefore, in the heat pump cycle 10*a* in the air-cooling mode, a vapor compression type refrigeration cycle is formed in which the water-refrigerant heat exchanger 12 is caused to function as a condenser and the indoor evaporator 18 is caused to function as an evaporator. As a result, in the heat pump cycle 10*a* in the air-cooling mode, the high-temperature side heat medium is heated by the water-refrigerant heat exchanger 12. Furthermore, the ventilation air is cooled by the indoor evaporator 18.

In the high-temperature side heat medium circuit 40*a* in the air-cooling mode, the heat medium heated by the water-refrigerant heat exchanger 12 is supplied to the heater core 42 in accordance with the flow ratio control of the high-temperature side three-way valve 43.

In the indoor air conditioning unit 30 in the air-cooling mode, the ventilation air blown from the indoor blower 32 is cooled by the indoor evaporator 18. The temperature of the ventilation air cooled by the indoor evaporator 18 is adjusted so as to approach the target blowing-out temperature TAO by adjusting the opening degree of the air mix door 34. Then, when the ventilation air whose temperature has been adjusted is blown into the vehicle interior, the air-cooling of the vehicle interior is realized.

(A2) Dehumidifying-Heating Mode

In the dehumidifying-heating mode, the control device 60 brings the air-cooling expansion valve 14b in a throttled state and brings the cooling expansion valve 14c into a throttled state.

Therefore, in the heat pump cycle 10a in the dehumidifying-heating mode, a refrigerant circuit is switched to, in which the refrigerant discharged from the compressor 11 circulates in the order of the water-refrigerant heat exchanger 12, the receiver 23, the air-cooling expansion valve 14b, the indoor evaporator 18, and the suction port of the compressor 11. At the same time, a refrigerant circuit is switched to, in which the refrigerant discharged from compressor 11 circulates in the order of the water-refrigerant heat exchanger 12, the receiver 23, the cooling expansion valve 14c, the chiller 20, and the suction port of compressor 11. That is, refrigerant circuits are switched to, in which the indoor evaporator 18 and the chiller 20 are connected in parallel for the flow of the refrigerant.

Furthermore, the control device 60 appropriately controls the operations of the other control target devices. For example, the control device 60 controls the compressor 11 similarly to the parallel dehumidifying-heating mode in the first embodiment. In addition, the control device 60 controls the throttle opening degree of the cooling expansion valve 14c such that the refrigerant evaporating temperature in the chiller 20 becomes lower than the outside air temperature Tam.

In addition, the control device 60 controls the operation of the high-temperature side pump 41 so as to exert predetermined pressure-feeding capability. In addition, the control device 60 controls the operation of the high-temperature side three-way valve 43 such that the high-temperature side heat medium temperature TWH approaches the target high-temperature side heat medium temperature TWHO.

Therefore, in the high-temperature side heat medium circuit 40a in the dehumidifying-heating mode, a circuit is switched to, in which the high-temperature side heat medium circulates in the same order as in the air-cooling mode.

In addition, the control device 60 controls the operation of the first low-temperature side pump 51a so as to exert predetermined pressure-feeding capability.

In addition, the control device 60 controls the operation of the first low-temperature side three-way valve 52a such that the low-temperature side heat medium flowing out of the heat medium passage 20b of the chiller 20 is caused to flow out to the third low-temperature side three-way valve 52c side. In addition, the control device 60 controls the operation of the third low-temperature side three-way valve 52c such that the low-temperature side heat medium flowing out of the first low-temperature side three-way valve 52a is caused to flow out to the tenth heat medium joint part 53j side. In addition, the control device 60 controls the operation of the second low-temperature side three-way valve 52b such that the low-temperature side heat medium flowing out of the third low-temperature side three-way valve 52c is caused to flow out to the low-temperature side radiator 56 side.

Therefore, in the low-temperature side heat medium circuit 50a in the dehumidifying-heating mode, a circuit is switched to, in which the low-temperature side heat medium pressure-fed from the first low-temperature side pump 51a circulates in the order of the heat medium passage 20b of the chiller 20, the first low-temperature side three-way valve 52a, the third low-temperature side three-way valve 52c, the low-temperature side radiator 56, and the suction port of the first low-temperature side pump 51a. The other operations are the same as those in the air-cooling mode.

Therefore, in the heat pump cycle 10a in the dehumidifying-heating mode, a vapor compression type refrigeration cycle is formed in which the water-refrigerant heat exchanger 12 is caused to function as a condenser and the indoor evaporator 18 and the chiller 20 are caused to function as evaporators.

As a result, in the heat pump cycle 10a in the dehumidifying-heating mode, the high-temperature side heat medium is heated by the water-refrigerant heat exchanger 12. The ventilation air is cooled by the indoor evaporator 18. Furthermore, the low-pressure refrigerant absorbs heat from the low-temperature side heat medium in the chiller 20, so that the temperature of the low-temperature side heat medium becomes lower than the outside air temperature.

In the high-temperature side heat medium circuit 40a in the dehumidifying-heating mode, the heat medium heated by the water-refrigerant heat exchanger 12 is supplied to the heater core 42 in accordance with the flow ratio control of the high-temperature side three-way valve 43.

In the low-temperature side heat medium circuit 50a in the dehumidifying-heating mode, the low-temperature side heat medium cooled by the chiller 20 flows into the low-temperature side radiator 56 via the first low-temperature side three-way valve 52a and the third low-temperature side three-way valve 52c. The low-temperature side heat medium having flowed into the low-temperature side radiator 56 absorbs heat from the outside air. The low-temperature side heat medium whose temperature has risen by absorbing heat from the outside air in the low-temperature side radiator 56 is sucked into the first low-temperature side pump 51a and pressure-fed to the heat medium passage 20b of the chiller 20.

In the indoor air conditioning unit 30 in the dehumidifying-heating mode, the ventilation air blown from the indoor blower 32 is cooled and dehumidified by the indoor evaporator 18. The temperature of the ventilation air cooled and dehumidified by the indoor evaporator 18 is adjusted so as to approach the target blowing-out temperature TAO by adjusting the opening degree of the air mix door 34. Then, when the ventilation air whose temperature has been adjusted is blown out into the vehicle interior, the dehumidification and heating of the vehicle interior is realized.

(A3) Heating Mode

In the heating mode, the control device 60 brings the air-cooling expansion valve 14b into a fully closed state and brings the cooling expansion valve 14c into a throttled state.

Therefore, in the heat pump cycle 10a in the heating mode, a refrigerant circuit is switched to, in which the refrigerant discharged from the compressor 11 circulates in the order of the water-refrigerant heat exchanger 12, the receiver 23, the cooling expansion valve 14c, chiller 20, and the suction port of the compressor 11.

Furthermore, the control device 60 appropriately controls the operations of the other control target devices. For example, the control device 60 controls the compressor 11, similarly to the heating mode in the first embodiment. In addition, the control device 60 controls the throttle opening degree of the cooling expansion valve 14c such that the super-heat degree SH of the outlet side refrigerant in the chiller 20 approaches the predetermined reference super-heat degree KSH.

In addition, the control device 60 controls the operation of the high-temperature side pump 41 so as to exert predetermined pressure-feeding capability. In addition, the control device 60 controls the operation of the high-temperature side three-way valve 43 such that the high-temperature side heat medium temperature TWH approaches the target high-temperature side heat medium temperature TWHO.

Therefore, in the high-temperature side heat medium circuit 40a in the dehumidifying-heating mode, a circuit is switched to, in which the high-temperature side heat medium circulates in the same order as in the air-cooling mode.

Here, in the heating mode, the amount of heat exchange between the high-temperature side heat medium and the ventilation air in the heater core 42 increases. Therefore, in the high-temperature side three-way valve 43 in the heating mode, almost the total flow rate of the high-temperature side heat medium flowing out of the heat medium passage 12b of the water-refrigerant heat exchanger 12 is caused to flow out to the heater core 42 side.

In addition, the control device 60 controls the operation of the first low-temperature side pump 51a so as to exert predetermined pressure-feeding capability. Similarly to the dehumidifying-heating mode, the control device 60 controls the operations of the first low-temperature side three-way valve 52a to the third low-temperature side three-way valve 52c.

Therefore, in the low-temperature side heat medium circuit 50a in the heating mode, a circuit is switched to, in which the low-temperature side heat medium circulates in the same order as in the dehumidifying-heating mode. The other operations are the same as those in the heating mode described in the first embodiment.

Therefore, in the heat pump cycle 10a in the heating mode, a vapor compression type refrigeration cycle is formed in which the water-refrigerant heat exchanger 12 is caused to function as a condenser and the chiller 20 is caused to function as an evaporator. As a result, in the heat pump cycle 10a in the heating mode, the high-temperature side heat medium is heated by the water-refrigerant heat exchanger 12. Furthermore, the low-pressure refrigerant absorbs heat from the low-temperature side heat medium in the chiller 20, so that the temperature of the low-temperature side heat medium becomes lower than the outside air temperature.

In the high-temperature side heat medium circuit 40a in the heating mode, the heat medium heated by the water-refrigerant heat exchanger 12 is supplied to the heater core 42 in accordance with the flow ratio control of the high-temperature side three-way valve 43.

In the low-temperature side heat medium circuit 50a in the heating mode, the low-temperature side heat medium cooled by the chiller 20 flows into the low-temperature side radiator 56 via the first low-temperature side three-way valve 52a and the third low-temperature side three-way valve 52c. The low-temperature side heat medium having flowed into the low-temperature side radiator 56 absorbs heat from the outside air. The low-temperature side heat medium flowing out of the low-temperature side radiator 56 is sucked into the first low-temperature side pump 51a and pressure-fed to the heat medium passage 20b of the chiller 20.

In the indoor air conditioning unit 30 in the heating mode, the ventilation air blown from the indoor blower 32 passes through the indoor evaporator 18. The temperature of the ventilation air having passed through the indoor evaporator 18 is adjusted so as to approach the target blowing-out temperature TAO by adjusting the opening degree of the air mix door 34. Then, when the ventilation air whose temperature has been adjusted is blown into the vehicle interior, the heating of the vehicle interior is realized.

Next, the temperature adjusting operation mode will be described. In the present embodiment, the battery operation mode includes (B1) a battery temperature equalization mode and (B2) a battery cooling mode. The strong current device operation mode includes (C1) a strong current device cooling mode. Hereinafter, detailed operation of each temperature adjusting operation mode will be described.

(B1) Battery Temperature Equalization Mode

The battery cooling mode is executed when the temperature difference ΔTB between the respective battery cells is equal to or larger than the target cell temperature difference ΔKTB.

In the battery temperature equalization mode, the control device 60 controls the operation of the first low-temperature side pump 51a so as to exert predetermined pressure-feeding capability. The operation of the first low-temperature side three-way valve 52a is controlled such that the low-temperature side heat medium flowing out of the heat medium passage 20b of the chiller 20 is caused to flow out to the third low-temperature side three-way valve 52c side. In addition, the control device 60 controls the operation of the third low-temperature side three-way valve 52c such that the low-temperature side heat medium flowing out of the first low-temperature side three-way valve 52a is caused to flow out to the cooling water passage 80a side of the battery 80.

Therefore, in the low-temperature side heat medium circuit 50a in the battery temperature equalization mode, a circuit is switched to, in which the low-temperature side heat medium pressure-fed from the first low-temperature side pump 51a circulates in the order of the heat medium passage 20b of the chiller 20, the first low-temperature side three-way valve 52a, the third low-temperature side three-way valve 52c, the cooling water passage 80a of the battery 80, and the suction port of the first low-temperature side pump 51a.

Therefore, in the low-temperature side heat medium circuit 50a in the battery temperature equalization mode, temperatures of the respective battery cells forming the battery 80 are equalized when the low-temperature side heat medium pressure-fed from the first low-temperature side pump 51a flows through the cooling water passage 80a of the battery 80.

(B2) Battery Cooling Mode

The battery cooling mode is executed when the battery temperature TB becomes equal to or higher than a predetermined reference cooling temperature KTBH. The battery cooling mode is an operation mode in which the battery 80 is cooled by the low-temperature side heat medium cooled by the chiller 20. Therefore, when the compressor 11 of the heat pump cycle 10 is operating as during air conditioning, the control device 60 brings the cooling expansion valve 14c of the heat pump cycle 10 into a throttled state even in the air-cooling mode.

Therefore, in the heat pump cycle 10a in the battery cooling mode, the low-pressure refrigerant whose pressure has been reduced by the cooling expansion valve 14c flows into the refrigerant passage 20a of the chiller 20. The refrigerant flowing out of the refrigerant passage 20a of the chiller 20 is sucked into the compressor 11 via the sixth refrigerant joint part 13f.

Furthermore, the control device 60 appropriately controls the operations of the other control target devices. For example, the control device 60 controls the cooling expansion valve 14c similarly to the dehumidifying-heating mode.

In addition, the control device 60 controls the operation of the first low-temperature side pump 51a so as to exert predetermined pressure-feeding capability. In addition, the control device 60 controls the operation of the first low-temperature side three-way valve 52a such that the low-temperature side heat medium flowing out of the heat medium passage 20b of the chiller 20 is caused to flow out to the third low-temperature side three-way valve 52c side. In addition, the control device 60 controls the operation of the third low-temperature side three-way valve 52c such that the first low-temperature side heat medium temperature TWL1 approaches the battery target temperature TWLO1.

Therefore, in the low-temperature side heat medium circuit 50a in the dehumidifying-heating mode, a circuit is switched to, in which the low-temperature side heat medium pressure-fed from the first low-temperature side pump 51a circulates in the order of the heat medium passage 20b of the chiller 20, the first low-temperature side three-way valve 52a, the third low-temperature side three-way valve 52c, the cooling water passage 80a of the battery 80, and the suction port of the first low-temperature side pump 51a. At the same time, a circuit is switched to, in which the low-temperature side heat medium pressure-fed from the first low-temperature side pump 51a circulates in the order of the heat medium passage 20b of the chiller 20, the first low-temperature side three-way valve 52a, the third low-temperature side three-way valve 52c, the low-temperature side radiator 56, and the suction port of the first low-temperature side pump 51a. That is, circuits are switched to, in which the cooling water passage 80a of the battery 80 and the low-temperature side radiator 56 are connected in parallel for the flow of the low-temperature side heat medium.

Therefore, in the heat pump cycle 10a in the battery cooling mode during air conditioning, a vapor compression type refrigeration cycle is formed in which the water-refrigerant heat exchanger 12 is caused to function as a condenser and at least the chiller 20 is caused to function as an evaporator.

In the low-temperature side heat medium circuit 50a, the low-temperature side heat medium cooled by the chiller 20 flows into both the cooling water passage of the battery 80 and the low-temperature side radiator 56 in accordance with the flow ratio control of the first low-temperature side three-way valve 52a. The low-temperature side heat medium having flowed into the cooling water passage 80a of the battery 80 absorbs heat from the battery 80. As a result, the battery 80 is cooled.

Next, the battery cooling mode during non-air conditioning will be described. In the battery cooling mode during non-air conditioning, the control device 60 brings the air-cooling expansion valve 14b into a fully closed state and brings the cooling expansion valve 14c into a throttled state.

Therefore, in the heat pump cycle 10a in the battery cooling mode during non-air conditioning, a refrigerant circuit is switched to, in which the refrigerant discharged from the compressor 11 circulates in the order of the water-refrigerant heat exchanger 12, the receiver 23, the cooling expansion valve 14c, the chiller 20, and the suction port of the compressor 11.

Furthermore, the control device 60 appropriately controls the operations of the other control target devices. For example, the control device 60 controls the number of rotation of the compressor 11 so as to exert predetermined discharge capability. In addition, the control device 60 controls the throttle opening degree of the cooling expansion valve 14c such that the first low-temperature side heat medium temperature TWL1 approaches the battery target temperature TWLO1.

In addition, the control device 60 controls the operation of the high-temperature side pump 41 so as to exert predetermined pressure-feeding capability. In addition, the control device 60 controls the operation of the high-temperature side three-way valve 43 such that the high-temperature side heat medium having flowed in from the heat medium passage 12b of the water-refrigerant heat exchanger 12 is caused to flow out to the high-temperature side radiator 44 side.

Therefore, in the high-temperature side heat medium circuit 40a in the battery cooling mode during non-air conditioning, a circuit is switched to, in which the high-temperature side heat medium pressure-fed from the high-temperature side pump 41 circulates in the order of the heat medium passage 12b of the water-refrigerant heat exchanger 12, the high-temperature side three-way valve 43, the high-temperature side radiator 44, and the suction port of the high-temperature side pump 41.

In addition, the control device 60 controls the operation of the first low-temperature side pump 51a so as to exert predetermined pressure-feeding capability. Similarly to the battery cooling mode during air conditioning, the control device 60 controls the operations of the first low-temperature side three-way valve 52a and the third low-temperature side three-way valve 52c.

Therefore, in the low-temperature side heat medium circuit 50a in the battery cooling mode during non-air conditioning, a circuit is switched to, in which the low-temperature side heat medium pressure-fed from the first low-temperature side pump 51a circulates similarly to the battery cooling mode during air conditioning.

Therefore, in the heat pump cycle 10a in the battery cooling mode during non-air conditioning, a vapor compression type refrigeration cycle is formed in which the water-refrigerant heat exchanger 12 is caused to function as a condenser and the chiller 20 is caused to function as an evaporator. As a result, in the heat pump cycle 10a in the battery cooling mode during non-air conditioning, the high-temperature side heat medium is heated by the water-refrigerant heat exchanger 12. Furthermore, the low-pressure side heat medium is cooled by the chiller 20.

In the high-temperature side heat medium circuit 40a, the high-temperature side heat medium heated by the water-refrigerant heat exchanger 12 is pressure-fed to the high-temperature side radiator 44 via the high-temperature side three-way valve 43. The high-temperature side heat medium having flowed into the high-temperature side radiator 44 dissipates heat to the outside air and is cooled.

In the low-temperature side heat medium circuit 50a, the low-temperature side heat medium cooled by the chiller 20 flows into the cooling water passage 80a of the battery 80 similarly to the battery cooling mode during air conditioning. The low-temperature side heat medium having flowed into the cooling water passage 80a of the battery 80 absorbs heat from the battery 80. As a result, the battery 80 is cooled.

(C1) Strong Current Device Cooling Mode

The strong current device cooling mode is executed when the second low-temperature side heat medium temperature TWL2 becomes equal to or higher than a predetermined reference strong current device cooling temperature KTWL2. The strong current device cooling mode is an operation mode in which the strong current device 81 is cooled by the low-temperature side heat medium cooled by the low-temperature side radiator 56.

In the strong current device cooling mode, the control device 60 controls the operation of the second low-temperature side pump 51*b* so as to exert predetermined pressure-feeding capability. In addition, the control device 60 controls the operation of the second low-temperature side three-way valve 52*b* such that the second low-temperature side heat medium temperature TWL2 approaches the strong current device target temperature TWLO2.

Therefore, in the low-temperature side heat medium circuit 50*a* in the strong current device cooling mode, a circuit is switched to, in which the low-temperature side heat medium pressure-fed from the second low-temperature side pump 51*b* circulates in the order of the cooling water passage 81*a* of the strong current device 81, the second low-temperature side three-way valve 52*b*, the strong current device bypass passage 55*b*, and the suction port of the second low-temperature side pump 51*b*. At the same time, a circuit is switched to, in which the low-temperature side heat medium pressure-fed from the second low-temperature side pump 51*b* circulates in the order of the cooling water passage 81*a* of the strong current device 81, the second low-temperature side three-way valve 52*b*, the low-temperature side radiator 56, and the suction port of the second low-temperature side pump 51*b*. That is, circuits are switched to, in which the strong current device bypass passage 55*b* and the low-temperature side radiator 56 are connected in parallel for the flow of the low-temperature side heat medium.

Therefore, in the low-temperature side heat medium circuit 50*a* in the strong current device cooling mode, at least a part of the low-temperature side heat medium pressure-fed from the second low-temperature side pump 51*b* flows into the low-temperature side radiator 56. The low-temperature side heat medium having flowed into the low-temperature side radiator 56 is cooled by heat exchange with the outside air. The low-temperature side heat medium flowing out of the low-temperature side radiator 56 merges, in the twelfth heat medium joint part 53*m*, with the low-temperature side heat medium having flowed through the strong current device bypass passage 55*b* and is mixed.

At this time, by the flow ratio control of the second low-temperature side three-way valve 52*b*, the temperature of the low-temperature side heat medium mixed in the twelfth heat medium joint part 53*m* approaches the strong current device target temperature TWLO2. The low-temperature side heat medium mixed in the twelfth heat medium joint part 53*m* is sucked into the second low-temperature side pump 51*b*. The low-temperature side heat medium pressure-fed from the second low-temperature side pump 51*b* flows into the cooling water passage 81*a* of the strong current device 81. As a result, the strong current device 81 is cooled.

According to the air conditioner 1*a* of the present embodiment, comfortable air conditioning of the vehicle interior and appropriate temperature adjustment of a plurality of in-vehicle devices can be performed by appropriately combining and executing the air conditioning operation mode and the temperature adjusting operation mode, as described above.

Furthermore, also in the air conditioner 1*a* of the present embodiment, the heating preparation control can be executed similarly to the first embodiment.

Specifically, in the step S2 of the heating preparation control in the present embodiment, the control device 60 brings the air-cooling expansion valve 14*b* into a fully closed state and brings the cooling expansion valve 14*c* into a throttled state in order to execute the heating preparation control.

Figure 12:
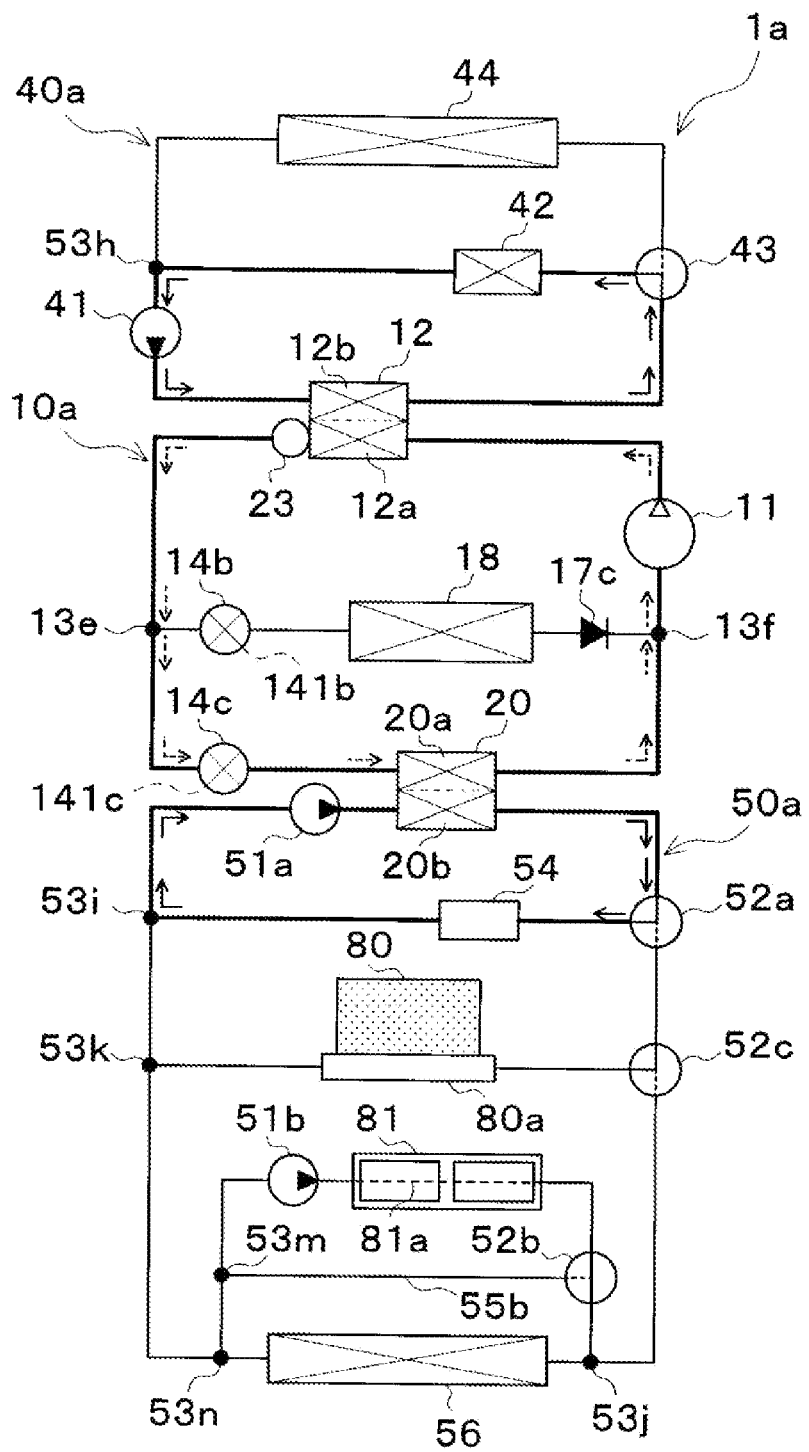
FIG. 12 is a schematic overall configuration view illustrating a flow of a refrigerant or the like during heating preparation control in an air conditioner of a fourth embodiment.

Therefore, in the heat pump cycle 10*a* under the heating preparation control, a refrigerant circuit is switched to, in which the refrigerant discharged from the compressor 11 circulates in the order of the water-refrigerant heat exchanger 12, the receiver 23, the cooling expansion valve 14*c*, the chiller 20, and the suction port of the compressor 11, as indicated by dashed arrows in FIG. 12.

In addition, the control device 60 controls the operation of the high-temperature side pump 41 so as to exert predetermined pressure-feeding capability. In addition, the control device 60 controls the operation of the high-temperature side three-way valve 43 such that the high-temperature side heat medium flowing out of the heat medium passage 12*b* of the water-refrigerant heat exchanger 12 is caused to flow out to the heater core 42 side.

Therefore, in the high-temperature side heat medium circuit 40*a* during the heating preparation control, the high-temperature side heat medium pressure-fed from the high-temperature side pump 41 circulates in the order of the heat medium passage 12*b* of the water-refrigerant heat exchanger 12, the heater core 42, and the suction port of the high-temperature side pump 41, as indicated by solid arrows in FIG. 12.

In addition, the control device 60 controls the operation of the first low-temperature side pump 51*a* so as to exert predetermined pressure-feeding capability. In addition, the control device 60 controls the operation of the first low-temperature side three-way valve 52*a* such that the low-temperature side heat medium flowing out of the heat medium passage 20*b* of the chiller 20 is caused to flow into the cooling water passage 80*a* of the battery 80.

Therefore, in the low-temperature side heat medium circuit 50*a* under the heating preparation control, the low-temperature side heat medium pressure-fed from the first low-temperature side pump 51*a* circulates in the order of the heat medium passage 20*b* of the chiller 20, the electric heater 54, and the suction port of the first low-temperature side pump 51*a*, as indicated by the solid arrows in FIG. 12. That is, in the low-temperature side heat medium circuit 50*a* under the heating preparation control, a circuit is switched to, in which the low-temperature side heat medium heated by the electric heater 54 flows while bypassing the cooling water passage 80*a* of the battery 80.

The other operations under the heating preparation control are the same as those in the first embodiment. Therefore, the same effects as those in the first embodiment can be obtained also in the heating preparation control in the air conditioner 1*a* of the present embodiment. That is, the heating capability of the heating part can be promptly increased using the heat generated by the electric heater 54. As a result, it is possible to realize air conditioning with immediate effectiveness and high responsiveness.

Fifth Embodiment

In the present embodiment, an example will be described in which an inlet side connection passage 91*a*, an outlet side connection passage 92*a*, and the like are added to the air conditioner 1*a* of the fourth embodiment, as illustrated in the overall configuration view of FIG. 13. The inlet side connection passage 91*a* and the outlet side connection passage 92*a* form a heat medium flow path that connects the high-temperature side heat medium circuit 40*a* and the low-temperature side heat medium circuit 50*a*.

In the high-temperature side heat medium circuit 40a of the present embodiment, a high-temperature side four-way valve 43a is disposed instead of the high-temperature side three-way valve 43. The high-temperature side four-way valve 43a causes the high-temperature side heat medium flowing out of the heat medium passage 12b of the water-refrigerant heat exchanger 12 to flow into its inside, and causes the high-temperature side heat medium to flow out to at least one of the heater core 42 side, the high-temperature side radiator 44 side, and the inlet side connection passage 91a side.

The high-temperature side four-way valve 43a can adjust the flow ratio among the flow rate of the high-temperature side heat medium that is caused to flow out to the heater core 42 side, the flow rate of the high-temperature side heat medium that is caused to flow out to the high-temperature side radiator 44 side, and the flow rate of the high-temperature side heat medium that is caused to flow out to the inlet side connection passage 91a side. Furthermore, by adjusting the flow ratio, the high-temperature side four-way valve 43a can cause the total flow rate of the high-temperature side heat medium that has been caused to flow into its inside to flow out to any one of the heater core 42 side, the high-temperature side radiator 44 side, and the inlet side connection passage 91a side.

That is, the high-temperature side four-way valve 43a serves as a heat medium circuit switching part. The operation of the high-temperature side four-way valve 43a is controlled by a control signal output from control device 60.

Furthermore, in the high-temperature side heat medium circuit 40a, a first four-way joint part 53q is disposed instead of the eighth heat medium joint part 53h. The first four-way joint part 53q is a four-way joint part having four inflow outlets communicating with each other. As the first four-way joint part 53q, a joint member formed in the same manner as the first refrigerant joint part 13a or the like can be adopted.

In the low-temperature side heat medium circuit 50a of the present embodiment, a fourteenth heat medium joint part 53p is disposed. The fourteenth heat medium joint part 53p is disposed in the heat medium flow path extending from the outflow port of the third low-temperature side three-way valve 52c to the inlet of the cooling water passage 80a of the battery 80.

Furthermore, in the low-temperature side heat medium circuit 50a, a second four-way joint part 53r is disposed instead of the eleventh heat medium joint part 53k. The basic configuration of the second four-way joint part 53r is similar to that of the first four-way joint part 53q.

The inlet portion of the inlet side connection passage 91a is connected to one outflow port of the high-temperature side four-way valve 43a. The outlet portion of the inlet side connection passage 91a is connected to one inflow port of the fourteenth heat medium joint part 53p. The inlet portion of the outlet side connection passage 92a is connected to one outflow port of the second four-way joint part 53r. The outlet portion of the outlet side connection passage 92a is connected to one inflow port of the first four-way joint part 53q. The other configurations of the air conditioner 1a are similar to those of the fourth embodiment.

Next, the operation of the air conditioner 1a, having the above configuration, of the present embodiment will be described. During the normal operation in the air conditioner 1a of the present embodiment, the control device 60 controls the operation of the high-temperature side four-way valve 43a such that the high-temperature side heat medium circuit 40a becomes the same circuit as that of the fourth embodiment. Therefore, during the normal operation, the high-temperature side heat medium never flows out from the high-temperature side four-way valve 43a to the inlet side connection passage 91a side.

Therefore, also in the air conditioner 1a of the present embodiment, comfortable air conditioning of the vehicle interior and appropriate temperature adjustment of a plurality of in-vehicle devices can be performed by appropriately combining and executing the air conditioning operation mode and the temperature adjusting operation mode. Furthermore, the heating capability of the heating part can be promptly increased by performing the heating preparation control, similarly to the fourth embodiment. As a result, it is possible to realize air conditioning with immediate effectiveness and high responsiveness.

In the present embodiment, when the heating preparation control is being executed and the battery temperature TB is equal to or lower than the predetermined reference warm-up temperature KTBL, the control device 60 controls the operation of the high-temperature side four-way valve 43a such that the high-temperature side heat medium flowing out of the heat medium passage 12b of the water-refrigerant heat exchanger 12 is caused to flow out to both the heater core 42 side and the inlet side connection passage 91a side.

Figure 13:
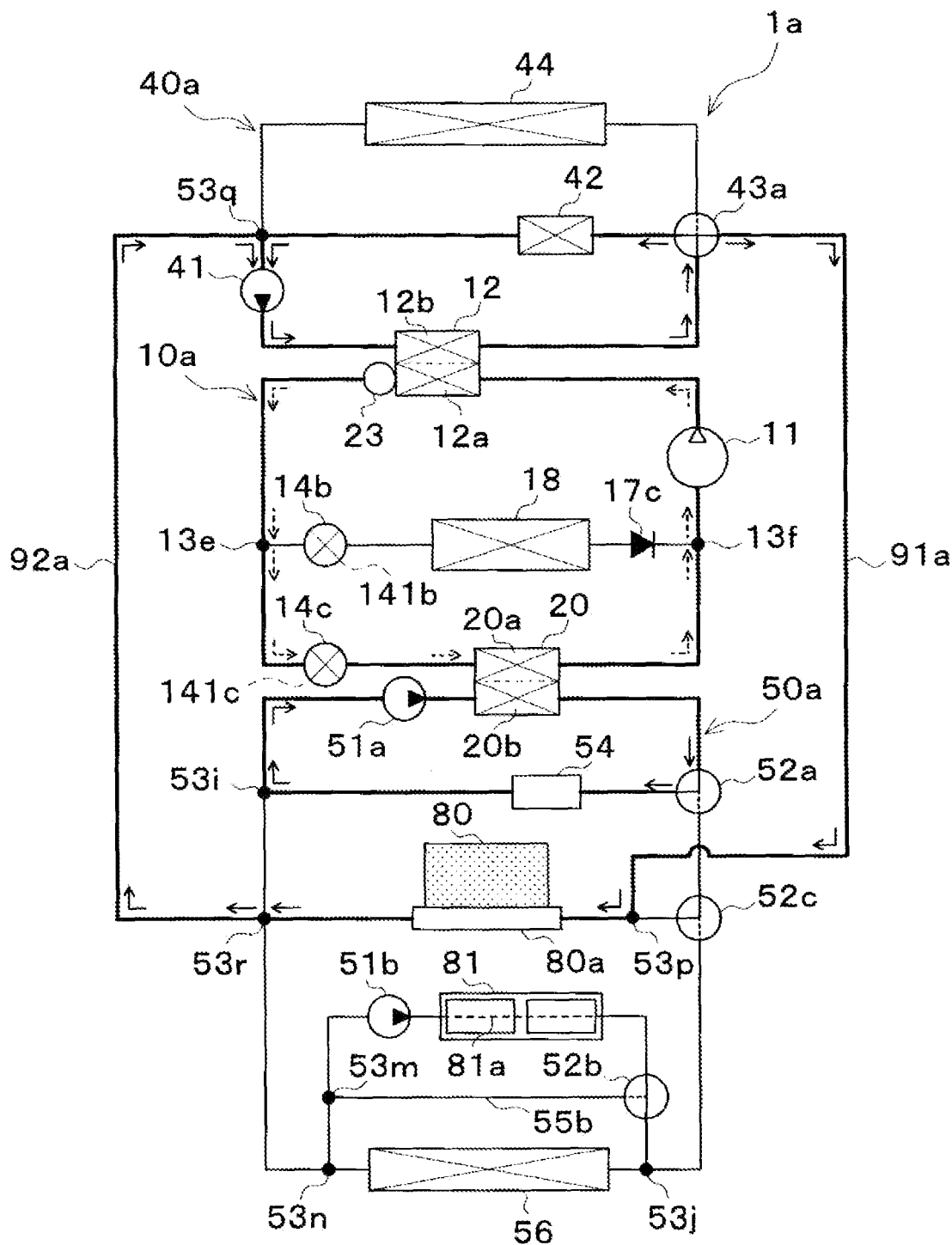
FIG. 13 is a schematic overall configuration view illustrating a flow of a refrigerant or the like during heating preparation control in an air conditioner of a fifth embodiment.

Therefore, when warm-up of the battery 80 is required during the execution of the heating preparation control in the air conditioner 1a of the present embodiment, a circuit is switched to, in which the high-temperature side heat medium pressure-fed from the high-temperature side pump 41 circulates in the order of the heat medium passage 12b of the water-refrigerant heat exchanger 12, the high-temperature side four-way valve 43a, the heater core 42, and the suction port of the high-temperature side pump 41, as indicated by solid arrows in FIG. 13. At the same time, a circuit is switched to, in which the high-temperature side heat medium pressure-fed from high-temperature side pump 41 circulates in the order of the heat medium passage 12b of the water-refrigerant heat exchanger 12, the high-temperature side four-way valve 43a, the inlet-side connection passage 91a, the cooling water passage 80a of the battery the outlet side connection passage 92a, and the suction port of the high-temperature side pump 41. That is, circuits are switched to, in which the heater core 42 and the cooling water passage 80a of the battery 80 are connected in parallel for the flow of the high-temperature side heat medium.

According to this, when the compressor 11 is operated in the step S5 of the heating preparation control described in the first embodiment, the high-temperature side heat medium can be heated by the water-refrigerant heat exchanger 12. Then, at least a part of the high-temperature side heat medium heated by the water-refrigerant heat exchanger 12 can be caused to flow into the cooling water passage 80a of the battery 80 via the high-temperature side four-way valve 43a and the inlet side connection passage 91a. As a result, the battery 80 can be warmed up.

The high-temperature side heat medium flowing out of the cooling water passage 80a of the battery 80 is sucked into the high-temperature side pump 41 via the outlet side connection passage 92a.

The other operations are the same as those in the first embodiment. Therefore, according to the air conditioner 1a of the present embodiment, the battery can be warmed up during the execution of the heating preparation control.

The present disclosure is not limited to the above-described embodiments, and can be variously modified as follows within the scope that does not deviate from the gist of the present disclosure.

In the above-described embodiments, examples have been described in which the air conditioners 1 and 1*a* according to the present disclosure are applied to an electric car, but the application of the air conditioner 1 is not limited thereto. For example, the air conditioner 1 may be applied to a hybrid vehicle that obtains driving force for traveling from an electric motor and an internal combustion engine (i.e., an engine), and further to a plug-in hybrid vehicle that can charge a battery with electric power supplied from an external power supply while the vehicle is stopped.

The air conditioner 1 may also be applied to a stationary air conditioner or the like with a temperature adjustment function that adjusts the temperature of an object whose temperature is to be adjusted (e.g., a computer, a computer server device, and other electric devices) while air conditioning the room.

In the above-described embodiments, an example has been described in which an inverter and a motor generator are adopted as the strong current device 81, but the strong current device 81 is not limited thereto. For example, a charging device, a power control unit (so-called PCU), a transaxle, an ADAS control device, or the like may be adopted as the strong current device 81.

The charging device is an in-vehicle charger that charges the battery 80 with regenerative power or the like. The PCU is a power control device that performs transformation of electric power and power distribution. The transaxle is a power transmission mechanism in which a transmission, a differential gear, and the like are integrated. The ADAS control device is a control device for an advanced driver assistance system. When the air conditioner 1 is applied to the stationary air conditioner, it may be configured such that other heat generating devices are cooled.

The respective configurations of the heat pump cycles 10 and 10*a* are not limited to the configurations disclosed in the above-described embodiments.

For example, an example has been described in the above-described embodiments, in which the third check valve 17*c* whose refrigerant passage has a relatively small cross-sectional area is adopted as the indoor unit outlet side opening/closing part. However, the indoor unit outlet side opening/closing part may be formed by combining an evaporating pressure regulating valve and a normal check valve.

The evaporating pressure regulating valve is a variable throttle mechanism that, in order to suppress frosting in the indoor evaporator 18, changes a valve opening degree such that the refrigerant evaporating pressure in the indoor evaporator 18 is maintained to be equal to or higher than a predetermined set pressure. As the evaporating pressure regulating valve, a mechanical mechanism, that increases a valve opening degree as the flow rate of a refrigerant flowing through its inside increases, can be adopted.

In the second embodiment, an example has been described in which the water-refrigerant heat exchanger 12 and the receiver 23 are adopted, but the present disclosure is not limited thereto. For example, a so-called sub-cooling heat exchanger, including a condensing part that condenses a refrigerant, a liquid receiving part that separates the gas and liquid of the refrigerant condensed by the condensing part and stores a liquid-phase refrigerant, and a super-cooling part that super-cools the liquid-phase refrigerant flowing out of the liquid receiving part, may be adopted.

In addition, a plurality of components may be integrated or separated within a range in which the above-described effects can be obtained. For example, the fourth refrigerant joint part 13*d* and the sixth refrigerant joint part 13*f* may be integrated similarly to the first four-way joint part 53*q*.

In the above embodiments, an example has been described in which R1234yf is adopted as the refrigerant, but the refrigerant is not limited thereto. For example, R134a, R600a, R410A, R404A, R32, R407C, or the like may be adopted. Alternatively, a mixed refrigerant obtained by mixing a plurality of kinds of these refrigerants, or the like, may be adopted. Furthermore, carbon dioxide may be adopted as the refrigerant to form a supercritical refrigeration cycle in which the high-pressure side refrigerant pressure is equal to or higher than the critical pressure of the refrigerant.

The respective configurations of the high-temperature side heat medium circuits 40 and 40*a* and the low-temperature side heat medium circuits 50 and 50*a* are not limited to the configurations disclosed in the above-described embodiments.

For example, an example has been described in the above-described embodiments, in which the PTC heater is adopted as the electric heater 54 that is the heat generating part, but the heater is not limited thereto. For example, a nichrome wire, a carbon fiber heater, or the like may be adopted. Furthermore, a strong current device can also be adopted as the heat generating part. For example, the ADAS control device may be adopted as the heat generating part, and a calorific value may be adjusted by performing an inefficient operation.

In addition, a plurality of components may be integrated or separated within a range in which the above-described effects can be obtained. For example, the first low-temperature side three-way valve 52*a*, second low-temperature side three-way valve 52*b*, and first heat medium joint part 53*a* of the first to third embodiments may be integrated as a five-way valve having five heat medium inflow outlets. In addition, the first four-way joint part 53*q* and the second four-way joint part 53*r* may be formed by combining two three-way joints.

In the above-described embodiments, an example has been described in which an ethylene glycol aqueous solution is adopted as the high-temperature side heat medium and the low-temperature side heat medium, but the heat media are not limited thereto. For the high-temperature side heat medium circuits 40 and 40*a*, a solution containing dimethylpolysiloxane, nano-fluid, or the like, an antifreeze, an aqueous liquid refrigerant containing alcohol or the like, a liquid medium containing oil or the like, or the like may be adopted.

The operations of the air conditioners 1 and 1*a* are not limited to the above-described operation modes. The air conditioners 1 and 1*a* may be configured to be able to execute other operation modes. As long as the air conditioner 1 or 1*a* has an operation mode in which the ventilation air is heated by at least a heating part, it is possible to obtain an effect that the heating capability of the heating part can be promptly increased by the above-described heating preparation control.

In addition, in the step S2 of the above-described heating preparation control, an example, in which the compressor 11 is stopped, has been described, but the present disclosure is not limited thereto. For example, as the reference discharge capability for the heating preparation control, a lower limit value in a possible range of the number of rotation (refrigerant discharge capability) of the compressor 11 that is assumed during normal operation, or a value lower than the lower limit value, may be adopted.

In addition, in the step S2 of the above-described heating preparation control, an example, in which the indoor blower 32 is stopped, has been described, but the present disclosure is not limited thereto. For example, as the reference blowing capability for the heating preparation control, a lower limit value in a possible range of the number of rotation (blowing capability) of the indoor blower 32 that is assumed during normal operation, or a value lower than the lower limit value, may be adopted.

Although the present disclosure has been described in accordance with embodiments, it is understood that the present disclosure is not limited to the embodiments and the structures. The present disclosure also encompasses various modifications and variations within the scope of equivalents. In addition, various combinations and modes, and other combinations and modes including only one element, more elements, or less elements are also within the scope and idea of the present disclosure.

What is claimed is:

1. An air conditioner comprising:
    a heat pump cycle including a compressor configured to compress and discharge a refrigerant, a heating part configured to heat air to be blown into a space to be air-conditioned using a high-pressure refrigerant discharged from the compressor as a heat source, and a low-temperature side water-refrigerant heat exchanger configured to cause a low-pressure refrigerant to absorb heat of a heat medium;
    a heat medium circuit in which the heat medium is circulated, the heat medium circuit being provided with a heat medium passage of the low-temperature side water-refrigerant heat exchanger, and a heat generating part configured to heat the heat medium to flow into the heat medium passage of the low-temperature side water-refrigerant heat exchanger;
    a blower configured to blow the air toward the space to be air-conditioned; and
    a controller configured to set a heating preparation control in a case where a heating capability of the heating part is increased by using the heat generated by the heat generating part, wherein
    in the heating preparation control, the controller is configured to set a refrigerant discharge capability of the compressor to be equal to or less than a predetermined reference discharge capability, and to set a blowing capability of the blower to be equal to or less than a predetermined reference blowing capability, until an inlet-side heat medium temperature of the heat medium flowing into the heat medium passage of the low-temperature side water-refrigerant heat exchanger becomes equal to or higher than a target heat medium temperature.

2. The air conditioner according to claim 1, wherein,
    in the heating preparation control, the controller is configured to increase the refrigerant discharge capability of the compressor when the inlet side heat medium temperature becomes equal to or higher than the target heat medium temperature.

3. The air conditioner according to claim 2, wherein,
    in the heating preparation control, the controller is configured to increase the blowing capability of the blower when the inlet-side heat medium temperature becomes equal to or higher than the target heat medium temperature and the heating capability of air in the heating part becomes equal to or higher than a predetermined reference heating capability.

4. The air conditioner according to claim 1, wherein
    the controller is configured to perform the heating preparation control, when a value obtained by subtracting an actual heating capability of the heating part from the reference heating capability of the heating part is equal to or larger than a predetermined reference value.

5. The air conditioner according to claim 1, wherein
    the heat pump cycle includes an indoor evaporator configured to exchange heat between the low-pressure refrigerant and the air, an inlet side opening/closing part configured to open or close a refrigerant inlet side of the indoor evaporator, and an outlet side opening/closing part configured to open or close a refrigerant outlet side of the indoor evaporator,
    the indoor evaporator and the low-temperature side water-refrigerant heat exchanger are connected in parallel with respect to a flow of the refrigerant, and
    the inlet side opening/closing part and the outlet side opening/closing part are configured to close the refrigerant inlet side and the refrigerant outlet side of the indoor evaporator in the heating preparation control.

6. The air conditioner according to claim 1, wherein
    the heat medium circuit is provided with a cooling water passage of a battery and a heat medium circuit switching part that switches a circuit configuration, and
    when the heating preparation control is executed by the controller, the heat medium circuit switching part switches to a circuit in which the heat medium flows while bypassing the cooling water passage.

7. The air conditioner according to claim 1, further comprising:
    a target heat-medium temperature determination unit configured to determine the target heat medium temperature, wherein
    the target heat medium temperature determination unit is configured to raise the target heat medium temperature as the temperature of the air flowing into the heating part lowers.

8. The air conditioner according to claim 1, further comprising:
    a target heat-medium temperature determination unit configured to determine the target heat medium temperature; and
    a target blowing capability determination unit configured to determine a target blowing capability of the blower, wherein
    the target heat-medium temperature determination unit is configured to raise the target heat medium temperature as the target blowing capability increases.

* * * * *